(12) United States Patent
Shimada

(10) Patent No.: US 7,773,589 B2
(45) Date of Patent: Aug. 10, 2010

(54) LOAD-BALANCING, FAULT-TOLERANT STORAGE SYSTEM

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1482 days.

(21) Appl. No.: 11/131,386

(22) Filed: May 18, 2005

(65) Prior Publication Data
US 2006/0200696 A1    Sep. 7, 2006

(30) Foreign Application Priority Data
Mar. 1, 2005    (JP) ............................. 2005-056470

(51) Int. Cl.
*H04L 12/50* (2006.01)
*G06F 13/00* (2006.01)
*G06F 9/26* (2006.01)
*H04L 12/26* (2006.01)
*G06F 15/16* (2006.01)

(52) U.S. Cl. .................. 370/360; 370/389; 709/230; 711/114; 711/211; 711/220

(58) Field of Classification Search .................. None
See application file for complete search history.

(56) References Cited

U.S. PATENT DOCUMENTS

| | | | |
|---|---|---|---|
| 6,237,046 B1 * | 5/2001 | Ohmura et al. ................. | 710/1 |
| 6,460,122 B1 * | 10/2002 | Otterness et al. ............ | 711/154 |
| 6,909,695 B2 * | 6/2005 | Lee et al. ..................... | 370/238 |
| 7,234,021 B1 * | 6/2007 | Chilton ....................... | 711/113 |
| 7,239,641 B1 * | 7/2007 | Banks et al. ................. | 370/397 |
| 2002/0156918 A1 * | 10/2002 | Valdevit et al. ............. | 709/238 |
| 2004/0221105 A1 | 11/2004 | Fujimoto et al. | |
| 2005/0033912 A1 * | 2/2005 | Abe ........................... | 711/114 |
| 2006/0242361 A1 | 10/2006 | Fujimoto et al. | |

FOREIGN PATENT DOCUMENTS

| | | |
|---|---|---|
| AM | 2000-99281 | 4/2000 |
| AN | 2003-99206 | 4/2003 |
| JP | 2004 192482 | 7/2004 |
| JP | 2004 240949 | 8/2004 |

OTHER PUBLICATIONS

"EMC Symmetrix DMX Series" Jan. 7, 2005, EMC Corporation Homepage, Products, www.emc.com/products/systems/symmetrix/DMX_series/pdf/DMX_series.pdf.

* cited by examiner

*Primary Examiner*—Pankaj Kumar
*Assistant Examiner*—Marcus R Smith
(74) *Attorney, Agent, or Firm*—Brundidge & Stanger, P.C.

(57) ABSTRACT

There is provided architecture of a storage system, which has high scalability, low performance ununiformity, and strong fault tolerance, and a control method thereof. The storage system is connected to a host computer. The storage system has four or more nodes. Each node has a host interface unit which is connected to the host computer to communicate with the host computer, and a switch which communicates with the host interface unit. The switch is connected to the switches of other four or less nodes to communicate with the switches of other nodes, such that the nodes are connected to one another in a two-dimensional lattice shape.

6 Claims, 23 Drawing Sheets

HOST INTERFACE CONTROL UNIT 101

DRIVE CONTROL UNIT 103

LOAD-BALANCING, FAULT-TOLERANT STORAGE SYSTEM

CROSS-REFERENCES TO RELATED APPLICATIONS

This application relates to and claims priority from Japanese Patent Application No. 2005-056470, filed on Mar. 1, 2005, the entire disclosure of which is incorporated herein by reference.

BACKGROUND OF THE INVENTION

1. Field of the Invention

The present invention relates to a storage system which can enhance scalability and fault tolerance.

2. Description of the Related Art

In the current data storage system market, very large scale storage systems to which a plurality of host computers are connected are demanded. For example, for the use in a data center of a large company or the like, the large scale storage system having high performance and reliability are demanded.

On the other hand, with the spread of the open systems market, demands for small scale storage systems which have the same performance and reliability as those of the large scale storage systems are increasing.

In order to meet these demands, it is preferable to implement storage systems having high scalability such that a small scale configuration and a very large scale configuration are supported by a common architecture. For this reason, various configurations which implement an arbitrary scale storage system by coupling the arbitrary number of host interface control units for controlling the connections to host computers with the arbitrary number of drive control units for controlling data access to disk drives has been suggested.

A crossbar switching network has a configuration in which a plurality of host interface control units and a plurality of drive control units are coupled with one another via one switch (for example, see Japanese Patent Laid-Open No. 2000-99281).

A cluster switching network has a configuration in which a plurality of clusters are coupled with one another. Here, the cluster means that the plurality of host interface control units and the plurality of drive control units are coupled with one another via one switch (for example, see Japanese Patent Laid-Open No. 2003-99206).

A completely-connected network has a configuration in which the plurality of host interface control units and the plurality of drive control units are all coupled with one another via switches which are provided in the respective control units (for example, see "EMC Symmetrix DMX Series", [online], EMC Corporation Homepage, Products, [search on Jan. 7, 2005], Internet <URL: http://www.emc-.com/products/systems/symmetrix/DMX_series/p df/DMX-_series.pdf>

According to the crossbar switching network, the scale of the storage system to be constructed is limited by the scale of the switch. That is, in order to construct the large scale storage system, it is necessary to use a large scale switch. If the large scale switch is used in the small scale storage system, the cost of the small scale storage system increases.

The cluster switching network is intended to relieve the problem of the cost increase by the large scale switch in the crossbar switching network. That is, the cluster is constructed by using a small scale switch. Then, the large scale system which requires for the large scale switch is implemented by connecting the plurality of clusters to one another. However, in order to suppress the cost increase of the switch, there is no choice but to limit data transmission capability among the clusters. For this reason, when data is transmitted over the clusters, performance is significantly degraded, as compared to a case in which data is transmitted within the cluster. As such, in the cluster switching network, performance ununiformity occurs according to a data transmission path.

According to the completely-connected network, when the large scale storage system is constructed, lots of the connections among the switches are required, such that the configuration is complicated. As a result, the cost of wiring lines increases and the switch becomes large.

SUMMARY OF THE INVENTION

The invention has been made in consideration of the above-described problems, and it is an object of the invention to provide an architecture of a storage system which can construct an arbitrary scale storage system including a small scale configuration and a very large scale configuration at proper cost according to a scale (that is, with high scalability), has low performance ununiformity, and has high fault tolerance, and a control method thereof.

According to an aspect of the invention, there is provided a storage system which is connected to host computers. The storage system has four or more nodes, each node being connected to the host computers and having a host interface unit that communicate with the host computers and a switch that communicates with the host interface unit. The switch is connected to other switches provided in other four or less nodes, such that the nodes are connected to one another in a two-dimensional lattice shape.

According to the aspect of the invention, an arbitrary scale storage system can be constructed at proper cost according to a scale, without limits. Further, according to the invention, performance ununiformity due to a data transmission path is relieved. In addition, according to the invention, since there are many data transmission paths, fault tolerance is enhanced.

DESCRIPTION OF THE PREFERRED EMBODIMENTS

Hereinafter, embodiments of the invention will be described with reference to the drawings.

Figure 1:
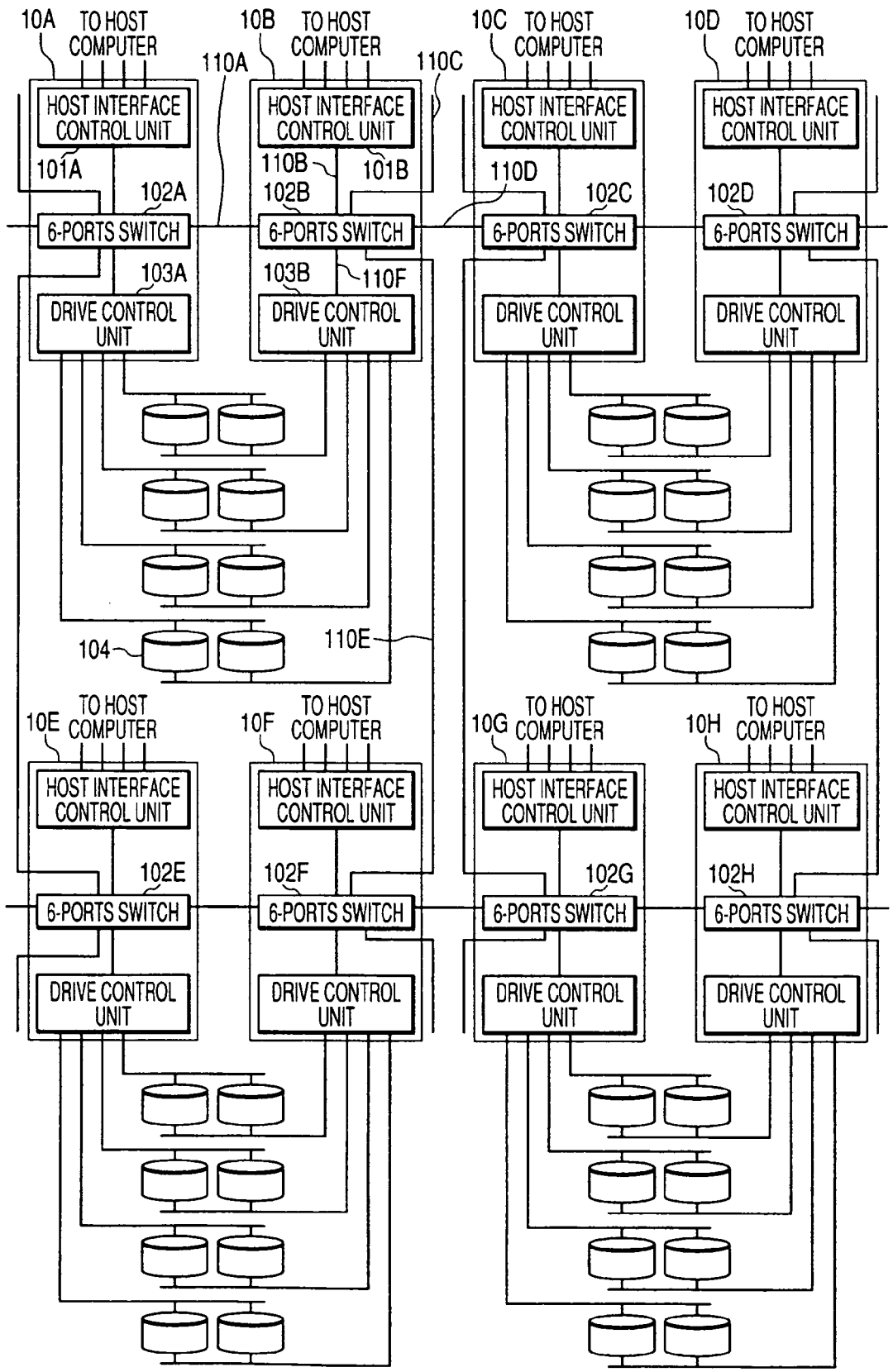
FIG. 1 is a block diagram showing a configuration of a storage system according to the first embodiment of the invention.

FIG. 1 is block diagram showing a configuration of a storage system according to the first embodiment of the invention.

The storage system of the present embodiment has a plurality of storage control units 10 and a plurality of disk drives 104.

In FIG. 1, 8 storage control units 10A to 10H are shown, but the storage system of the present embodiment can include the arbitrary number of the storage control units 10.

The storage control unit 10 is connected to host computers (not shown), disk drives 104, and other storage control units 10. When receiving a request from the host computer for access to the disk drives 104, the storage control unit 10 executes the access operation. When any storage control unit 10 receives a request for access to disk drives 104 which is not connected to the storage control unit 10, the storage control unit 10 transmits the request for access to another storage control unit 10. Further, when any storage control unit 10 receives a response to a host computer which is not connected to the storage control unit 10, the storage control unit 10 transmits the response to another storage control unit 10. A procedure thereof will be described later in detail.

The storage control unit 10 has a host interface control unit 101, a 6-ports switch 102, and a drive control unit 103.

The host interface control unit 101 is connected to the host computer to control the communication with the host computer. As a communication protocol between the host interface control unit 101 and the host computer, for example, SCSI or fiber channel (FC) protocol is used. Alternatively, protocol such as internet protocol (IP) or iSCSI may be used. As regards the configuration of the host interface control unit 101 will be described later in detail (see FIG. 2).

The 6-ports switch 102 is connected to the host interface control unit 101, the drive control unit 103, and the 6-ports switches 102 in other storage control units 10, and serves as a switch for switching the connections among them. The 6-ports switch 102 has 6 ports (not shown) and the respective ports are connected to one host interface control unit 101, one drive control unit 103, or other 6-ports switches 102.

For example, connection lines 110A to 110F are connected to the respective ports of the 6-ports switch 102B in the storage control unit 10B.

The connection line 110A is connected to the 6-ports switch 102A in the storage control unit 10A.

The connection line 110B is connected to the host interface control unit 101B in the storage control unit 10B.

The connection line 110C is connected to the 6-ports switch 102 in another storage control unit 10 which is not shown in FIG. 1.

The connection line 110D is connected to the 6-ports switch 102C in the storage control unit 10C.

The connection line 110E is connected to the 6-ports switch 102F in the storage control unit 10F.

The connection line 110F is connected to the drive control unit 103B in the storage control unit 10B.

The drive control unit 103 is connected to the disk drives 104 and controls access to the disk drives 104. As a communication protocol between the drive control unit 103 and the disk drives 104, for example, SCSI or fiber channel (FC) protocol is used. Alternatively, protocol such as SATA (Serial ATA) or SAS (Serial Attached SCSI) may be used. As regards the configuration of the drive control unit 103 will be described later in detail (see FIG. 3).

The disk drives 104 are hard disk drives. As shown in FIG. 1, a plurality of disk drives 104 can be connected to the drive control unit 103. The plurality of disk drives 104 may construct RAID (Redundant Array of Independent Disks) to enhance data reliability. Further, the disk drives 104 may be constructed by a storage device (for example, a magneto-optical disk, a semiconductor storage device, or the like) other than the hard disk drive.

Each disk drive 104 of the present embodiment has two interfaces (not shown) to increase fault tolerance. The interfaces are respectively connected to the different drive control units 103 (for example, the drive control units 103A and 103B).

Figure 2:
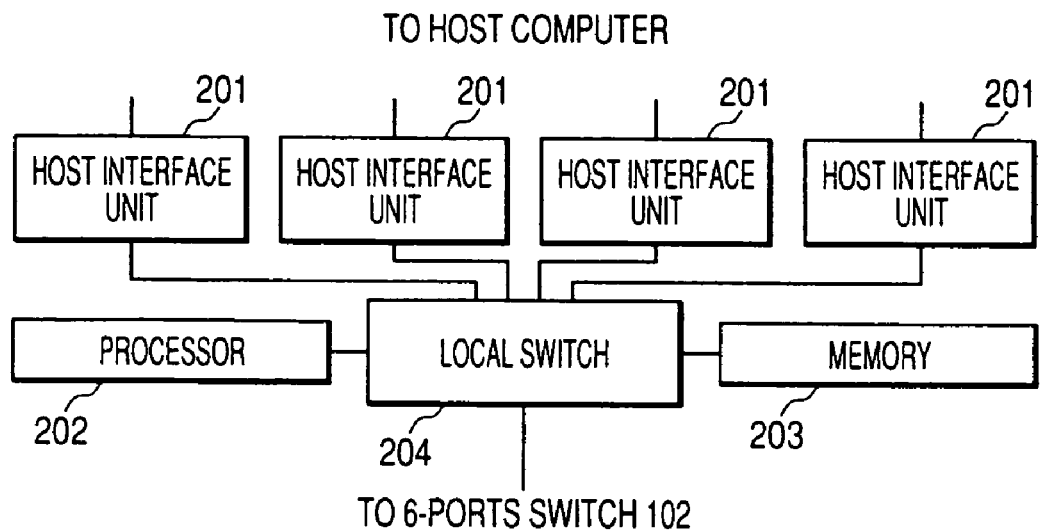
FIG. 2 is a block diagram showing a configuration of a host interface control unit according to the first embodiment of the invention.

FIG. 2 is a block diagram showing a configuration of the host interface control unit 101 according to the first embodiment of the invention.

The host interface control unit 101 has host interface (I/F) units 201, a processor 202, a memory 203, and a local switch 204.

The respective host I/F units 201 are connected to the host computer to process the communication according to a predetermined protocol described with reference to FIG. 1. Each host interface control unit 101 may have the arbitrary number of the host I/F units 201. In the present embodiment, each host interface control unit 101 has four host I/F units 201.

The processor 202 executes a control program stored in the memory 203 to control the operation of the host interface control unit 101. Specifically, the processor 202 controls the communication with the host computer by each host I/F unit 201. Further, the processor 202 controls the local switch 204 to switch the connection between the host I/F unit 201 and the 6-ports switch 102.

The memory 203 stores the control program which is executed by the processor 202. Further, data required when the processor 202 executes the control program may be stored in the memory 203.

The local switch 204 is connected to the respective host I/F units 201, the processor 202, the memory 203, and the 6-ports switch 102 and serves as a switch for switching the connections among them. The switch 102 communicates with the respective host I/F units 201 via the local switch 204.

In the present embodiment, since the storage control unit 10 has the 6-ports switch 102, the local switch 204 may have only one port which is connected to the 6-ports switch 102. Further, when the storage control unit has a 10-ports switch (see the third embodiment of the invention), the local switch 204 may have only one port which is connected to the 10-ports switch. However, when the storage control unit has an 8-ports switch (see the second embodiment of the invention), the local switch 204 needs to have two ports which are connected to the two 8-ports switches respectively.

Figure 3:
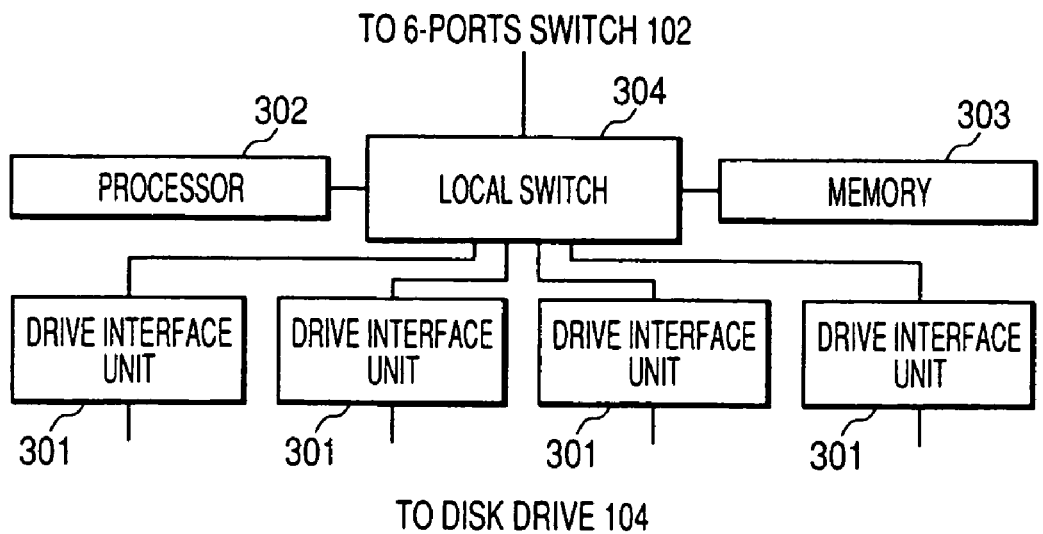
FIG. 3 is a block diagram showing a configuration of a drive control unit according to the first embodiment of the invention.

FIG. 3 is a block diagram showing the configuration of the drive control unit 103 according to the first embodiment of the invention.

The drive control unit 103 has drive I/F units 301, a processor 302, a memory 303, and a local switch 304.

The drive I/F units 301 are connected to the disk drives 104 and serves as interfaces which process the communication for access to the disk drives. For the communication, the predetermined protocol described with reference to FIG. 1 is used. The respective drive control units 103 may have the arbitrary number of the drive I/F units 301. In the present embodiment, the respective drive control units 103 have four drive I/F units 301.

The processor 302 executes a control program stored in the memory 303 to control the operation of the drive control unit 103. Specifically, the processor 302 controls the communication with the disk drives 104 by the respective drive I/F units 301. Further, the processor 302 controls the local switch 304 to switch the connections between the drive I/F units 301 and the 6-ports switch 102.

The memory 303 stores the control program which is executed by the processor 302. Further, data required when the processor 302 executes the control program may be stored in the memory 303.

The local switch 304 is connected to the respective drive I/F units 301, the processor 302, the memory 303, and the 6-ports switch 102 and serves as a switch for switching the connections among them. The switch 102 communicates with the respective drive I/F units 301 via the local switch 304.

In the present embodiment, since the storage control unit 10 has the 6-ports switch 102, the local switch 304 may have only one port which is connected to the 6-ports switch 102. Further, when the storage control unit has a 10-ports switch (see the third embodiment of the invention), the local switch 304 may have only one port which is connected to the 10-ports switch. However, when the storage control unit has an 8-ports switch (see the second embodiment of the invention), the local switch 304 needs to have two ports which are connected to the two 8-ports switches respectively.

Next, in the present embodiment, an algorithm (routing algorithm) that determines a path through which an access to the disk drives 104 from the host computers and a response thereto are transmitted will be described with reference to the drawings.

Figure 4:
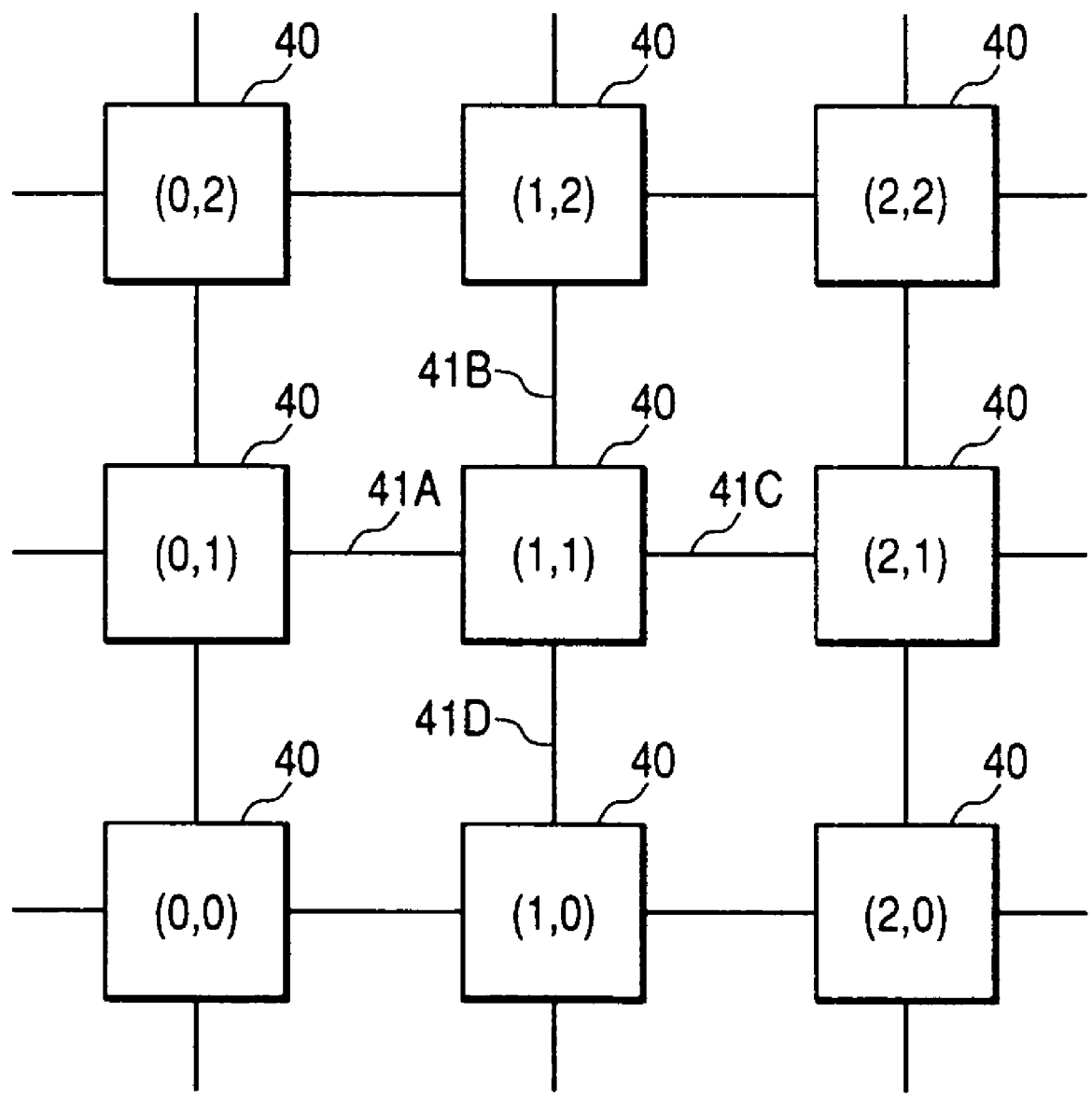
FIG. 4 is an explanatory view of the connection of the storage system according to the first embodiment of the invention.

FIG. 4 is an explanatory view of the connection of the storage system according to the first embodiment of the invention.

FIG. 4 shows a case in which the storage control units 10 shown in FIG. 1 are connected to one another in a two-dimensional lattice shape by the connection lines 110. In the present embodiment, one node 40 (storage node) corresponds to one storage control unit 10. Further, one link 41 corresponds to one connection line 110. The host computer and the disk drives 104 are not shown. Further, an internal configuration of the storage control unit 10 is not shown.

A value (0, 0) and the like represented on the respective nodes 40 shown in FIG. 4 denote two-dimensional addresses (coordinates) of the respective nodes 40. The respective nodes 40 arranged in the two-dimensional lattice shape are identified by the two-dimensional addresses. In FIG. 4, when an address of any node 40 is set to (x, y), a value of x is larger than a value of x of an adjacent node 40 on the left side of the node 40 by 1. Further, a value of y of any node 40 is larger than a value of y of an adjacent node 40 on the lower side of the node 40 by 1. In the following description, when the respective nodes 40 need to be identified by the addresses, the respective nodes 40 are represented with the addresses attached thereto, like the node 40 (0, 0). In FIG. 4, nine nodes 40 from the node 40 (0, 0) to the node 40 (2, 2) are shown.

However, the storage system of the present embodiment may have the arbitrary number of the nodes 40.

For example, when the node 40 (1, 1) of FIG. 4 is the storage control unit 10B, the links 41A, 41B, 41C, and 41D correspond to the connection lines 110A, 110C, 110D, and 110E, respectively.

Moreover, in the following description, for convenience, among the nodes 40 arranged in the two-dimensional lattice shape, a line in a horizontal direction is referred to as 'row' and a line in a vertical direction is referred to as 'column.' For example, in FIG. 4, the nodes 40 (0, 1), (1, 1), and (2, 1) constitute one row and the nodes 40 (0, 0), (0, 1), and (0, 2) constitute one column.

Further, for convenience, a direction in which the value of x increases is referred to as 'right side' and a direction in which the value of x decreases is referred to as 'left side'. In addition, a direction in which the value of y increases is referred to as 'upper side' and a direction in which the value of y decreases is referred to as 'lower side'. For example, the node 40 (1, 0) is positioned on the right side of the node 40 (0, 0) and the node 4 (0, 1) is positioned on the lower side of the node 40 (0, 2).

FIGS. 5A to 5D are explanatory views of packets which are used in the storage system according to the first embodiment of the invention.

In the present embodiment, an access request (read request or write request) and a response are transmitted and received as packets 50 via the link 41 by the nodes 40.

Figures 5A, 5B, 5C, 5D:
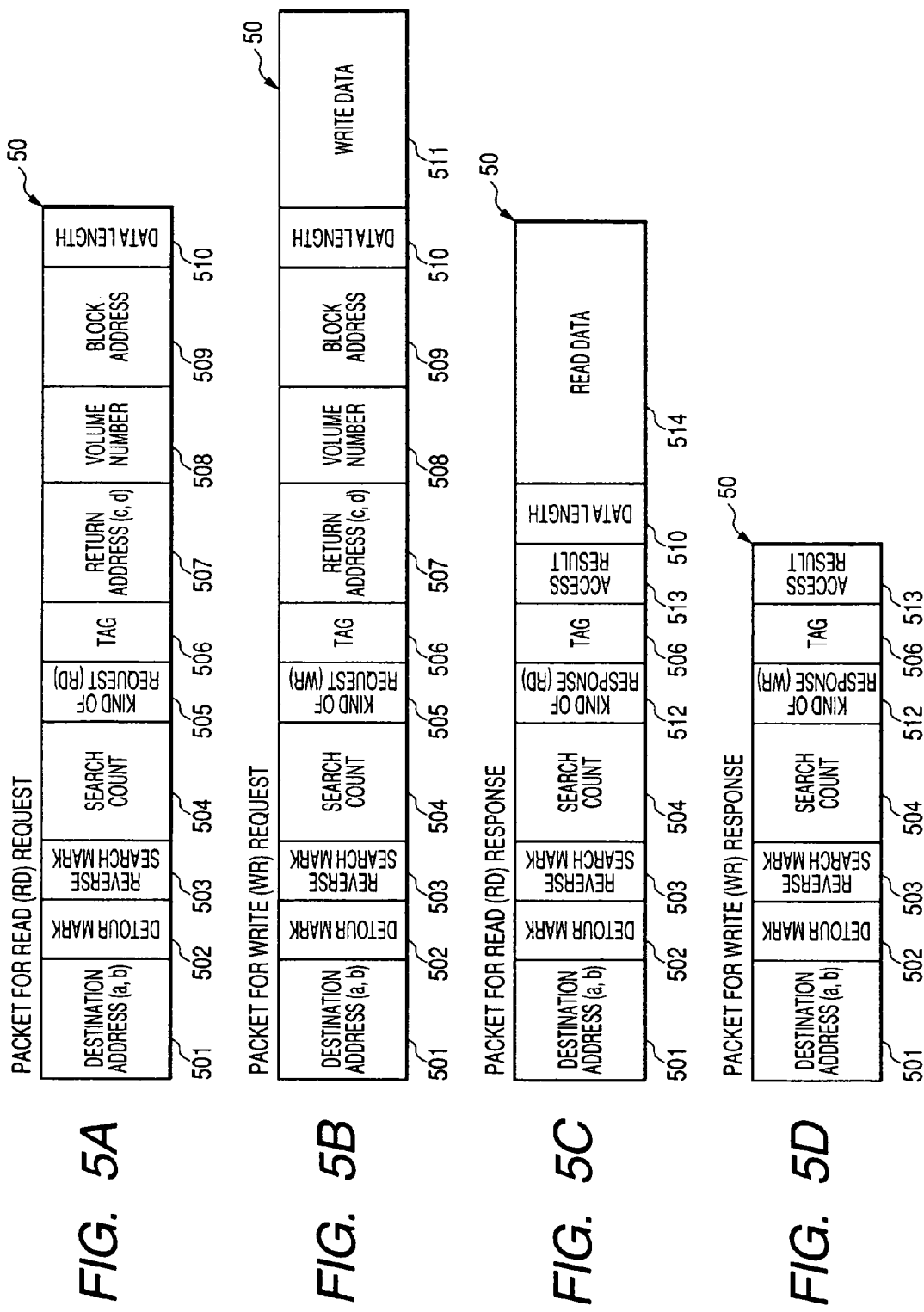
FIG. 5A is an explanatory view of a packet which is used in the storage system according to the first embodiment of the invention.
FIG. 5B is an explanatory view of a packet which is used in the storage system according to the first embodiment of the invention.
FIG. 5C is an explanatory view of a packet which is used in the storage system according to the first embodiment of the invention.
FIG. 5D is an explanatory view of a packet which is used in the storage system according to the first embodiment of the invention.

FIGS. 5A and 5B are explanatory views of the packets 50 for the access requests (read request and write request). FIGS. 5C and 5D are explanatory views of the packets 50 for the responses.

FIG. 5A is an explanatory view of the packet 50 for the read request.

The packet 50 for the read request includes regions of a destination address 501, a detour mark 502, a reverse search mark 503, a search count 504, a kind of request 505, a tag 506, a return address 507, a volume number 508, a block address 509, and a data length 510.

The destination address 501 is a two-dimensional address (a, b) of a destination node 40 of the packet 50. Specifically, the destination address 501 is an address of the node 40 to which the disk drives 104, which stores data required for the read request, is connected.

The detour mark 502 is a flag indicating whether or not a detour is executed. The detour is referred to as a process of transmitting the packet 50 away from a faulty node 40 or link 41. The detour will be described later in detail.

The value of the detour mark 502 is 'valid' when the detour is executed and is 'invalid' when the detour is not executed. For example, when the detour mark 502 is an one-bit region, the value '1' may correspond to 'valid' and the value '0' may correspond to 'invalid'. In the following description, when the detour mark 502 is setting to 'valid', it is referred to as 'adding the detour mark'. Further, when the detour mark 502 is setting to 'invalid', it is referred to as 'erasing the detour mark'.

The reverse search mark 503 is a flag indicating a direction of a search which is being executed. The search is referred to as a process of trying the transmission of the packet 50 via another link 41, which reaches the destination node 40, when the link 41 which reaches the destination node 40 has a fault. The search will be described later in detail.

The value of the reverse search mark 503 is 'valid' when a clockwise search is executed and is 'invalid' when a counter-clockwise search is executed. For example, when the reverse search mark 503 has a one-bit region, the value '1' may correspond to 'valid' and the value '0' may correspond to 'invalid'. In the following description, when the reverse search mark 503 is setting to 'valid', it is referred to as 'adding the reverse search mark'. Further, when the reverse search mark 503 is setting to 'invalid', it is referred to as 'erasing the reverse search mark'.

The search count 504 represents how many times the packet 50 is transmitted after the search begins. When the search does not begin, the value of the search count 504 is '0'. If the value of the search count 504 is larger than '8' and the packet 50 does not yet reach the destination node 40, the destination node 40 or all links 41 to the destination node 40 has a fault.

The kind of request 505 represents either the read request or the write request. When the packet 50 is for the read request, the kind of request 505 has a value indicating the read request.

The tag 506 is an unique identifier to identify an access request of the host computer which issues the access request with respect to the packet 50. In the packet 50 for the read request, the tag 506 is an unique identifier to identify the read request of the host computer which issues the read request.

The return address 507 is a two-dimensional address (c, d) of a return node 40 of a packet 50 for a response to the packet 50 for the access request. In the packet 50 for the read request, the return address 507 is an address of a node 40 to which the host computer, which issues the read request, is connected.

The volume number 508 is a number of the disk drive 104 which stores data required for the access request. The volume number 508 may be a number of a logical volume in which data required for the access request is stored. The logical volume is a storage area which is recognized as a logical disk drive by the host computer. In the packet 50 for the read request, the volume number 508 is the number of the disk drive 104 or the number of the logical volume in which data required for the read request is stored.

The block address 509 is an address indicating a storage area (for example, a logical block) on the disk drive 104 or in the logical volume in which data required for the access request is stored. In the packet 50 for the read request, the block address 509 is an address of a logical block on the disk drive 104 or in the logical volume in which data required for the read request is stored.

The data length 510 is a length of data required for the access request. For example, the data length 510 may represent the number of the logical blocks. In the packet 50 for the read request, the data length 510 is a length of data required for the read request.

FIG. 5B is an explanatory view of the packet 50 for the write request.

The packet 50 for the write request includes regions of a destination address 501, a detour mark 502, a reverse search mark 503, a search count 504, a kind of request 505, a tag 506, a return address 507, a volume number 508, a block address 509, a data length 510, and write data 511. Hereinafter, the respective regions of the packet 50 for the write request will be described. However, the descriptions of the same portions as those of the packet 50 for the read request will be omitted.

The destination address 501 is a two-dimensional address of the node 40 to which the disk drives 104, which stores the target data of the write request, is connected.

The kind of request 505 indicates that the packet 50 is the packet 50 for the write request.

The tag 506 is an unique identifier to identify a write request of the host computer which issues the write request.

The return address 507 is an address of a node 40 to which the host computer, which issues the write request, is connected.

The volume number 508 is a number of a disk drive 104 or a number of a logical volume in which the target data of the write request is stored.

The block address 509 is an address of a logical block on the disk drive 104 or in the logical volume in which the target data of the write request is stored.

The data length 510 is a length of data of the write request.

Write data 511 is data of the write request, that is, which is written according to the write request.

FIG. 5C is an explanatory view of the packet 50 for the read response.

The packet 50 for the read response is created by a node 40, which executes the requested read operation (that is, the node 40 which reads data required for the read request from the disk drives 104), and is returned to the request source node 40.

The packet 50 for the read response includes regions of a destination address 501, a detour mark 502, a reverse search mark 503, a search count 504, a kind of response 512, a tag 506, an access result 513, a data length 510, and read data 514. Hereinafter, the respective regions of the packet 50 for the read response will be described. However, the descriptions of the same portions as those of the packet 50 for the access request will be omitted.

The destination address 501 is a two-dimensional address of the node 40 to which the host computer, which issues the read request corresponding to the packet 50 for the read response, is connected. Specifically, the value of the destination address 501 is the same as the value of the return address 507 of the corresponding packet 50 for the read request.

The kind of response 512 indicates that the packet 50 for the response is either the packet 50 for the read response or the packet 50 for the write response.

The tag 506 is an unique identifier to identify the read request of the host computer for the response. Specifically, the value of the tag 506 is the same as the value of the tag 506 of the packet 50 for the read request corresponding to the packet 50 for the read response.

The access result 513 indicates whether or not the requested access is successful. When the access fails, the access result 513 may include information regarding a state of failure (a kind of error).

Read data 514 is data which is read by the read request.

FIG. 5D is an explanatory view of the packet 50 for the write response.

The packet 50 for the write response is created by a node 40, which executes the requested write operation (that is, the node 40 which writes data of the write request into the disk drives 104) and is returned to the request source node 40.

The packet 50 for the write response includes regions of a destination address 501, a detour mark 502, a reverse search mark 503, a search count 504, a kind of response 512, a tag 506, and an access result 513. Hereinafter, the respective regions of the packet 50 for the write response will be described. However, the descriptions of the same portions as those of the packet 50 for the read response will be omitted.

The destination address 501 is a two-dimensional address of the node 40 to which the host computer, which issues the write request corresponding to the packet 50 for the write response, is connected. Specifically, the value of the destination address 501 is the same as the value of the return address 507 of the corresponding packet 50 for the write request.

The tag 506 is an unique identifier to identify the write request of the host computer for the response. Specifically, the value of the tag 506 is the same as the value of the tag 506 of the packet 50 for the write request corresponding to the packet 50 for the write response.

Figure 6:
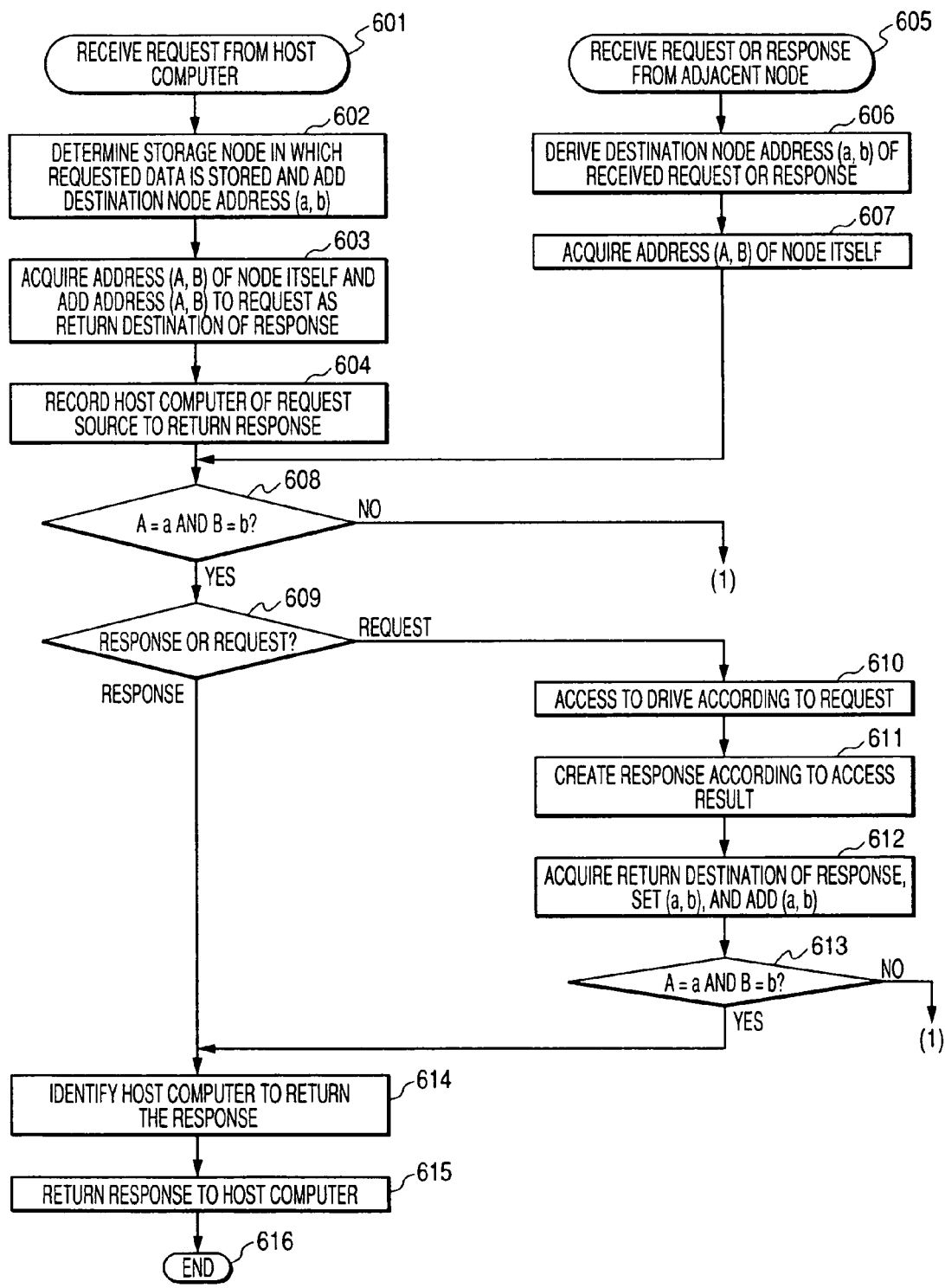
FIG. 6 is a flowchart of a basic routing algorithm according to the first embodiment of the invention.

FIG. 6 is a flowchart of a basic routing algorithm according to the first embodiment of the invention.

The flowchart of FIG. 6 shows a procedure of a process to be executed by the node 40 which receives the request or the response, when the node 40 receives the access request to data in any disk drives 104 from a host computer connected thereto (601), when the node 40 receives the access request to data in any disk drives 104 from another adjacent node 40 (605), or when the node 40 receives the response to any host computer from another adjacent node 40 (605). This process is performed provided that the node 40 or link 41 has no faults.

Moreover, this process is executed by a processor in the node 40 (that is, the storage control unit 10). Specifically, this process may be executed by any one of the processor 201 of the host interface control unit 101, the processor 302 of the drive control unit 103, the processor (not shown) of the 6-ports switch 102, and other processors (not shown). Further, transmission and reception of the packet 50 between the nodes 40 are executed by the 6-ports switches 102 of the respective nodes 40.

When receiving the access (write or read) request to data in any disk drives 104 from a host computer connected to the node 40 (A, B), the node 40 begins the process of FIG. 6 (601). If the process begins, the node 40 (A, B) specifies the destination node 40 (a, b) of the access request (that is, the node 40 which is connected to the disk drives 104 in which data required for the access request is stored (or into which data is written)) and adds the address (a, b) of the node 40 (a, b) to the access request (602). Specifically, the destination address 501 of the packet 50 for the access request is set to the address (a, b).

Next, the node 40 (A, B) acquires an address (A, B) of its own (that is, the node 40 which is executing the process of FIG. 6) and adds the address (A, B) to the access request as the return destination for the response (603). Specifically, the return address 507 of the packet 50 for the access request is set to the address (A, B).

Next, in order to return the response, the requesting host computer is recorded (604). Specifically, the tag 506 of the packet 50 for the access request is set to the value to uniquely identify the access request of the requesting host computer.

Next, the process progresses to a step 608.

On the other hand, when receiving the access request to data in any disk drives 104 from another adjacent node 40 or when receiving the response to any host computer from another adjacent node 40, the node 40 (A, B) begins the process of FIG. 6 (605).

If this process begins, the node 40 (A, B) acquires the address (a, b) of the destination node 40 (a, b) of the received request or response (606). Specifically, the node 40 (A, B) acquires the value of the address (a, b) with reference to the destination address 501 of the packet 50 for the received request or response.

Next, the node 40 (A, B) acquires the address (A, B) of its own (607).

Then, the process progresses to a step 608.

In the step 608, the node 40 (A, B) compares the address (a, b) of the destination node 40 (a, b) to the address (A, B) of its own. Specifically, the node 40 (A, B) judges whether or not the conditions A=a and B=b are both satisfied.

In the step 608, if it is judged that the conditions A=a and B=b are not satisfied (that is, A=a or B=b is not satisfied), the node 40 (A, B) is not the destination node 40 (a, b). Therefore, in order to determine the transmission target of the received request or response, the process progresses to a step 701 of FIG. 7, which is connected to (1) of FIG. 6.

On the other hand, in the step 608, if it is judged that the conditions A=a and B=b are both satisfied, the node 40 (A, B) is the destination node 40 (a, b).

Next, the node 40 (A, B) judges whether either the response or the request is received (609). Specifically, when the node 40 (A, B) receives the access request to data in the disk drives 104 from the host computer or another adjacent node 40 (601 or 605), in the step 609, it is judged that the node 40 (A, B) receives the request. On the other hand, when the node 40 (A, B) receives the response to the host computer from another adjacent node 40 (605), in the step 609, it is judged that the node 40 (A, B) receives the response.

In the step 609, if it is judged that the node 40 (A, B) receives the response, the requesting host computer for the response is connected to the node 40 (A, B). Therefore, the node 40 (A, B) specifies the requesting host computer for the response from the host computers connected thereto (614). Specifically, the node 40 (A, B) refers to the value of the tag 506 of the packet 50 for the response to specify the host computer corresponding to the value.

Next, the node 40 (A, B) returns the response to the specified host computer (615) and ends the process (616).

On the other hand, in the step 609, if it is judged that the node 40 (A, B) receives the request, data required for the received access request is included in the disk drive 104 connected to the node 40 (A, B). Therefore, the node 40 (A, B) accesses to the disk drives 104 connected thereto according to the received access request (610).

Next, the node 40 (A, B) creates the packet 50 for the response according to the executed access result (611).

Next, the node 40 (A, B) specifies the return destination node 40 of the created packet 50 for the response and adds the address of that return destination node 40 to the packet 50 for the response as the address (a, b) of the new destination node 40 (612). Specifically, the node 40 (A, B) refers to the value of the return address 507 of the packet 50 for the access request regarding the executed access. Then, the node 40 (A, B) adds the value of the return address 507 as the destination address 501 of the created packet 50 for the response. Similarly, the node 40 (A, B) adds the value of the tag 506 of the packet 50 for the access request as the tag 506 of the packet 50 for the response.

Next, the node 40 (A, B) compares the address (a, b) of the destination node 40 (a, b) of the created response to the address (A, B) of its own. Specifically, it is judged whether or not the conditions A=a and B=b are both satisfied (613).

In the step 613, if the conditions A=a and B=b are not satisfied, the node 40 (A, B) is not the destination node 40 (a, b) of the response. Then, in order to determine the transmission target of the response, the process progresses to the step 701 of FIG. 7, which is connected to (1) of FIG. 6.

On the other hand, in the step 613, if it is judged that the conditions A=a and B=b are both satisfied, the node 40 (A, B) is the destination node 40 (a, b) of the response. Hence, the process progresses to the step 614.

The process after the step 614 is as described above.

Figure 7:
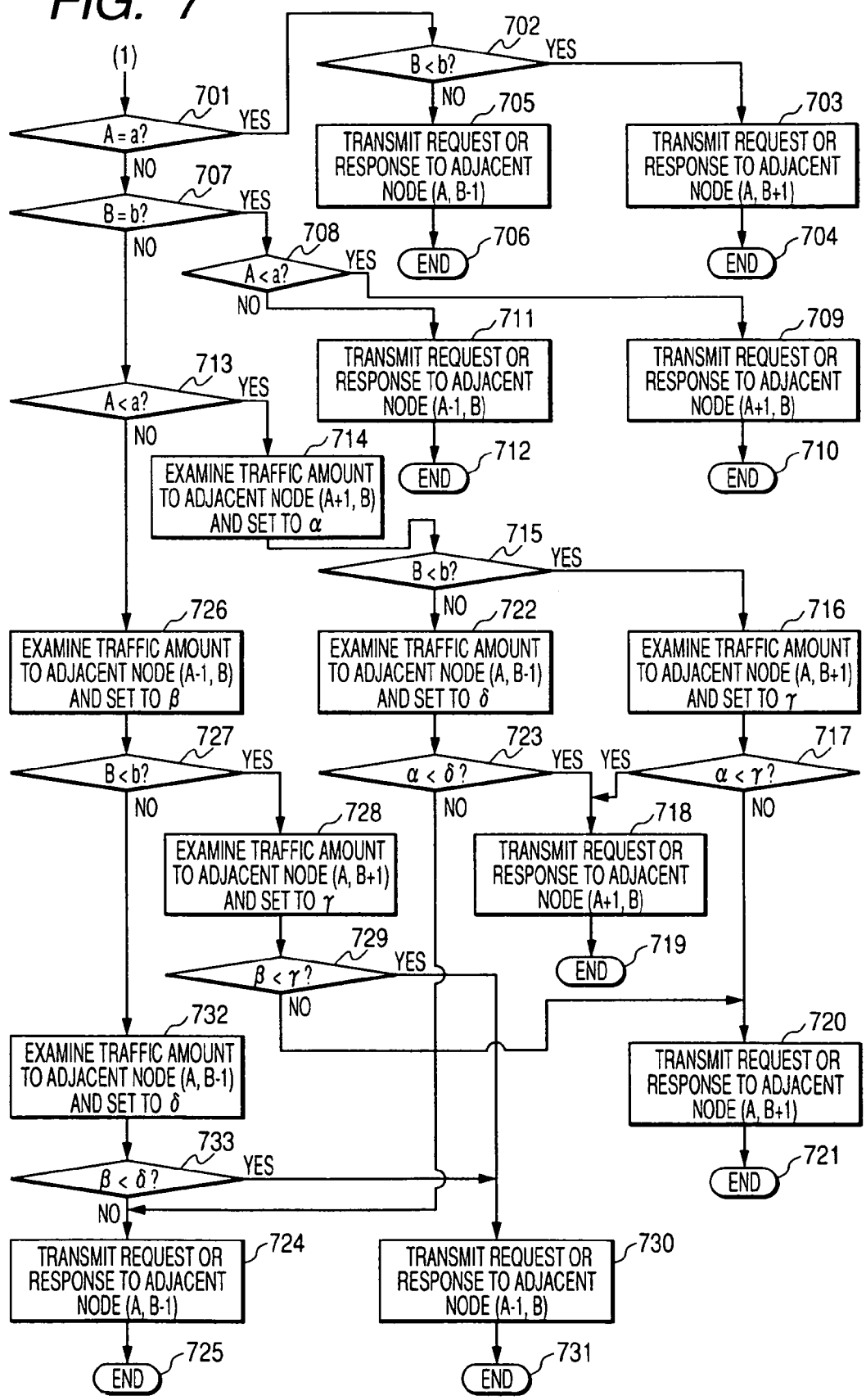
FIG. 7 is a flowchart of a process to be executed when a node 40 is not a destination node, in the basic routing algorithm according to the first embodiment of the invention.

FIG. 7 is a flowchart of a process to be executed when the node 40 (A, B) is not the destination node 40 (a, b), in the basic routing algorithm according to the first embodiment of the invention.

In the step 608 or the step 613 of FIG. 6, if it is judged that the conditions A=a and B=b are not satisfied (1), then the process progresses to the step 701. In the step 701, the node 40 (A, B) judges whether or not the condition A=a is satisfied.

If either A=a or B=b is satisfied, the destination node 40 (a, b) is in the same column or row as the node 40 (A, B). In this case, there exists the only one shortest path from the node 40 (A, B) to the destination node 40 (a, b).

In the step 701, if it is judged that the condition A=a is satisfied, the destination node 40 (a, b) is in the same column as the node 40 (A, B). Then, the node 40 (A, B) judges whether or not the condition B<b is satisfied (702).

In the step 702, if it is judged that the condition B<b is satisfied, the destination node 40 (a, b) is positioned on the upper side of the node 40 (A, B). Then, an adjacent node 40 (A, B+1) on the upper side of the node 40 (A, B) is positioned on the shortest path from the node 40 (A, B) to the destination node 40 (a, b). That is, when the request or the response is transmitted to the adjacent node 40 (A, B+1) on the upper side of the node 40 (A, B), the request or the response is closest to the destination node 40 (a, b). Thus, the node 40 (A, B) transmits the request or the response to the adjacent node 40 (A, B+1)(703). Then, the process ends (704).

On the other hand, in the step 702, when the condition B<b is not satisfied, the destination node 40 (a, b) is positioned on the lower side of the node 40 (A, B). Then, an adjacent node 40 (A, B−1) on the lower side of the node 40 (A, B) is positioned on the shortest path from the node 40 (A, B) to the destination node 40 (a, b). That is, if the request or the response is transmitted to the adjacent node 40 (A, B−1) on the lower side of the node 40 (A, B), the request or the response is closest to the destination node 40 (a, b). Therefore, the node 40 (A, B) transmits the request or the response to the adjacent node 40 (A, B−1)(705). Then, the process ends (706).

In the step 701, if it is judged that the condition A=a is not satisfied, the destination node 40 (a, b) is not in the same column as the node 40 (A, B). Then, the node 40 (A, B) judges whether or not the condition B=b is satisfied (707).

In the step 707, if it is judged that the condition B=b is satisfied, the destination node 40 (a, b) is in the same row as the node 40 (A, B). Then, the node 40 (A, B) judges whether or not the condition A<a is satisfied (708).

In the step 708, if it is judged that the condition A<a is satisfied, the destination node 40 (a, b) is positioned on the right side of the node 40 (A, B). Then, an adjacent node 40 (A+1, B) on the right side of the node 40 (A, B) is positioned on the shortest path from the node 40 (A, B) to the destination node 40 (a, b). That is, if the request or the response is transmitted to the adjacent node 40 (A+1, B) on the right side of the node 40 (A, B), the request or the response is closest to the destination node 40 (a, b). Thus, the node 40 (A, B) transmits the request or the response to the adjacent node 40 (A+1, B)(709). Then, the process ends (710).

On the other hand, in the step 708, if it is judged that the condition A<a is satisfied, the destination node 40 (a, b) is positioned on the left side of the node 40 (A, B). Then, an adjacent node 40 (A−1, B) on the left side of the node 40 (A, B) is positioned on the shortest path from the node 40 (A, B) to the destination node 40 (a, b). That is, if the request or the response is transmitted to the adjacent node 40 (A−1, B) on the left side of the node 40 (A, B), the request or the response is closest to the destination node 40 (a, b). Thus, the node 40 (A, B) transmits the request or the response to the adjacent node 40 (A−1, B)(711). Then, the process ends (712).

In the step 707, if it is judged that the condition B=b is not satisfied, the destination node 40 (a, b) is not in the same row or column as the node 40 (A, B). In this case, there are the two different shortest paths from the node 40 (A, B) to the destination node 40 (a, b). Then, the node 40 (A, B) judges whether or not the condition A<a is satisfied (713).

In the step 713, if it is judged that the condition A<a is satisfied, the destination node 40 (a, b) is positioned on the right side (upper right side or lower right side) of the node 40 (A, B). That is, the adjacent node 40 (A+1, B) on the right side is positioned on one of the two shortest paths from the node 40 (A, B) to the destination node 40 (a, b). Then, the node 40 (A, B) measures the traffic amount α with the adjacent node 40 (A+1, B) on the right side (714).

Next, the node 40 (A, B) judges whether or not the condition B<b is satisfied (715).

In the step 715, if it is judged that the condition B<b is satisfied, the destination node 40 (a, b) is positioned on the upper side (upper right side or upper left side) of the node 40 (A, B). That is, the adjacent node 40 (A, B+1) on the upper side is positioned on one of the two shortest paths from the node 40 (A, B) to the destination node 40 (a, b). Then, the node 40 (A, B) measures the traffic amount γ with the adjacent node 40 (A, B+1) on the upper side (716).

As a result, with combining the judgment results in the steps 713 and 715, the destination node 40 (a, b) is positioned on the upper right side of the node 40 (A, B).

Therefore, even when the request or the response is transmitted to either the adjacent node 40 (A+1, B) on the right side of the node 40 (A, B) or the adjacent node 40 (A, B+1) on the upper side of the node 40 (A, B), the request or the response is closest to the destination node 40 (a, b). The node 40 (A, B) may transmits the request or the response to either the adjacent node 40 (A+1, B) on the right side or the adjacent node 40 (A, B+1) on the upper side.

However, when there is a difference between the measured traffic amounts α and γ, in order to enhance a data transmission rate, the request or the response may be transmitted to the adjacent node 40 having the smaller traffic amount. Then, the node 40 (A, B) compares the traffic amounts and selects the adjacent node 40 having the smaller traffic amount as the transmission target.

Moreover, when the destination node 40 (a, b) is positioned on the lower right side, the upper left side, or the lower left side of the node 40 (A, B), similarly, the adjacent node 40 having the smaller traffic amount is selected as the transmission target.

The node 40 (A, B) judges whether or not the condition the traffic amount α<the traffic amount γ is satisfied (717).

In the step 717, if it is judged that the condition α<γ is satisfied, the node 40 (A, B) transmits the request or the response to the adjacent node 40 (A+1, B) on the right side (718). Then, the process ends (719).

On the other hand, in the step 717, if it is judged that the condition α<γ is not satisfied (that is, γ is equal to or less than α), the node 40 (A, B) transmits the request or the response to the adjacent node 40 (A, B+1) on the upper side (720). Then, the process ends (721).

In the step 715, if it is judged that the condition B<b is not satisfied, the destination node 40 (a, b) is positioned on the lower side (lower right side or lower left side) of the node 40 (A, B). That is, the adjacent node 40 (A, B−1) on the lower side is positioned on one of the two shortest paths from the node 40 (A, B) to the destination node 40 (a, b). Then, the node 40 (A, B) measures the traffic amount δ with the adjacent node 40 (A, B−1) on the lower side (722).

As a result, with combining the judgment results in the steps 713 and 715, the destination node 40 (a, b) is positioned on the lower right side of the node 40 (A, B).

Then, the node 40 (A, B) judges whether or not the condition the traffic amount α<the traffic amount δ is satisfied (723).

In the step 723, if it is judged that the condition α<δ is satisfied, the node 40 (A, B) transmits the request or the response to the adjacent node 40 (A+1, B) on the right side (718). Then, the process ends (719).

On the other hand, in the step 723, if it is judged that the condition α<δ is not satisfied (that is, δ is equal to or less than α), the node 40 (A, B) transmits the request or the response to the adjacent node 40 (A, B−1) on the lower side (724). Then, the process ends (725).

In the step 713, if it is judged that the condition A<a is not satisfied, the destination node 40 (a, b) is positioned on the left side (upper left side or lower left side) of the node 40 (A, B). That is, the adjacent node 40 (A−1, B) on the left side is positioned on one of the two shortest paths from the node 40 (A, B) to the destination node 40 (a, b). Then, the node 40 (A, B) measures the traffic amount β with the adjacent node 40 (A−1, B) on the left side (726).

Next, the node 40 (A, B) judges whether or not the condition B<b is satisfied (727).

In the step 727, if it is judged that the condition B<b is satisfied, the destination node 40 (a, b) is positioned on the upper side (upper right side or upper left side) of the node 40 (A, B). That is, the adjacent node 40 (A, B+1) on the upper side is positioned on one of the two shortest paths from the node 40 (A, B) to the destination node 40 (a, b). Then, the node 40 (A, B) measures the traffic amount γ with the adjacent node 40 (A, B+1) on the upper side (728).

As a result, with combining the judgment results in the steps 713 and 727, the destination node 40 (a, b) is positioned on the upper left side of the node 40 (A, B).

Then, the node 40 (A, B) judges whether or not the condition the traffic amount β<the traffic amount γ is satisfied (729).

In the step 729, if it is judged that the condition β<γ is satisfied, the node 40 (A, B) transmits the request or the response to the adjacent node 40 (A−1, B) on the left side (730). Then, the process ends (731).

On the other hand, in the step 729, if it is judged that the condition β<γ is not satisfied (that is, γ is equal to or less than β), the node 40 (A, B) transmits the request or the response to the adjacent node 40 (A, B+1) on the upper side (720). Then, the process ends (721).

In the step 727, if it is judged that the condition B<b is not satisfied, the destination node 40 (a, b) is positioned on the lower side (lower right side or lower left side) of the node 40 (A, B). That is, the adjacent node 40 (A, B−1) on the lower side is positioned on one of the two shortest paths from the node 40 (A, B) to the destination node 40 (a, b). Then, the node 40 (A, B) measures the traffic amount δ with the adjacent node 40 (A, B−1) on the lower side (732).

As a result, with combining the judgment results in the steps 713 and 727, the destination node 40 (a, b) is positioned on the lower left side of the node 40 (A, B).

Then, the node 40 (A, B) judges whether or not the condition the traffic amount β<the traffic amount δ is satisfied (733).

In the step 733, if it is judged that the condition β<δ is satisfied, the node 40 (A, B) transmits the request or the response to the adjacent node 40 (A−1, B) on the left side (730). Then, the process ends (731).

On the other hand, in the step 733, if it is judged that the condition β<δ is not satisfied (that is, δ is equal to or less than β), the node 40 (A, B) transmits the request or the response to the adjacent node 40 (A, B−1) on the lower side (724). Then, the process ends (725).

Moreover, when the request or the response is received in the step 703, 705, 709, 711, 718, 720, 724, or 730, the adjacent node 40 which receives the request or the response begins with the step 605 in the process of FIG. 6.

Next, an example to which the routing algorithm shown in FIGS. 6 and 7 is applied will be described with reference to FIGS. 8 and 9.

Figure 8:
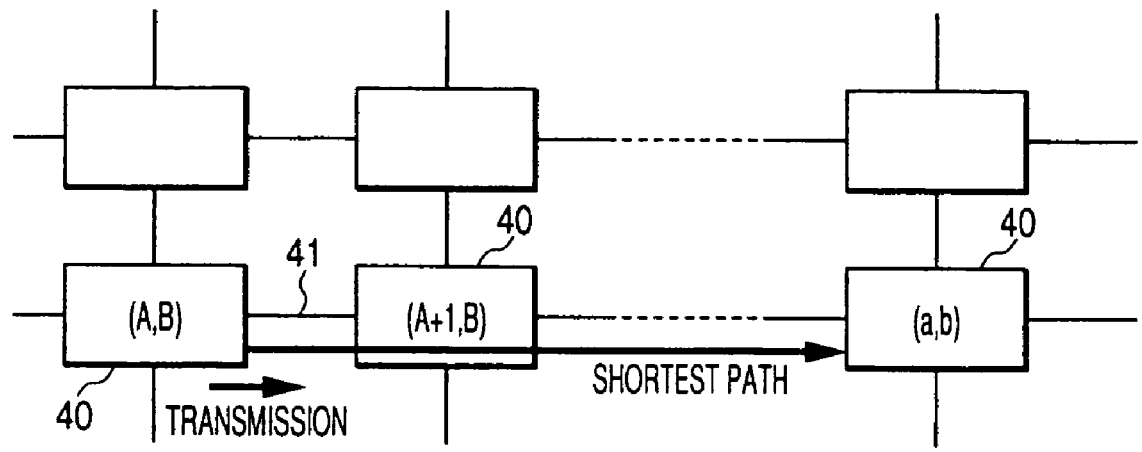
FIG. 8 is an explanatory view of an example to which the basic routing algorithm according to the first embodiment of the invention is applied.

FIG. 8 is an explanatory view of an example to which the basic routing algorithm according to the first embodiment of the invention is applied.

FIG. 8 shows a case in which the destination node 40 (a, b) is in the same row as the node 40 (A, B) and is positioned on the right side thereof.

In this case, in the step 608, it is judged that the conditions A=a and B=b are not satisfied at the same time (that is, the condition A=a or the condition B=b is not satisfied).

In the step 701, it is judged that the condition A=a is not satisfied.

In the step 707, it is judged that the condition B=b is satisfied.

In the step 708, it is judged that the condition A<a is satisfied.

In this case, there exists the only one shortest path from the node 40 (A, B) to the destination node 40 (a, b). The adjacent node 40 (A+1, B) on the right side of the node 40 (A, B) is positioned on the shortest path.

Thus, the node 40 (A, B) transmits the request or the response to the adjacent node 40 (A+1, B) on the right side (709). Then, the process end (710).

Figure 9:
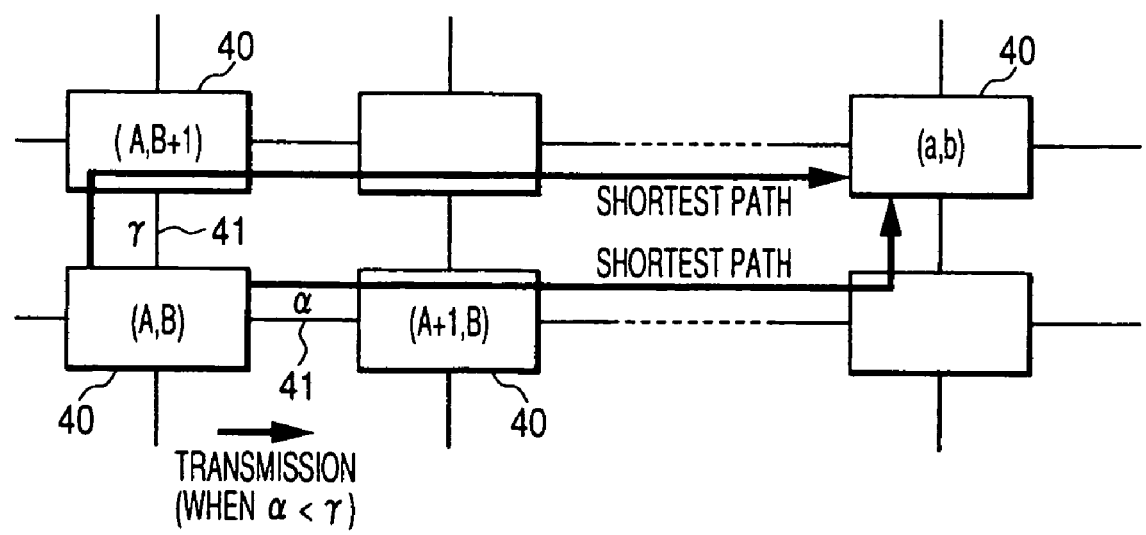
FIG. 9 is an explanatory view of another example to which the basic routing algorithm according to the first embodiment of the invention is applied.

FIG. 9 is an explanatory view of another example to which the basic routing algorithm according to the first embodiment of the invention is applied.

FIG. 9 shows a case in which the destination node 40 (a, b) is positioned on the upper right side of the node 40 (A, B).

In this case, in the step 608, it is judged that the conditions A=a and B=b are not satisfied at the same time (that is, the condition A=a or the condition B=b is not satisfied).

In the step 701, it is judged that the condition A=a is not satisfied.

In the step 707, it is judged that the condition B=b is not satisfied.

In the step 713, it is judged that the condition A<a is satisfied. Thus, the traffic amount α with the adjacent node 40 (A+1, B) on the right side is measured (714).

In the step 715, it is judged that the condition B<b is satisfied. Thus, the traffic amount γ with the adjacent node 40 (A, B+1) on the upper side is measured (716).

In this case, there are two shortest paths from the node 40 (A, B) to the destination node 40 (a, b). The adjacent node 40 (A+1, B) on the right side of the node 40 (A, B) and the adjacent node 40 (A, B+1) on the upper side thereof are positioned on the two shortest paths respectively.

In the step 717, it is judged whether or not the condition α<γ is satisfied. In the example of FIG. 9, it is assumed that α is less than γ. Therefore, in the step 717, it is judged that the condition α<γ is satisfied.

Thus, the node 40 (A, B) transmits the request or the response to the adjacent node 40 (A+1, B) on the right side (718). Then, the process end (719).

Next, a routing algorithm which takes faults of the node 40 or the link 41 into consideration will be described with reference to FIGS. 10 to 18.

Figure 10:
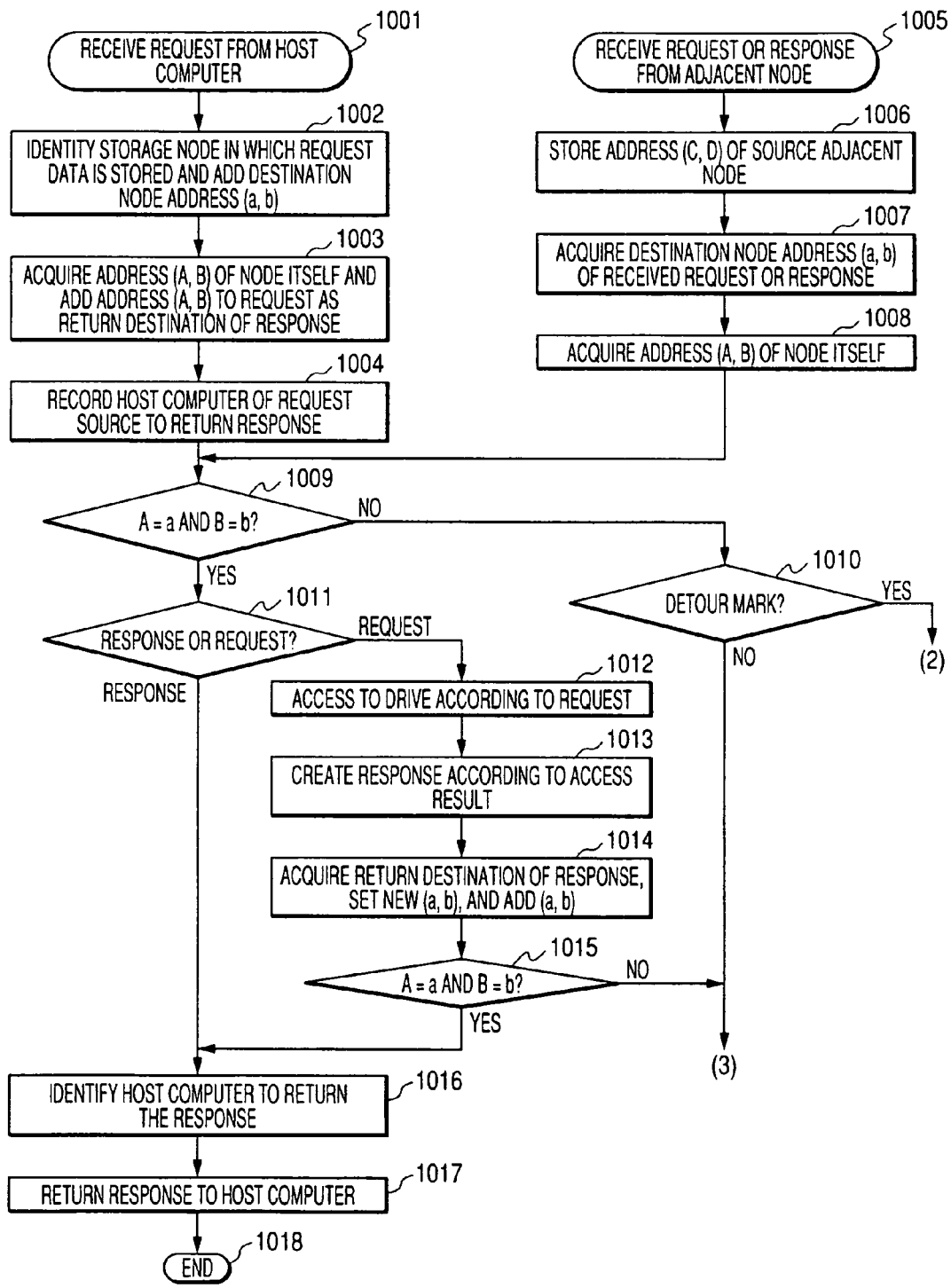
FIG. 10 is a flowchart of the routing algorithm according to the first embodiment of the invention which takes faults into consideration.

FIG. 10 is a flowchart of the routing algorithm according to the first embodiment of the invention which takes faults into consideration.

Like the process of FIGS. 6 and 7, a process shown in the flowchart of FIG. 10 is executed by the node 40 which receives the request or the response, when the node 40 receives the access request to data in any disk drives 104 from a host computer connected thereto (1001), when the node 40 receives the access request to data in any disk drives 104 from another adjacent node 40 (1005), or when the node 40 receives the response to any host computer from another adjacent node 40 (1005).

Moreover, like the process of FIGS. 6 and 7, this process is executed by the processor in the node 40 (that is, the storage control unit 10). Specifically, this process may be executed by any one of the processor 201 of the host interface control unit 101, the processor 302 of the drive control unit 103, the processor (not shown) of the 6-ports switch 102, and other processors (not shown). Further, transmission and reception of the packet 50 between the nodes 40 are executed by the 6-ports switches of the respective nodes.

As regards the descriptions of FIGS. 10 to 18, the detailed descriptions of the same portions as those of the basic routing algorithm (FIGS. 6 to 9) of the present embodiment will be omitted.

When receiving the access (write or read) request to data in the disk drives 104 from a host computer, the node 40 (A, B) begins the process of FIG. 10 (1001). If the process begins, the node 40 (A, B) specifies the destination node 40 (a, b) of the access request (that is, the node 40 which is connected to the disk drives 104, in which data required for the access request is stored (or into which data is written) and adds the address (a, b) of the node 40 to the access request (1002). Specifically, the destination address 501 of the packet 50 for the access request is set to the address (a, b).

Next, the node 40 (A, B) acquires the address (A, B) of its own (that is, the node 40 which is executing the process of FIG. 10) and adds the address (A, B) to the access request as the return address of the response (1003). Specifically, the return address 507 of the packet 50 for the access request is set to the address (A, B).

Next, in order to return the response, the requesting host computer is recorded (1004). Specifically, the value of the tag 506 of the packet 50 for the access request is set to the value to uniquely identify the access request of the requesting host computer.

Next, the process progresses to a step 1009.

On the other hand, when receiving the access request to data in any disk drives 104 from another adjacent node 40 or when receiving the response to any host computer from another adjacent node 40, the node 40 begins the process of FIG. 10 (1005).

If this process begins, the node 40 (A, B) stores the address (C, D) of the adjacent node 40 (C, D) which transmitted the received request or the received response (1006). The address (C, D) may be stored in the memory 203, the memory 303, or other memories.

Next, the node 40 (A, B) acquires the address (a, b) of the destination node 40 (a, b) of the received request or response (1007). Specifically, the node 40 (A, B) acquires the value of the address (a, b) with reference to the destination address 501 of the packet 50 for the received request or response.

Next, the node 40 (A, B) acquires the address (A, B) of its own (1008).

Then, the process progresses to a step 1009.

In the step 1009, the node 40 (A, B) compares the address (a, b) of the destination node 40 (a, b) to the address (A, B) of the node 40 (A, B). Specifically, the nodes judges whether or not the conditions A=a and B=b are both satisfied.

In the step 1009, if it is judged that the conditions A=a and B=b are not satisfied (that is, A=a or B=b is not satisfied), the node 40 (A, B) is not the destination node 40 (a, b). Then, the node 40 (A, B) judges whether or not the detour mark 502 is added to the received request or response (1010). Specifically, the node 40 (A, B) refers to the packet 50 for the received request or response and judges whether or not the detour mark 502 is added (that is, whether or not the value of the detour mark 502 is set to valid). When the transmission of the packet 50 for the request or the response fails due to some faults of some other nodes 40 or some links 41, the packet 50 is retransmitted away from the faults. In this case, the detour mark 502 is added to the retransmitted packet 50. A process when the detour mark 502 is added will be described later in detail.

In the step 1010, if it is judged that the detour mark 502 is added to the received request or response, the request or the response is transmitted away from the faults. The node 40 (A, B) needs to determine the transmission target of the request or the response by a method different from a basic method based on the basic routing algorithm described in FIGS. 6 and 7. Therefore, the process progresses to a step 1801 of FIG. 18, which is connected to (2) of FIG. 10.

Figure 11:
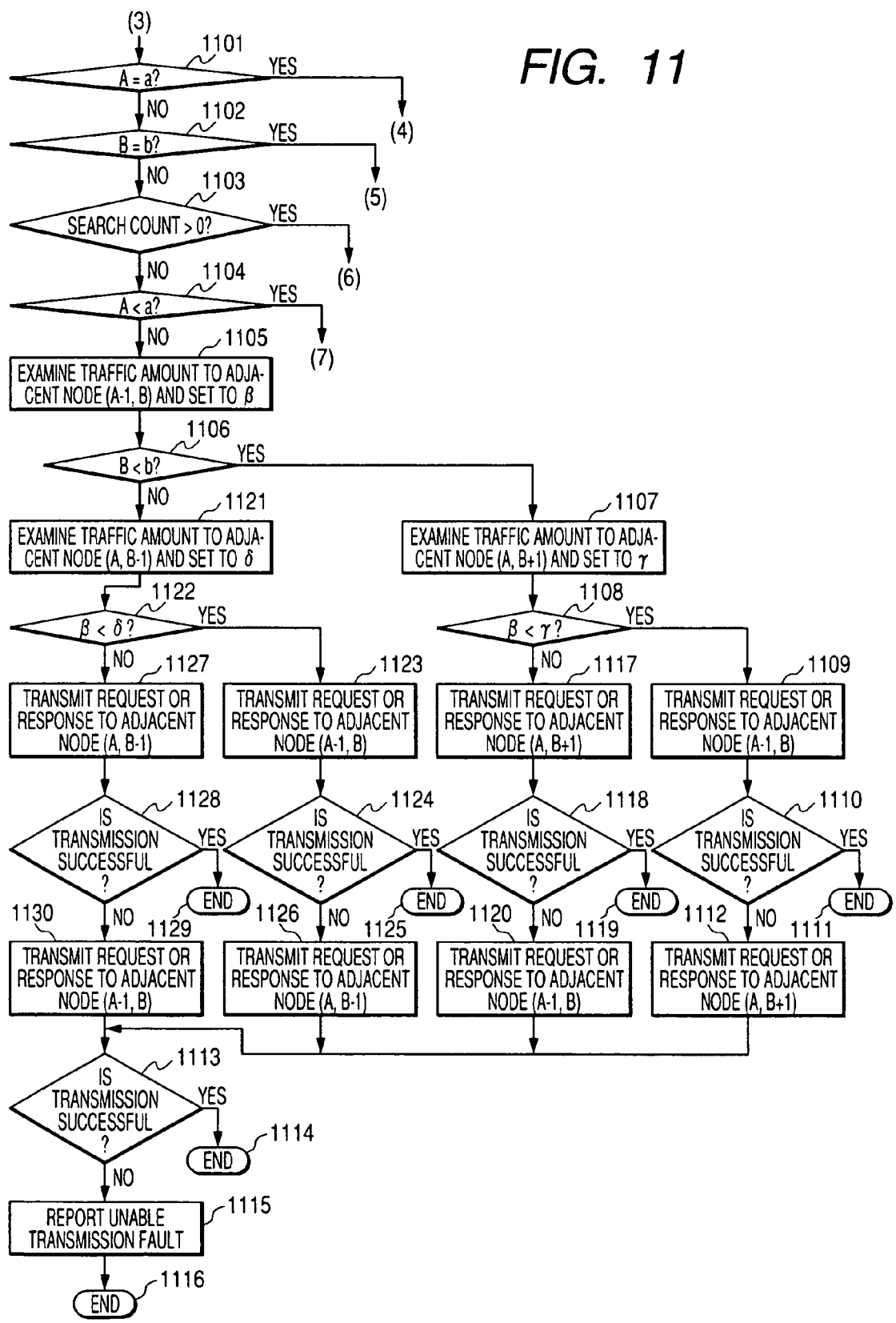
FIG. 11 is a flowchart of a process to be executed when the node is not the destination node, in the routing algorithm according to the first embodiment of the invention which takes fault into consideration.

On the other hand, in the step 1010, if it is judged that the detour mark 502 is not added to the received request or response, the process progresses to a step 1101 of FIG. 11, which is connected to (3) of FIG. 10, so as to determine the destination of the request or the response.

In the step 1009, if it is judged that the conditions A=a and B=b are both satisfied, the node 40 (A, B) is the destination node 40 (a, b).

Next, the node 40 (A, B) judges whether either the response or the request is received (1011). Specifically, when the node 40 (A, B) receives the access request to data in the disk drives 104 from a host computer connected thereto or another adjacent node 40 (1001 or 1005), in the step 1011, it is judged that the node 40 (A, B) receives the request. On the other hand, when the node 40 (A, B) receives the response to a host computer from another adjacent node 40 (1005), in the step 1011, it is judged that the node 40 (A, B) receives the response.

In the step 1011, if it is judged that the node 40 (A, B) receives the response, the requesting host computer for the response is connected to the node 40 (A, B). Therefore, the node 40 (A, B) specifies the requesting host computer for the response from the host computers connected to the node 40 (A, B)(1016). Specifically, the node 40 (A, B) refers to the value of the tag 506 of the packet 50 for the response and specifies the host computer corresponding to that value.

Next, the node 40 (A, B) returns the response to the specified host computer (1017) and ends the process (1018).

On the other hand, in the step 1011, if it is judged that the node 40 (A, B) receives the request, data required for the received access request is included in the disk drives 104 connected to the node 40 (A, B). Therefore, the node 40 (A, B) accesses to the disk drives 104 connected thereto according to the received access request (1012).

Next, the node 40 (A, B) creates the packet 50 for the response according to the executed access result (1013).

Next, the node 40 (A, B) specifies the return destination node 40 of the created packet 50 for the response and adds the address of that return destination node 40 to the packet 50 for the response as the address (a, b) of the new destination node 40 (1014). Specifically, the node 40 (A, B) refers to the value of the return address 507 of the packet 50 for the access request regarding the executed access. Then, the node 40 (A, B) adds the value of the return address 507 as the destination address 501 of the created packet for the response. Similarly, the node 40 (A, B) adds the value of the tag 506 of the packet 50 for the access request as the tag 506 of the packet 50 for the response.

Next, the node 40 (A, B) compares the address (a, b) of the destination node 40 (a, b) to the address (A, B) of its own. Specifically, it is judged whether or not the conditions A=a and B=b are both satisfied (1015).

In the step 1015, if it is judged that the conditions A=a and B=b are not satisfied, the node 40 (A, B) is not the destination node 40 (a, b). Then, in order to determine the transmission target of the response, the process progresses to the step 1101 of FIG. 11, which is connected to (3) of FIG. 10.

On the other hand, in the step 1015, if it is judged that the conditions A=a and B=b are both satisfied, the node 40 (A, B) is the destination node 40 (a, b). Hence, the process progresses to the step 1016.

The process after the step 1016 is as described above.

FIG. 11 is a flowchart of a process to be executed when the node 40 (A, B) is not the destination node 40 (a, b), in the routing algorithm according to the first embodiment of the invention which takes faults into consideration.

In the step 1010 of FIG. 10, if it is judged that the detour mark 502 is not added, or, in the step 1015 of FIG. 10, if it is judged that the conditions A=a and B=b are not satisfied (3), then the process progresses to the step 1101. In the step 1101, the node 40 (A, B) judges whether or not the condition A=a.

In the step 1101, if it is judged that the condition A=a is satisfied, the destination node 40 (a, b) is in the same column as the node 40 (A, B). Then, the process progresses to a step 1501 of FIG. 15, which is connected to (4) of FIG. 11, so as for the node 40 (A, B) to determine whether the request or the response is transmitted to either the upper-side adjacent node 40 (A, B+1) or the lower-side adjacent node 40 (A, B−1).

On the other hand, in the step 1101, if it is judged that the condition A=a is not satisfied, the destination node 40 (a, b) is not in the same column as the node 40 (A, B). Then, the node 40 (A, B) judges whether or not the condition B=b is satisfied (1102).

In the step 1102, if it is judged that the condition B=b is satisfied, the destination node 40 (a, b) is in the same row as the node 40 (A, B). Then, the process progresses to a step 1601 of FIG. 16, which is connected to (5) of FIG. 11, so as for the node 40 (A, B) to determined whether the request or the response is transmitted to either the right-side adjacent node 40 (A+1, B) or the left-side adjacent node 40 (A−1, B).

On the other hand, in the step 1102, if it is judged that the condition B=b is not satisfied, the destination node 40 (a, b) is not in the same row or column as the node 40 (A, B) Then, the node 40 (A, B) judges whether or not the condition the search count>0 is satisfied (1103).

The search is an operation which searches another usable link 41 when the link 41 of the shortest path to the destination node 40 (a, b) has a fault. The search count represents how many times the request or the response is transmitted after the search begins. If the search count is 0 (zero), it means that the search has not begin yet.

As described later, when the reverse search mark 503 is added to the request or the response, an usable link 41 is searched in a counterclockwise direction. On the other hand, when the reverse search mark 503 is not added to the request or the response, an usable link 41 is searched in a clockwise direction.

For example, when the relationship between the destination node 40 (a, b) and the node 40 (A, B) satisfies the condition a=A and b=B+1, the destination node 40 (a, b) is adjacent to the node 40 (A, B) on the upper side. When the link 41 between these nodes 40 has some faults and the reverse search mark 503 is not added, the node 40 (A, B) transmits the request or the response to the adjacent node 40 (A+1, B) on the right side. The adjacent node 40 (A+1, B)

which receives the request or the response forwards the request or the response to another node 40 (A+1, B+1) adjacent to itself on its upper side. Since this another node 40 (A+1, B+1) which receives the request or the response is adjacent to the destination node 40 (a, b) on the left side, the node 40 (A+1, B+1) further forward the received request or response to that destination node 40 (a, b) on the left side. If this transmission is successful, the request or the response reaches the destination node 40 (a, b). When this transmission fails, other links 41 to the destination node 40 (a, b) are searched in the counterclockwise direction.

Further, as described later, when the value of the search count is larger than '8' while the request or the response does not reach the destination node 40 (a, b), it means that all the transmissions have failed over all links 41 to the destination node 40 (a, b). In this case, an unable transmission (unreachable node) fault is reported and the search ends.

In the step 1103, if it is judged that the condition the search count>0 is satisfied, the search is being executed. In this case, the process progresses to a step 1301 of FIG. 13, which is continued from (6) of FIG. 11.

On the other hand, in the step 1103, if it is judged that the condition the search count>0 is not satisfied, the search has not begin yet. Because the destination node 40 (a, b) is not in the same row or column as the node 40 (A, B), there are two shortest paths from the node 40 (A, B) to the destination node 40 (a, b). In this case, the node 40 (A, B) judges whether or not the condition A<a is satisfied (1104).

In the step 1104, if it is judged that the condition A<a is satisfied, the destination node 40 (a, b) is positioned on the right side (upper right side or lower right side) of the node 40 (A, B). That is, the adjacent node 40 (A+1, B) on the right side is positioned on one of the two shortest paths from the node 40 (A, B) to the destination node 40 (a, b). Then, in order to specify the position of the destination node 40 (a, b) further, the process progresses to a step 1201 of FIG. 12, which is connected to (7) of FIG. 11.

On the other hand, in the step 1104, if it is judged that the condition A<a is not satisfied, the destination node 40 (a, b) is positioned on the left side (upper left side or lower left side) of the node 40 (A, B). That is, the adjacent node 40 (A−1, B) on the left side is positioned on one of the two shortest paths from the node 40 (A, B) to the destination node 40 (a, b). Then, the node 40 (A, B) measures the traffic amount β with the adjacent node 40 (A−1, B) on the left side (1105).

Next, the node 40 (A, B) judges whether or not the condition B<b is satisfied (1106).

In the step 1106, if it is judged that the condition B<b is satisfied, the destination node 40 (a, b) is positioned on the upper side (upper right side or upper left side) of the node 40 (A, B). That is, the adjacent node 40 (A, B+1) on the upper side is positioned on one of the two shortest paths from the node 40 (A, B) to the destination node 40 (a, b). Then, the node 40 (A, B) measures the traffic amount γ with the adjacent node 40 (A, B+1) on the upper side (1107).

As a result, with combining the judgment results in the steps 1104 and 1106, the destination node 40 (a, b) is positioned on the upper left side of the node 40 (A, B).

That is, even if the request or the response is transmitted to either the adjacent node 40 (A−1, B) on the left side or the adjacent node 40 (A, B+1) on the upper side of the node 40 (A, B), the request or the response is closest to the destination node 40 (a, b). The node 40 (A, B) may transmit the request or the response to either the adjacent node 40 (A−1, B) on the left side or the adjacent node 40 (A, B+1) on the upper side.

However, when there is a difference between the measured traffic amounts β and γ, in order to enhance a data transmission rate, the request or the response may be transmitted to the adjacent node 40 having the smaller traffic amount. Then, the node 40 (A, B) compares the traffic amounts and selects the adjacent node 40 having the smaller traffic amount as the transmission target.

Here, when the request or the response cannot be transmitted to the selected adjacent node 40 due to some faults of the adjacent node 40 or the link 41, the request or the response may be transmitted to the other adjacent node 40 having the larger traffic amount.

Moreover, even when the destination node 40 (a, b) is positioned on the lower right side, the upper right side, or the lower left side of the node 40 (A, B), similarly, the adjacent node 40 having the smaller traffic amount is selected as the transmission target. Further, when the request or the response cannot be transmitted to the selected adjacent node 40 due to some faults, the request or the response may be transmitted to the other adjacent node 40 having the larger traffic amount.

Then, the node 40 (A, B) judges whether or not the condition the traffic amount β<the traffic amount γ is satisfied (1108).

In the step 1108, if it is judged that the condition β<γ is satisfied, the node 40 (A, B) transmits the request or the response to the adjacent node 40 (A−1, B) on the left side (1109).

Next, the node 40 (A, B) judges whether or not the transmission is successful (1110).

In the step 1110, if it is judged that the transmission is successful, the process ends (1111).

On the other hand, in the step 1110, if it is judged that the transmission is not successful, the adjacent node 40 (A−1, B) on the left side or the link 41 to the adjacent node 40 (A−1, B) may have some faults. Then, the node 40 (A, B) transmits the request or the response to the adjacent node 40 (A, B+1) on the upper side (1112). This is because the node 40 (A, B+1) is positioned on the other shortest path from the node 40 (A, B) to the destination node 40 (a, b), like the node 40 (A−1, B).

Next, the node 40 (A, B) judges whether or not the transmission is successful (1113).

In the step 1113, if it is judged that the transmission is successful, the process ends (1114).

On the other hand, in the step 1113, if it is judged that the transmission is not successful, the adjacent node 40 (A, B+1) on the upper side or the link 41 to the adjacent node 40 (A, B+1) may have some faults. That is, the node 40 (A, B) cannot transmit the request or the response in a direction close to the destination node 40 (a, b). The transmission fails two times, which is referred to as a double fault, and it is hard to search an additional transmissible path away from the faults. For this reason, the node 40 (A, B) reports an unable transmission fault and ends the process (1116).

Moreover, the report destination of the unable transmission fault is, for example, a fault management terminal (not shown) which manages the fault of the entire storage system. Alternatively, the report destination of the unable transmission fault may be any one of host computers or all host computers.

In the step 1108, if it is judged that the condition β<γ is not satisfied (that is, γ is equal to or less than β), the node 40 (A, B) transmits the request or the response to the adjacent node 40 (A, B+1) on the upper side (1117).

Then, the node 40 (A, B) judges whether or not the transmission is successful (1118).

In the step 1118, if it is judged that the transmission is successful, the process ends (1119).

On the other hand, in the step 1118, if it is judged that the transmission is not successful, the adjacent node 40 (A, B+1)

on the upper side or the link 41 to the adjacent node 40 (A, B+1) may have some faults. Then, the node 40 (A, B) transmits the request or the response to the adjacent node 40 (A−1, B) on the left side (1120). This is because the node 40 (A−1, B) is positioned on the other shortest path from the node 40 (A, B) to the destination node 40 (a, b), like the node 40 (A, B+1).

Next, the node 40 (A, B) judges whether or not the transmission is successful (1113).

In the step 1113, if it is judged that the transmission is successful, the process ends (1114).

On the other hand, in the step 1113, if it is judged that the transmission is not successful, similarly, the adjacent node 40 (A−1, B) on the left side or the link 41 to the adjacent node 40 (A−1, B) may have some faults. That is, the node 40 (A, B) cannot transmit the request or the response in the direction close to the destination node 40 (a, b). For this reason, the node 40 (A, B) reports an unable transmission fault (1115) and ends the process (1116).

In the step 1106, if it is judged that the condition B<b is not satisfied, the destination node 40 (a, b) is positioned on the lower side (lower right side or lower left side) of the node 40 (A, B). That is, the adjacent node 40 (A, B−1) on the lower side is positioned on one of the two shortest paths from the node 40 (A, B) to the destination node 40 (a, b). Then, the node 40 (A, B) measures the traffic amount δ with the adjacent node 40 (A, B−1) on the lower side (1121).

As a result, with combining the judgment results in the steps 1104 and 1106, the destination node 40 (a, b) is positioned on the lower left side of the node 40 (A, B).

Then, the node 40 (A, B) judges whether or not the condition the traffic amount β<the traffic amount δ is satisfied (1122).

In the step 1122, if it is judged that the condition β<δ is satisfied, the node 40 (A, B) transmits the request or the response to the adjacent node 40 (A−1, B) on the left side (1123).

Next, the node 40 (A, B) judges whether or not the transmission is successful (1124).

In the step 1124, if it is judged that the transmission is successful, the process ends (1125).

On the other hand, in the step 1124, if it is judged that the transmission is not successful, the adjacent node 40 (A−1, B) on the left side or the link 41 to the adjacent node 40 (A−1, B) may-have some faults. Then, the node 40 (A, B) transmits the request or the response to the adjacent node 40 (A, B−1) on the lower side (1126). This is because the node 40 (A, B−1) is positioned on the other shortest path from the node 40 (A, B) to the destination node 40 (a, b), like the node 40 (A−1, B).

Next, the node 40 (A, B) judges whether or not the transmission is successful (1113).

In the step 1113, if it is judged that the transmission is successful, the process ends (1114).

On the other hand, in the step 1113, if it is judged that the transmission is not successful, the adjacent node 40 (A, B−1) on the lower side or the link 41 to the adjacent node 40 (A, B−1) may have some faults. That is, the node 40 (A, B) cannot transmit the request or the response in the direction close to the destination node 40 (a, b). For this reason, the node 40 (A, B) reports an unable transmission fault (1115) and ends the process (1116).

On the other hand, in the step 1122, if it is judged that the condition β<δ is not satisfied (that is, δ is equal to or less than β), the node 40 (A, B) transmits the request or the response to the adjacent node 40 (A, B−1) on the lower side (1127).

Next, the node 40 (A, B) judges whether or not the transmission is successful (1128).

In the step 1128, if it is judged that the transmission is successful, the process ends (1129).

On the other hand, in the step 1128, if it is judged that the transmission is not successful, the adjacent node 40 (A, B−1) on the lower side or the link 41 to the adjacent node 40 (A, B−1) may have some faults. Then, the node 40 (A, B) transmits the request or the response to the adjacent node 40 (A−1, B) on the left side (1130). This is because the node 40 (A−1, B) is positioned on the other shortest path from the node 40 (A, B) to the destination node 40 (a, b), like the node 40 (A, B−1).

Next, the node 40 (A, B) judges whether or not the transmission is successful (1113).

In the step 1113, if it is judged that the transmission is successful, the process ends (1114).

On the other hand, in the step 1113, if it is judged that the transmission is not successful, the adjacent node 40 (A−1, B) on the left side or the link 41 to the adjacent node 40 (A−1, B) may have some faults. That is, the node 40 (A, B) cannot transmit the request or the response in the direction close to the destination node 40 (a, b). For this reason, the node 40 (A, B) reports an unable transmission fault (1115) and ends the process (1116).

Figure 12:
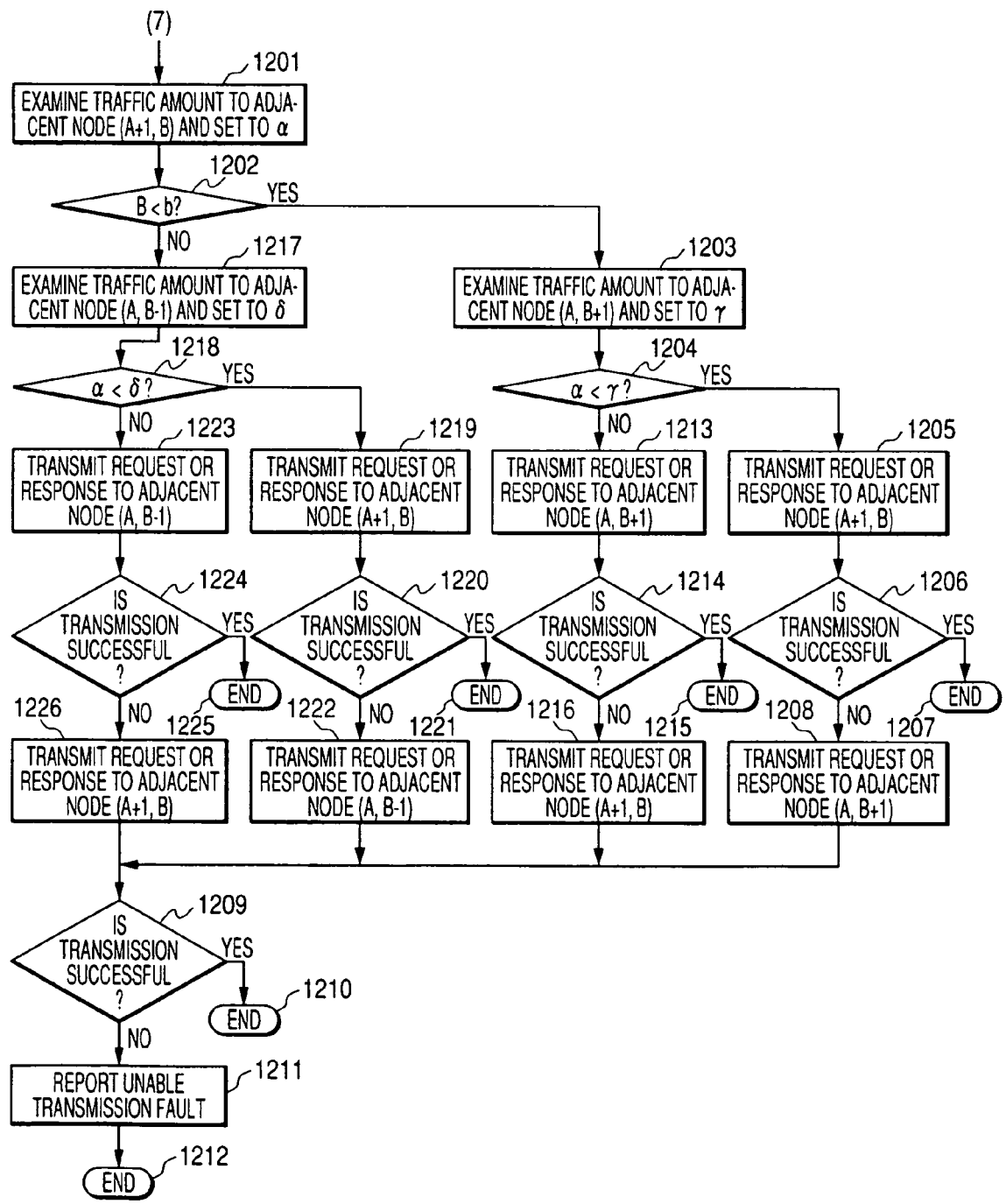
FIG. 12 is a flowchart of a process to be executed when the destination node is positioned on an upper right side or a lower right side of the node, in the routing algorithm according to the first embodiment of the invention which takes faults into consideration.

FIG. 12 is a flowchart of a process to be executed when the destination node 40 (a, b) is positioned on the upper right side or the lower right side of the node 40 (A, B), in the routing algorithm according to the first embodiment of the invention which takes faults into consideration.

In the step 1104 of FIG. 11, if it is judged that the condition A<a is satisfied (7), the destination node 40 (a, b) is positioned on the right side (upper right side or lower right side) of the node 40 (A, B). That is, the adjacent node 40 (A+1, B) on the right side is positioned on one of the two shortest paths from the node 40 (A, B) to the destination node 40 (a, b). Then, the node 40 (A, B) measures the traffic amount α with the adjacent node 40 (A+1, B) on the right side (1201).

Next, the node 40 (A, B) judges whether or not the condition B<b is satisfied (1202).

In the step 1202, if it is judged that the condition B<b is satisfied, the destination node 40 (a, b) is positioned on the upper side (upper right side or upper left side) of the node 40 (A, B). That is, the adjacent node 40 (A, B+1) on the upper side is positioned on one of the two shortest paths from the node 40 (A, B) to the destination node 40 (a, b). Then, the node 40 (A, B) measures the traffic amount γ with the adjacent node 40 (A, B+1) on the upper side (1203).

As a result, with combining the judgment results in the steps 1104 and 1202, the destination node 40 (a, b) is positioned on the upper right side of the node 40 (A, B).

Then, the node 40 (A, B) judges whether or not the condition the traffic amount α<the traffic amount γ is satisfied (1204).

In the step 1204, if it is judged that the condition α<γ is satisfied, the node 40 (A, B) transmits the request or the response to the adjacent node 40 (A+1, B) on the right side (1205).

Next, the node 40 (A, B) judges whether or not the transmission is successful (1206).

In the step 1206, if it is judged that the transmission is successful, the process ends (1207).

On the other hand, in the step 1206, if it is judged that the transmission is not successful, the adjacent node 40 (A+1, B) on the right side or the link 41 to the adjacent node 40 (A+1, B) may have some faults. Then, the node 40 (A, B) transmits the request or the response to the adjacent node 40 (A, B+1) on the upper side (1208). This is because the node 40 (A, B+1)

is positioned on the other shortest path from the node 40 (A, B) to the destination node 40 (a, b), like the node 40 (A+1, B).

Next, the node 40 (A, B) judges whether or not the transmission is successful (1209).

In the step 1209, if it is judged that the transmission is successful, the process ends (1210).

On the other hand, in the step 1209, if it is judged that the transmission is not successful, the adjacent node 40 (A, B+1) on the upper side or the link 41 to the adjacent node 40 (A, B+1) may have some faults. That is, the node 40 (A, B) cannot transmit the request or the response in a direction close to the destination node 40 (a, b). For this reason, the node 40 (A, B) reports an unable transmission fault (1211) and ends the process (1212).

In the step 1204, if it is judged that the condition $\alpha < \gamma$ is not satisfied (that is, $\gamma$ is equal to or less than $\alpha$), the node 40 (A, B) transmits the request or the response to the adjacent node 40 (A, B+1) on the upper side (1213).

Then, the node 40 (A, B) judges whether or not the transmission is successful (1214).

In the step 1214, if it is judged that the transmission is successful, the process ends (1215).

On the other hand, in the step 1214, if it is judged that the transmission is not successful, the adjacent node 40 (A, B+1) on the upper side or the link 41 to the adjacent node 40 (A, B+1) may have some faults. Then, the node 40 (A, B) transmits the request or the response to the adjacent node 40 (A+1, B) on the right side (1216). This is because the node 40 (A+1, B) is positioned on the other shortest path from the node 40 (A, B) to the destination node 40 (a, b), like the node 40 (A, B+1).

Next, the node 40 (A, B) judges whether or not the transmission is successful (1209).

In the step 1209, if it is judged that the transmission is successful, the process ends (1210).

On the other hand, in the step 1209, if it is judged that the transmission is not successful, the adjacent node 40 (A+1, B) on the right side or the link 41 to the adjacent node 40 (A+1, B) may have some faults. That is, the node 40 (A, B) cannot transmit the request or the response in the direction close to the destination node 40 (a, b). For this reason, the node 40 (A, B) reports an unable transmission fault (1211) and ends the process (1212).

In the step 1202, if it is judged that the condition B<b is not satisfied, the destination node 40 (a, b) is positioned on the lower side (lower right side or lower left side) of the node 40 (A, B). That is, the adjacent node 40 (A, B−1) on the lower side is positioned on one of the two shortest paths from the node 40 (A, B) to the destination node 40 (a, b). Then, the node 40 (A, B) measures the traffic amount $\delta$ with the adjacent node 40 (A, B−1) on the lower side (1217).

As a result, with combining the judgment results in the steps 1104 and 1202, the destination node 40 (a, b) is positioned on the lower right side of the node 40 (A, B).

Then, the node 40 (A, B) judges whether or not the condition the traffic amount $\alpha$<the traffic amount $\delta$ is satisfied (1218).

In the step 1218, if it is judged that the condition $\alpha < \delta$ is satisfied, the node 40 (A, B) transmits the request or the response to the adjacent node 40 (A+1, B) on the right side (1219).

Next, the node 40 (A, B) judges whether or not the transmission is successful (1220).

In the step 1220, if it is judged that the transmission is successful, the process ends (1221).

On the other hand, in the step 1124, if it is judged that the transmission is not successful, the adjacent node 40 (A+1, B) on the right side or the link 41 to the adjacent node 40 (A+1, B) may have some faults. Then, the node 40 (A, B) transmits the request or the response to the adjacent node 40 (A, B−1) on the lower side (1222). This is because the node 40 (A, B−1) is positioned on the other shortest path from the node 40 (A, B) to the destination node 40 (a, b), like the node 40 (A+1, B).

Next, the node 40 (A, B) judges whether or not the transmission is successful (1209).

In the step 1209, if it is judged that the transmission is successful, the process ends (1210).

On the other hand, in the step 1209, if it is judged that the transmission is not successful, the adjacent node 40 (A, B−1) on the lower side or the link 41 to the adjacent node 40 (A, B−1) may have some faults. That is, the node 40 (A, B) cannot transmit the request or the response in the direction close to the destination node 40 (a, b). For this reason, the node 40 reports an unable transmission fault (1211) and ends the process (1212).

In the step 1218, if it is judged that the condition $\alpha < \delta$ is not satisfied (that is, $\delta$ is equal to or less than $\alpha$), the node 40 (A, B) transmits the request or the response to the adjacent node 40 (A, B−1) on the lower side (1223).

Next, the node 40 (A, B) judges whether or not the transmission is successful (1224).

In the step 1224, if it is judged that the transmission is successful, the process ends (1225).

On the other hand, in the step 1224, if it is judged that the transmission is not successful, the adjacent node 40 (A, B−1) on the lower side or the link 41 to the adjacent node 40 (A, B−1) may have some faults. Then, the node 40 (A, B) transmits the request or the response to the adjacent node 40 (A+1, B) on the right side (1226). This is because the node 40 (A+1, B) is positioned on the other shortest path from the node 40 (A, B) to the destination node 40 (a, b), like the node 40 (A, B−1).

Next, the node 40 (A, B) judges whether or not the transmission is successful (1209).

In the step 1209, if it is judged that the transmission is successful, the process ends (1210).

On the other hand, in the step 1209, if it is judged that the transmission is not successful, the adjacent node 40 (A+1, B) on the right side or the link 41 to the adjacent node 40 (A+1, B) may have some faults. That is, the node 40 (A, B) cannot transmit the request or the response in the direction close to the destination node 40 (a, b). For this reason, the node 40 (A, B) reports an unable transmission fault (1211) and ends the process (1212).

Figure 13:
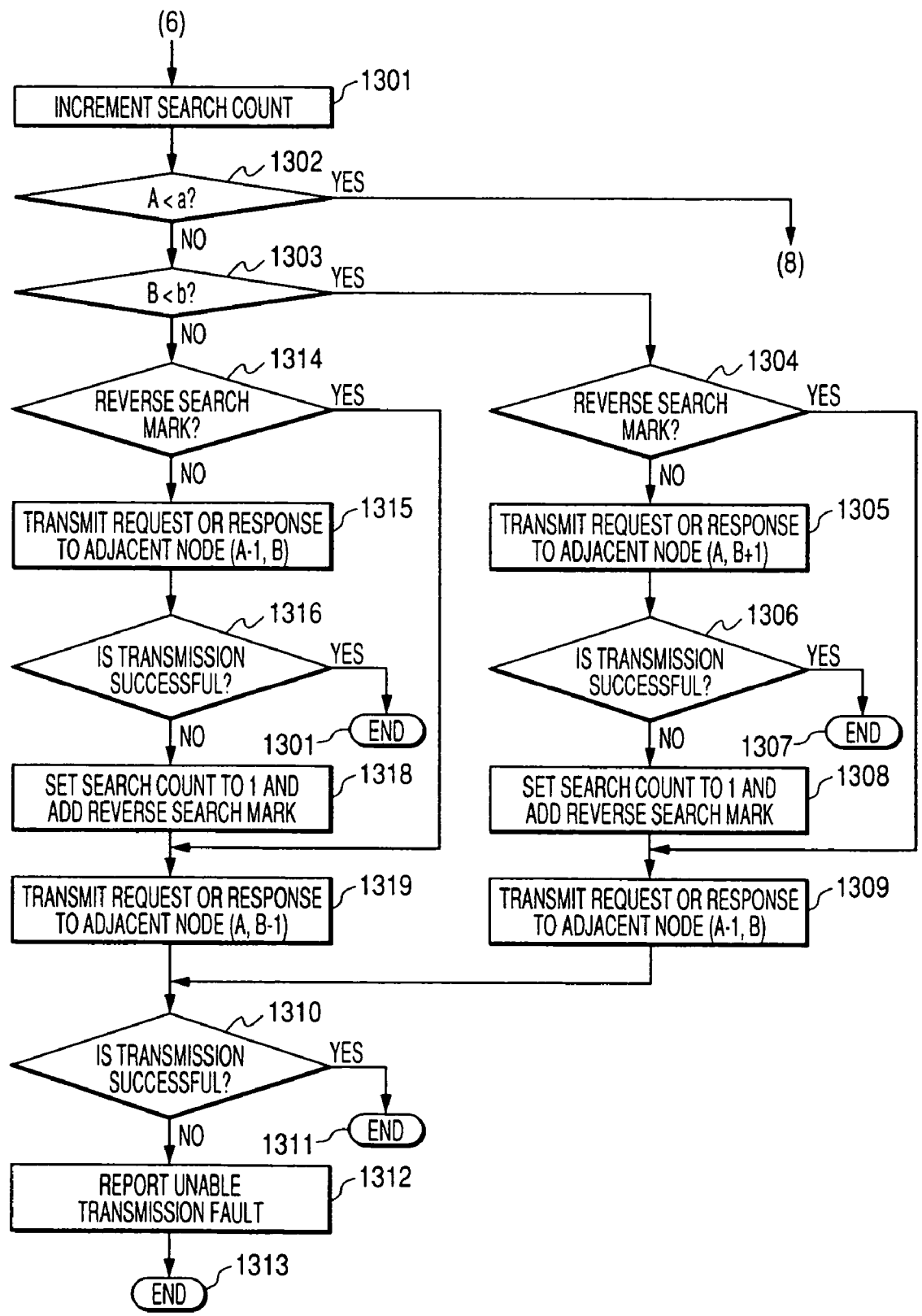
FIG. 13 is a flowchart of a search process to be executed in the routing algorithm according to the first embodiment of the invention which takes faults into consideration.

FIG. 13 is a flowchart of a search process to be executed in the routing algorithm according to the first embodiment of the invention which takes faults into consideration.

In the step 1103 of FIG. 11, if it is judged that the condition the search count>0 is satisfied (6), the search is being executed. In this case, the node 40 increments the value of the search count by '1' (1301).

Next, the node 40 (A, B) judges whether or not the condition A<a is satisfied (1302).

In the step 1302, if it is judged that the condition A<a is satisfied, the destination node 40 (a, b) is positioned on the right side (upper right side or lower right side) of the node 40 (A, B). In this case, the process progresses to a step 1401 of FIG. 14, which is connected to (8) of FIG. 13.

On the other hand, in the step 1302, if it is judged that the condition A<a is not satisfied, the destination node 40 (a, b) is positioned on the left side (upper left side or lower left side) of the node 40 (A, B). Then, the node 40 (A, B) judges whether or not the condition B<b is satisfied (1303).

When the condition B<b is satisfied, the destination node 40 (a, b) is positioned on the upper side (upper right side or upper left side) of the node 40 (A, B).

As a result, with combining the judgment results in the steps 1302 and 1303, the destination node 40 (a, b) is positioned on the upper left side of the node 40 (A, B).

Next, the node 40 (A, B) judges whether or not the reverse search mark 503 is added to the request or the response (1304). Specifically, the node 40 (A, B) judges whether or not the value of the reverse search mark 503 of the packet 50 for the received access request or response is set to valid.

The reverse search mark 503 is a mark which designates the search direction. When the reverse search mark 503 is not added to the request or the response, the node 40 (A, B) transmits the request or the response to search some usable links 41 to the destination node 40 (a, b) in the counterclockwise direction. On the other hand, when the reverse search mark 503 is added to the request or the response, the node 40 (A, B) transmits the request or the response to search some usable links 41 to the destination node 40 (a, b) in the clockwise direction.

Moreover, the reverse search mark 503 is not added when the search begins. During the counterclockwise search, when the search cannot be further performed due to some faults of the link 41 or the like, the reverse search mark 503 is added, such that the clockwise search begins.

In the step 1304, if it is judged that the reverse search mark 503 is not added, the counterclockwise search is being executed. Then, the node 40 (A, B) transmits the request or the response to the adjacent node 40 (A, B+1) on the upper side (1305). Since the destination node 40 (a, b) is positioned on the upper left side of the node 40 (A, B), the request or the response is transmitted to go around the destination node 40 (a, b) in the counterclockwise direction.

Next, the node 40 (A, B) judges whether or not the transmission is successful (1306).

In the step 1306, if it is judged that the transmission is successful, the process ends (1307).

On the other hand, in the step 1307, if it is judged that the transmission is not successful, the adjacent node 40 (A, B+1) on the upper side or the link 41 to the adjacent node 40 (A, B+1) may have some faults. Therefore, the node 40 (A, B) cannot further perform the counterclockwise search. Then, the node 40 (A, B) sets the value of the search count to '1', adds the reverse search mark 503 (1308), and transmits the request or the response to the adjacent node 40 (A−1, B) on the left side (1309). Since the destination node 40 (a, b) is positioned on the upper left side of the node 40 (A, B), the request or the response is transmitted to go around the destination node 40 (a, b) in a clockwise direction. Thus, the clockwise search begins.

In the step 1304, if it is judged that the reverse search mark 503 is added, it means that the clockwise search has been executed. Then, the process jumps to the step 1309, without executing the steps from 1305 to 1308.

Next, the node 40 (A, B) judges whether or not the transmission is successful (1310).

In the step 1310, if it is judged that the transmission is successful, the process ends (1311).

On the other hand, in the step 1310, if it is judged that the transmission is not successful, both the counterclockwise search and the clockwise search cannot be further performed. Then, the node 40 (A, B) reports the unable transmission fault (1312) and ends the process (1313).

In the step 1303, if it is judged that the condition B<b is not satisfied, the destination node 40 (a, b) is positioned on the lower side (lower right side or lower left side) of the node 40 (A, B)

As a result, with combining the judgment results in the steps 1302 and 1303, the destination node 40 (a, b) is positioned on the lower left side of the node 40 (A, B).

Next, the node 40 (A, B) judges whether or not the reverse search mark 503 is added to the request or the response (1314). Specifically, the node 40 (A, B) judges whether or not the value of the reverse search mark 503 of the packet 50 for the received access request or response is set to valid.

In the step 1314, if it is judged that the reverse search mark 503 is not added, the counterclockwise search is being executed. Then, the node 40 (A, B) transmits the request or the response to the adjacent node 40 (A−1, B) on the left side (1315). Since the destination node 40 (a, b) is positioned on the lower left side of the node 40 (A, B), the request or the response is transmitted to go around the destination node 40 (a, b) in the counterclockwise direction.

Next, the node 40 (A, B) judges whether or not the transmission is successful (1316).

In the step 1316, if it is judged that the transmission is successful, the process ends (1317).

On the other hand, in the step 1316, if it is judged that the transmission is not successful, the adjacent node 40 (A−1, B) on the left side or the link 41 to the adjacent node 40 (A−1, B) may have some faults. Therefore, the node 40 (A, B) cannot further perform the counterclockwise search. Then, the node 40 (A, B) sets the value of the search count to '1', adds the reverse search mark 503 (1318), and transmits the request or the response to the adjacent node 40 (A, B−1) on the lower side (1319). Since the destination node 40 (a, b) is positioned on the lower left side of the node 40 (A, B), the request or the response is transmitted to go around the destination node 40 (a, b) in the clockwise direction. Thus, the clockwise search begins.

In the step 1314, if it is judged that the reverse search mark 503 is added, it means that the clockwise search has been executed. Then, the process jumps to the step 1319, without executing the steps from 1315 to 1318.

Next, the node 40 (A, B) judges whether or not the transmission is successful (1310). Then, as described above, the steps from 1310 to 1313 are executed.

Figure 14:
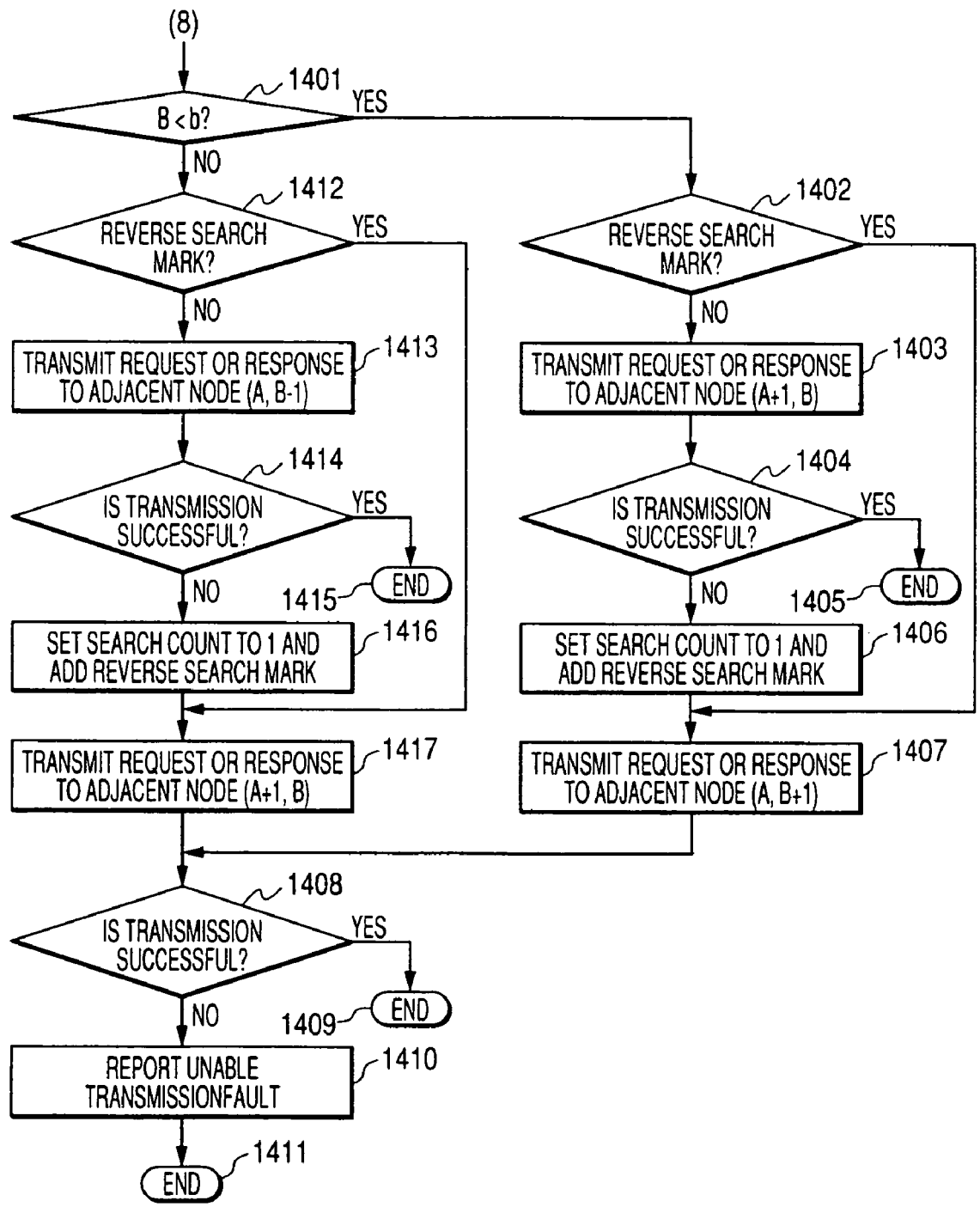
FIG. 14 is a flowchart of a process to be executed when the destination node is positioned on the upper right side or the lower right side of the node, from the search process to be executed in the routing algorithm according to the first embodiment of the invention which takes faults into consideration.

FIG. 14 is a flowchart of a process to be executed when the destination node 40 (a, b) is positioned on the upper right side or the lower right side of the node 40 (A, B), from the search process to be executed in the routing algorithm according to the first embodiment of the invention which takes faults into consideration.

In the step 1302 of FIG. 13, if it is judged that the condition A<a is satisfied (8), the destination node 40 (a, b) is positioned on the right side (upper right side or lower right side) of the node 40 (A, B). In this case, the node 40 (A, B) judges whether or not the condition B<b is satisfied (1401).

When the condition B<b is satisfied, the destination node 40 (a, b) is positioned on the upper side (upper right side or upper left side) of the node 40 (A, B).

As a result, with combining the judgment results in the steps 1302 and 1401, the destination node 40 (a, b) is positioned on the upper right side of the node 40 (A, B).

Next, the node 40 (A, B) judges whether or not the reverse search mark 503 is added to the request or the response (1402). Specifically, the node 40 (A, B) judges whether or not the value of the reverse search mark 503 of the packet 50 for the received access request or response is set to valid.

In the step 1402, if it is judged that the reverse search mark 503 is not added, the counterclockwise search is being executed. Then, the node 40 (A, B) transmits the request or the response to the adjacent node 40 (A+1, B) on the right side (1403). Since the destination node 40 (a, b) is positioned on the upper right side of the node 40 (A, B), the request or the response is transmitted to go around the destination node 40 (a, b) in the counterclockwise direction.

Next, the node 40 (A, B) judges whether or not the transmission is successful (1404).

In the step 1404, if it is judged that the transmission is successful, the process ends (1405).

On the other hand, in the step 1404, if it is judged that the transmission is not successful, the adjacent node 40 (A+1, B) on the right side or the link 41 to the adjacent node 40 (A+1, B) may have some faults. Therefore, the node 40 (A, B) cannot further perform the counterclockwise search. Then, the node 40 (A, B) sets the value of the search count to '1', adds the reverse search mark 503 (1406), and transmits the request or the response to the adjacent node 40 (A, B+1) on the upper side (1407). Since the destination node 40 (a, b) is positioned on the upper right side of the node 40 (A, B), the request or the response is transmitted to go around the destination node 40 (a, b) in the clockwise direction. Thus, the clockwise search begins.

In the step 1402, if it is judged that the reverse search mark 503 is added, it means that the clockwise search has been executed. Then, the process jumps to the step 1407, without executing the steps from 1403 to 1406.

Next, the node 40 (A, B) judges whether or not the transmission is successful (1408).

In the step 1408, if it is judged that the transmission is successful, the process ends (1409).

On the other hand, in the step 1408, if it is judged that the transmission is not successful, both the counterclockwise search and the clockwise search cannot be further performed. Then, the node 40 (A, B) reports the unable transmission fault (1410) and ends the process (1411).

In the step 1401, if it is judged that the condition B<b is not satisfied, the destination node 40. (a, b) is positioned on the lower side (lower right side or lower left side) of the node 40 (A, B)

As a result, with combining the judgment results in the steps 1302 and 1401, the destination node 40 (a, b) is positioned on the lower right side of the node 40 (A, B).

Next, the node 40 (A, B) judges whether or not the reverse search mark 503 is added to the request or the response (1412). Specifically, the node 40 (A, B) judges whether or not the value of the reverse search mark 503 of the packet 50 for the received access request or response is set to valid.

In the step 1412, if it is judged that the reverse search mark 503 is not added, the counterclockwise search is being executed. Then, the node 40 (A, B) transmits the request or the response to the adjacent node 40 (A, B−1) on the lower side (1413). Since the destination node 40 (a, b) is positioned on the lower right side of the node 40 (A, B), the request or the response is transmitted to go around the destination node 40 (A, B) in the counterclockwise direction.

Next, the node 40 (A, B) judges whether or not the transmission is successful (1414).

In the step 1414, if it is judged that the transmission is successful, the process ends (1415).

On the other hand, in the step 1414, if it is judged that the transmission is not successful, the adjacent node 40 (A, B−1) on the lower side or the link 41 to the adjacent node 40 (A, B−1) may have some faults. Therefore, the node 40 (A, B) cannot further perform the counterclockwise search. Then, the node 40 sets the value of the search count to '1', adds the reverse search mark 503 (1416), and transmits the request or the response to the adjacent node 40 (A+1, B) on the right side (1417). Since the destination node 40 (a, b) is positioned on the lower right side of the node 40 (A, B), the request or the response is transmitted to go around the destination node 40 (a, b) in the clockwise direction. Thus, the clockwise search begins.

In the step 1412, if it is judged that the reverse search mark 503 is added, it means that the clockwise search has been executed. Then, the process jumps to the step 1417, without executing the steps from 1413 to 1416.

Next, the node 40 (A, B) judges whether or not the transmission is successful (1408) Then, as described above, the steps from 1408 to 1411 are executed.

Figure 15:
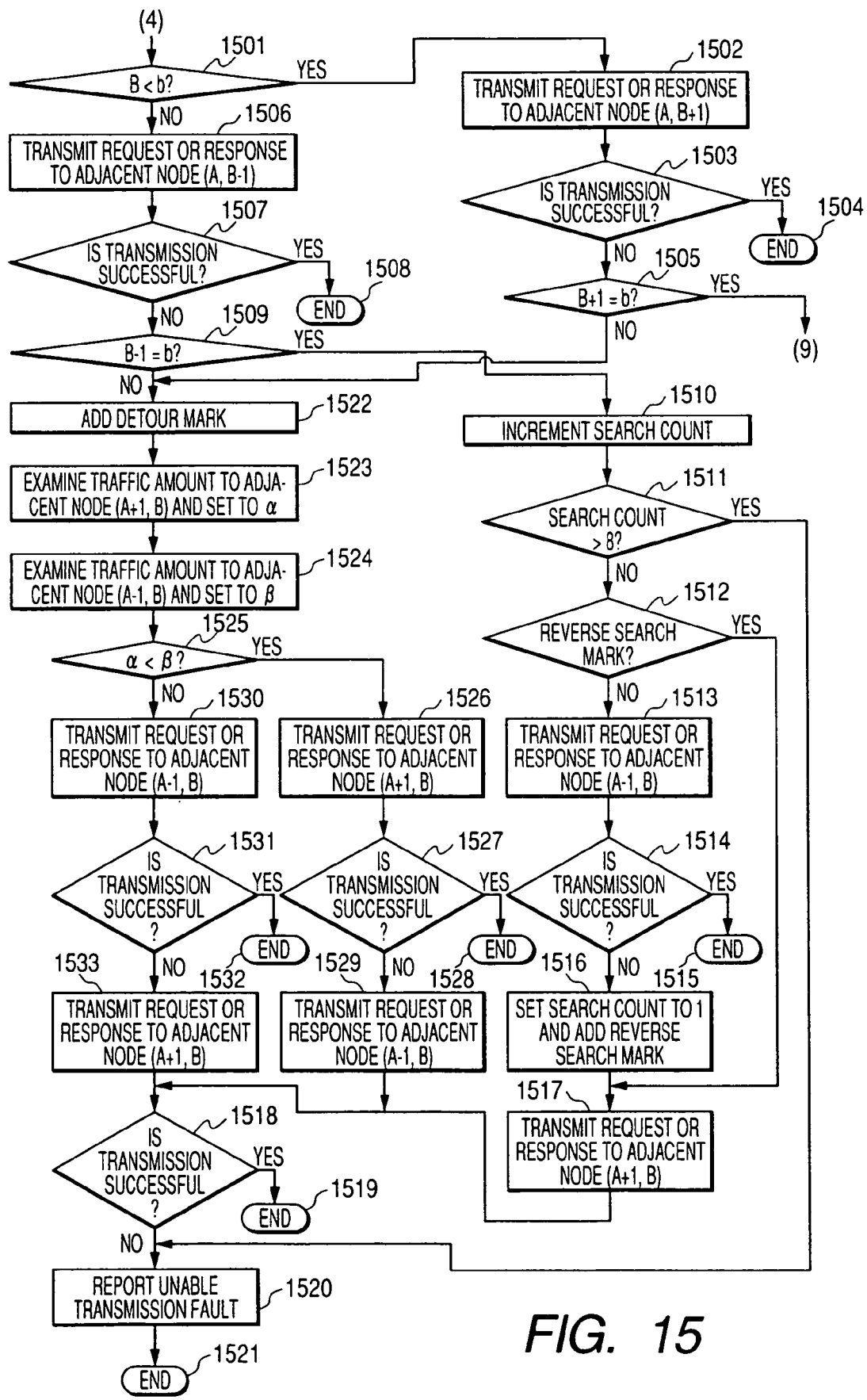
FIG. 15 is a flowchart of a process to be executed when the destination node is in the same column as the node, in the routing algorithm according to the first embodiment of the invention which takes faults into consideration.

FIG. 15 is a flowchart of a process to be executed when the destination node 40 (a, b) is in the same column as the node 40 (A, B), in the routing algorithm according to the first embodiment of the invention which takes faults into consideration.

In the step 1101 of FIG. 11, if it is judged that the condition A=a is satisfied (4), the destination node 40 (a, b) is in the same column as the node 40 (A, B). In this case, there exists the only one shortest path from the node 40 (A, B) to the destination node 40 (a, b). In order to determine whether the request or the response is transmitted to either the upper side or the lower side, the node 40 (A, B) judges whether or not the condition B<b is satisfied (1501).

In the step 1501, if it is judged that the condition B<b is satisfied, the destination node 40 (a, b) is positioned on the upper side of the node 40 (A, B). In this case, the adjacent node 40 (A, B+1) on the upper side is positioned on the shortest path from the node 40 (A, B) to the destination node 40 (a, b). Then, the node 40 (A, B) transmits the request or the response to the adjacent node 40 (A, B+1) on the upper side (1502).

Next, the node 40 (A, B) judges whether or not the transmission is successful (1503).

In the step 1503, if it is judged that the transmission is successful, the process ends (1504).

On the other hand, in the step 1503, if it is judged that the transmission is not successful, the adjacent node 40 (A, B+1) on the upper side or the link 41 to the adjacent node 40 (A, B+1) may have some faults. In this case, the node 40 (A, B) judges whether or not the condition B+1=b is satisfied (1505).

In the step 1505, if it is judged that the condition B+1=b is satisfied, the destination node 40 (a, b) is adjacent to the node 40 (A, B) on the upper side. In this case, in order to search other links 41 to the destination node 40 (a, b), the process progresses to the step 1701 of FIG. 17, which is connected to (9) of FIG. 15.

On the other hand, in the step 1505, if it is judged that the condition B+1=b is not satisfied, the destination node 40 (a, b) is positioned on the upper side of the node 40 (A, B), but it is not adjacent thereto. In this case, the process progresses to a step 1522 so as for the node 40 (A, B) to transmit the request or the response away from the adjacent node 40 (A, B+1) or the link 41 to the adjacent node 40 (A, B+1) having the faults.

In the step 1501, if it is judged that the condition B<b is not satisfied, the destination node 40 (a, b) is positioned on the lower side of the node 40 (A, B). In this case, the adjacent node 40 (A, B−1) on the lower side is positioned on the shortest path from the node 40 (A, B) to the destination node 40 (a, b). Then, the node 40 (A, B) transmits the request or the response to the adjacent node 40 (A, B−1) on the lower side (1506).

Next, the node 40 (A, B) judges whether or not the transmission is successful (1507).

In the step 1507, if it is judged that the transmission is successful, the process ends (1508).

On the other hand, in the step 1507, if it is judged that the transmission is not successful, the adjacent node 40 (A, B−1) on the lower side or the link 41 to the adjacent node 40 (A, B−1) may have some faults. In this case, the node 40 (A, B) judges whether or not the condition B−1=b is satisfied (1509).

In the step 1509, if it is judged that the condition B−1=b is satisfied, the destination node 40 (a, b) is adjacent to the node 40 (A, B) on the lower side. In this case, in order to search other links 41 to the destination node 40 (a, b), the node 40 (A, B) increments the value of the search count by '1' (1510).

Next, the node 40 (A, B) judges whether or not the value of the search count is larger than 8 (1511).

In the step 1511, if it is judged that the value of the search count is larger than 8, all the transmissions have failed over all links 41 to the destination node 40 (a, b). Then, an unable transmission fault is reported (1520) and the process ends (1521).

On the other hand, in the step 1511, if it is judged that the value of the search count is not larger than 8, some transmittable links 41 to the destination node 40 (a, b) may remain. Then, the node 40 (A, B) judges whether or not the reverse search mark 503 is added to the request or the response (1512).

In the step 1512, if it is judged that the reverse search mark 503 is not added, the counterclockwise search is executed. In this case, the node 40 (A, B) transmits the request or the response to the adjacent node 40 (A−1, B) on the left side (1513) Since the destination node 40 (a, b) is adjacent to the node 40 (A, B) on the lower side, the request or the response is transmitted to go around the destination node 40 (a, b) in the counterclockwise direction.

Next, the node 40 (A, B) judges whether or not the transmission is successful (1514).

In the step 1514, if it is judged that the transmission is successful, the process ends (1515).

On the other hand, in the step 1514, if it is judged that the transmission is not successful, the adjacent node 40 (A−1, B) on the left side or the link 41 to the adjacent node 40 (A−1, B) may have some faults. Therefore, the node 40 (A, B) cannot further perform the counterclockwise search. Then, the node 40 (A, B) sets the value of the search count to '1', adds the reverse search mark 503 (1516), and transmits the request or the response to the adjacent node 40 (A+1, B) on the right side (1517). Since the destination node 40 (a, b) is adjacent to the node 40 (A, B) on the lower side, the request or the response is transmitted to go around the destination node 40 (a, b) in the clockwise direction. Thus, the clockwise search begins.

The node 40 (A−1, B) and the node 40 (A+1, B) are positioned on the two different second shortest paths from the node 40 (A, B) to the destination node 40 (a, b) respectively.

In the step 1512, if it is judged that the reverse search mark 503 is added, it means that the clockwise search has been executed. Then, the process jumps to the step 1517, without executing the steps from 1513 to 1516, and the node 40 (A, B) transmits the request or the response to the adjacent node 40 (A+1, B) on the right side.

Next, the node 40 (A, B) judges whether or not the transmission is successful (1518).

In the step 1518, if it is judged that the transmission is successful, the process ends (1519).

On the other hand, in the step 1518, if it is judged that the transmission is not successful, both the counterclockwise search and the clockwise search cannot be further performed. Then, the node 40 (A, B) reports an unable transmission fault (1520) and ends the process (1521).

In the step 1509, if it is judged that the condition B−1=b is not satisfied, the destination node 40 (a, b) is positioned on the lower side of the node 40 (A, B), but it is adjacent thereto. Then, the node 40 (A, B) transmits the request or the response away from the adjacent node 40 (A, B−1) or the link 41 to the adjacent node (A, B−1) having some faults. Similarly, in the step 1505, if it is judged that the condition B+1=b is not satisfied, then the node 40 (A, B) transmits the request or the response away from the adjacent node 40 (A, B+1) or the link 41 to the adjacent node (A, B+1) having some faults.

The detour is a process of, when the destination node 40 (a, b) is in the same column or row as the node 40 (A, B) and is not adjacent to the node 40 (A, B) and when the adjacent node 40 which is positioned on the only one shortest path to the destination node (a, b) or the link 41 between the node 40 (A, B) and the adjacent node 40 has some faults, transmitting the request or the response from the node 40 (A, B) to other adjacent node 40 on the second shortest path to the destination node 40 (a, b) to be away from the faults. This is because the node 40 (A, B) cannot transmit the packet 50 to the adjacent node 40 on the shortest path from the node 40 (A, B) to the destination node 40 (a, b). For example, when the destination node 40 (a, b) is positioned on the upper side of the node 40 (A, B), but not adjacent to the node 40 (A, B), in the same column as the node 40 (A, B), and the adjacent node 40 (A, B+1) on the upper side of the node 40 (A, B) has some faults, the detour begins.

In the step 1509, if it is judged that the condition B−1=b is not satisfied, and, in the step 1505, if it is judged that the condition B+1=b is not satisfied, the adjacent node 40 (A+1, B) on the right side of the node 40 (A, B) and the adjacent node 40 (A−1, B) on the left side of the node 40 (A, B) are positioned on the two different second shortest paths from the node 40 (A, B) to the destination node 40 (a, b) respectively. Therefore, the packet 50 for the request or the response is transmitted to the adjacent node 40 (A+1, B) on the right side of the node 40 (A, B) or to the adjacent node 40 (A−1, B) on the left side of the node 40 (A, B). The packet 50 may be transmitted to any one of these two adjacent nodes 40. For example, the packet 50 may be transmitted to the adjacent node 40 having the smaller traffic amount. At this time, the detour mark 502 is added to the packet 50. Next, the adjacent node 40 (A+1, B) on the right side of the node 40 (A, B) or the adjacent node 40 (A−1, B) on the left side of the node 40 (A, B) further transmits the received packet 50 to the node 40 adjacent to itself on the upper side. At this time, the detour mark 502 is eliminated and the detour ends.

First, the node 40 (A, B) adds the detour mark 502 to the request or the response (1522). Specifically, the node 40 (A, B) sets the value of the detour mark 502 of the packet 50 for the request or the response to valid.

The node 40 (A, B) measures the traffic amount a between the node 40 (A, B) and the adjacent node 40 (A+1, B) on the right side (1523).

Next, the node 40 (A, B) measures the traffic amount $\beta$ between the node 40 (A, B) and the adjacent node 40 (A−1, B) on the left side.

The node 40 (A+1, B) and the node 40 (A−1, B) are positioned on the two different second shortest path from the node 40 (A, B) to the destination node 40 (a, b) respectively.

Next, the node 40 (A, B) judges whether or not the traffic amount a is smaller than the traffic amount $\beta$ (1525).

In the step 1525, if it is judged that the traffic amount $\alpha$ is smaller than the traffic amount $\beta$, the node 40 (A, B) transmits the request or the response to the adjacent node 40 (A+1, B) on the right side (1526).

Next, the node 40 (A, B) judges whether or not the transmission is successful (1527).

In the step 1527, if it is judged that the transmission is successful, the process ends (1528).

On the other hand, in the step 1527, if it is judged that the transmission is not successful, the adjacent node 40 (A+1, B) on the right side or the link 41 to the adjacent node 40 (A+1, B) may have some faults. Then, the node 40 (A, B) transmits the request or the response to the adjacent node 40 (A−1, B) on the left side (1529).

Next, the node 40 (A, B) judges whether or not the transmission is successful (1518). The process after the step 1518 is as described above.

In the step 1525, if it is judged that the traffic amount α is not smaller than the traffic amount β, the node 40 (A, B) transmits the request or the response to the adjacent node 40 (A−1, B) on the left side (1530).

Next, the node 40 (A, B) judges whether or not the transmission is successful (1531).

In the step 1531, if it is judged that the transmission is successful, the process ends (1532).

On the other hand, in the step 1531, if it is judged that the transmission is not successful, the adjacent node 40 (A−1, B) on the left side or the link 41 to the adjacent node 40 (A−1, B) may have some faults. Then, the node 40 (A, B) transmits the request or the response to the adjacent node 40 (A+1, B) on the right side (1533).

Next, the node 40 (A, B) judges whether or not the transmission is successful (1518). The process after the step 1518 is as described above.

Figure 16:
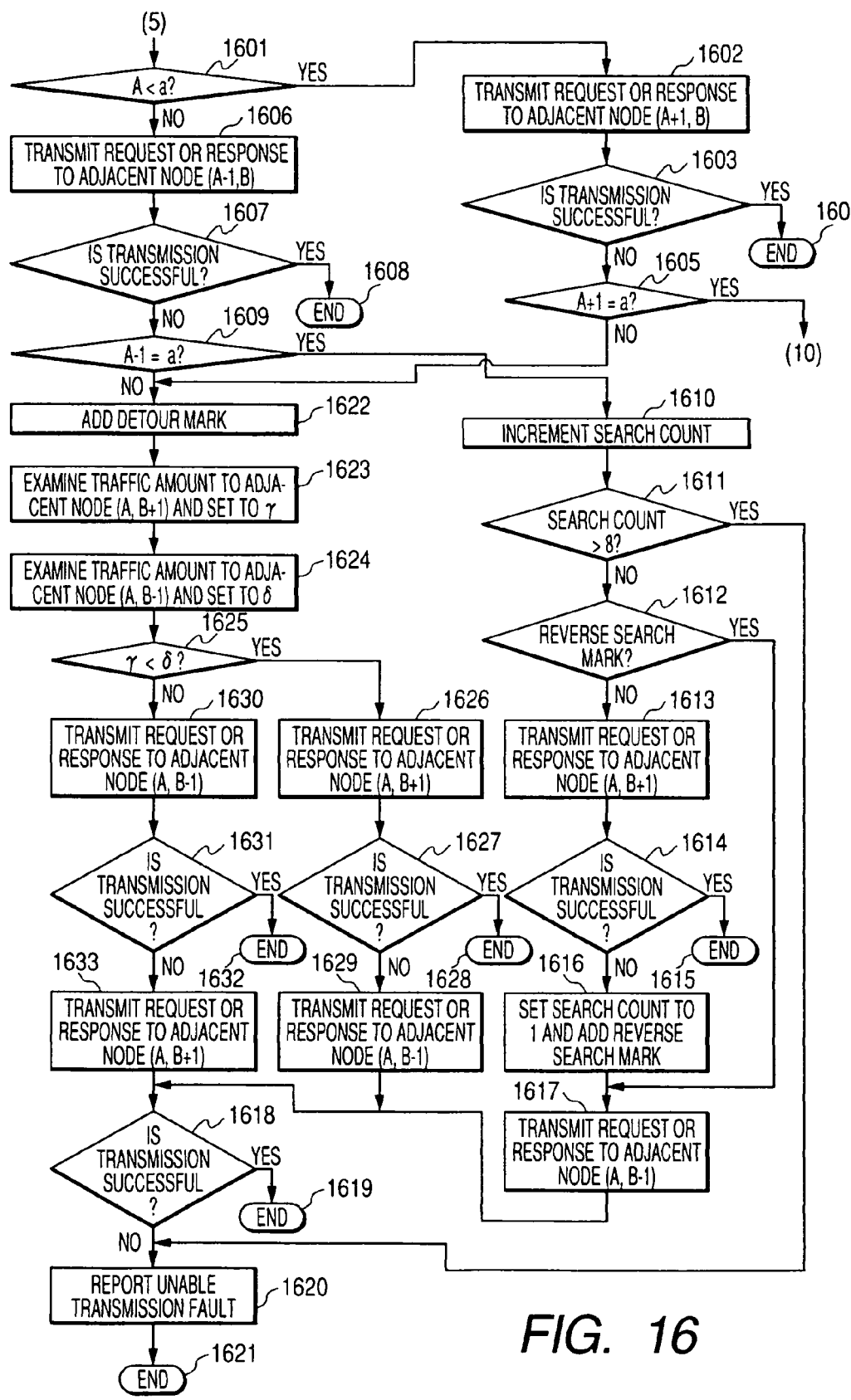
FIG. 16 is a flowchart of a process to be executed when the destination node is in the same row as the node, in the routing algorithm according to the first embodiment of the invention which takes faults into consideration.

FIG. 16 is a flowchart of a process to be executed when the destination node 40 (a, b) is in the same row as the node 40 (A, B), in the routing algorithm according to the first embodiment of the invention which takes faults into consideration.

In the step 1102 of FIG. 11, if it is judged that the condition B=b is satisfied (5), the destination node 40 (a, b) is in the same row as the node 40 (A, B). In this case, there exists the only one shortest path from the node 40 (A, B) to the destination node 40 (a, b). In order to determine whether the request or the response is transmitted to either the right side or the left side, the node 40 (A, B) judges whether or not the condition A<a is satisfied (1601).

In the step 1601, if it is judged that the condition A<a is satisfied, the destination node 40 (a, b) is positioned on the right side of the node 40 (A, B). In this case, the adjacent node 40 (A+1, B) on the right side is positioned on the shortest path from the node 40 (A, B) to the destination node 40 (a, b). Then, the node 40 (A, B) transmits the request or the response to the adjacent node 40 (A+1, B) on the right side (1602).

Next, the node 40 (A, B) judges whether or not the transmission is successful (1603).

In the step 1603, if it is judged that the transmission is successful, the process ends (1604).

On the other hand, in the step 1603, if it is judged that the transmission is not successful, the adjacent node 40 (A+1, B) on the right side or the link 41 to the adjacent node 40 (A+1, B) may have some faults. In this case, the node 40 (A, B) judges whether or not the condition A+1=a is satisfied (1605).

In the step 1605, if it is judged that the condition A+1=a is satisfied, the destination node 40 (a, b) is adjacent to the node 40 (A, B) on the right side. In this case, in order to search other links 41 to the destination node 40 (a, b), the process progresses to a step 1713 of FIG. 17, which is connected to (10) of FIG. 16.

On the other hand, in the step 1605, if it is judged that the condition A+1=a is not satisfied, the destination node 40 (a, b) is positioned on the right side of the node 40 (A, B), but it is not adjacent thereto. In this case, the process progresses to a step 1622 so as for the node 40 (A, B) to transmit the request or the response away from the adjacent node 40 (A+1, B) or the link 41 to the adjacent node 40 (A+1, B) having the faults.

In the step 1601, if it is judged that the condition A<a is not satisfied, the destination node 40 (a, b) is positioned on the left side of the node 40 (A, B). In this case, the adjacent node 40 (A−1, B) on the left side is positioned on the shortest path from the node 40 (A, B) to the destination node 40 (a, b). Then, the node 40 (A, B) transmits the request or the response to the adjacent node 40 (A−1, B) on the left side (1606).

Next, the node 40 (A, B) judges whether or not the transmission is successful (1607).

In the step 1607, if it is judged that the transmission is successful, the process ends (1608).

On the other hand, in the step 1607, if it is judged that the transmission is not successful, the adjacent node 40 (A−1, B) on the left side or the link 41 to the adjacent node 40 (A−1, B) may have some faults. In this case, the node 40 judges whether or not the condition A−1=a is satisfied (1609).

In the step 1609, if it is judged that the condition A−1=a is satisfied, the destination node 40 (a, b) is adjacent to the node 40 (A, B) on the left side. In this case, in order to search other links 41 to the destination node 40 (a, b), the node 40 (A, B) increments the value of the search count by '1' (1610).

Next, the node 40 (A, B) judges whether or not the value of the search count is larger than 8 (1611).

In the step 1611, if it is judged that the value of the search count is larger than 8, all the transmissions have failed over all links 41 to the destination node 40 (a, b). Then, an unable transmission fault is reported (1620) and the process ends (1621).

On the other hand, in the step 1611, if it is judged that the value of the search count is not larger than 8, some transmittable links 41 to the destination node 40 (a, b) may remain. Then, the node 40 (A, B) judges whether or not the reverse search mark 503 is added to the request or the response (1612).

In the step 1612, if it is judged that the reverse search mark 503 is not added, the counterclockwise search is executed. In this case, the node 40 (A, B) transmits the request or the response to the adjacent node 40 (A, B+1) on the upper side (1613). Since the destination node 40 (a, b) is adjacent to the node 40 (A, B) on the left side, the request or the response is transmitted to go around the destination node 40 (a, b) in the counterclockwise direction.

Next, the node 40 (A, B) judges whether or not the transmission is successful (1614).

In the step 1614, if it is judged that the transmission is successful, the process ends (1615).

On the other hand, in the step 1614, if it is judged that the transmission is not successful, the adjacent node 40 (A, B+1) on the upper side or the link 41 to the adjacent node 40 (A, B+1) may have some faults. Therefore, the node 40 (A, B) cannot further perform the counterclockwise search. Then, the node 40 sets the value of the search count to '1', adds the reverse search mark 503 (1616), and transmits the request or the response to the adjacent node 40 (A, B−1) on the lower side (1617). Since the destination node 40 (a, b) is adjacent to the node 40 (A, B) on the left side, the request or the response is transmitted to go around the destination node 40 (a, b) in the clockwise direction. Thus, the clockwise search begins.

The node 40 (A, B+1) and the node 40 (A, B−1) are positioned on the two different second shortest paths from the node 40 (A, B) to the destination node 40 (a, b) respectively.

In the step 1612, if it is judged that the reverse search mark 503 is added, it means that the clockwise search has been executed. Then, the process jumps to the step 1617, without executing the steps from 1613 to 1616, and the node 40 (A, B) transmits the request or the response to the adjacent node (A, B−1) on the lower side.

Next, the node 40 (A, B) judges whether or not the transmission is successful (1618).

In the step 1618, if it is judged that the transmission is successful, the process ends (1619).

On the other hand, in the step 1618, if it is judged that the transmission is not successful, both the counterclockwise search and the clockwise search cannot be further performed. Then, the node 40 (A, B) reports an unable transmission fault (1620) and ends the process (1621).

In the step 1609, if it is judged that the condition A−1=a is not satisfied, the destination node 40 (a, b) is positioned on the left side of the node 40 (A, B), but it is adjacent thereto. Then, the node 40 (A, B) transmits the request or the response away from the adjacent node 40 (A−1, B) or the link 41 to the adjacent node (A−1, B) having some faults. Similarly, in the step 1605, if it is judged that the condition A+1=a is not satisfied, then the node 40 (A, B) transmits the request or the response away from the adjacent node 40 (A+1, B) or the link 41 to the adjacent node (A+1, B) having some faults.

In the step 1609, if it is judged that the condition A−1=a is not satisfied, and, in the step 1605, if it is judged that the condition A+1=a is not satisfied, the adjacent node 40 (A, B+1) on the upper side of the node 40 (A, B) and the adjacent node 40 (A, B−1) on the lower side of the node 40 (A, B) are positioned on the two different second shortest paths from the node 40 (A, B) to the destination node 40 (a, b) respectively. Therefore, the packet 50 for the request or the response is transmitted to the adjacent node 40 (A, B+1) on the upper side of the node 40 (A, B) or to the adjacent node 40 (A, B−1) on the lower side of the node 40 (A, B).

First, the node 40 (A, B) adds the detour mark 502 to the request or the response (1622). Specifically, the node 40 (A, B) sets the value of the detour mark 502 of the packet 50 for the request or the response to valid.

Next, the node 40 (A, B) measures the traffic amount γ between the node 40 (A, B) and the adjacent node 40 (A, B+1) on the upper side (1623).

Next, the node 40 (A, B) measures the traffic amount δ between the node 40 (A, B) and the adjacent node 40 (A, B−1) on the lower side.

The node 40 (A, B+1) and the node 40 (A, B−1) are positioned on the two different second shortest path from the node 40 (A, B) to the destination node 40 (a, b) respectively.

Next, the node 40 (A, B) judges whether or not the traffic amount γ is smaller than the traffic amount δ (1625).

In the step 1625, if it is judged that the traffic amount γ is smaller than the traffic amount δ, the node 40 (A, B) transmits the request or the response to the adjacent node 40 (A, B+1) on the upper side (1626).

Next, the node 40 (A, B) judges whether or not the transmission is successful (1627).

In the step 1627, if it is judged that the transmission is successful, the process ends (1628).

On the other hand, in the step 1627, if it is judged that the transmission is not successful, the adjacent node 40 (A, B+1) on the upper side or the link 41 to the adjacent node 40 (A, B+1) may have some faults. Then, the node 40 (A, B) transmits the request or the response to the adjacent node 40 (A, B−1) on the lower side (1629).

Next, the node 40 (A, B) judges whether or not the transmission is successful (1618). The process after the step 1618 is as described above.

In the step 1625, if it is judged that the traffic amount γ is not smaller than the traffic amount δ, the node 40 (A, B) transmits the request or the response to the adjacent node 40 (A, B−1) on the lower side (1630).

Next, the node 40 (A, B) judges whether or not the transmission is successful (1631).

In the step 1631, if it is judged that the transmission is successful, the process ends (1632).

On the other hand, in the step 1631, if it is judged that the transmission is not successful, the adjacent node 40 (A, B−1) on the lower side or the link 41 to the adjacent node 40 (A, B−1) may have some faults. Then, the node 40 (A, B) transmits the request or the response to the adjacent node 40 (A, B+1) on the upper side (1633).

Next, the node 40 (A, B) judges whether or not the transmission is successful (1618). The process after the step 1618 is as described above.

Figure 17:
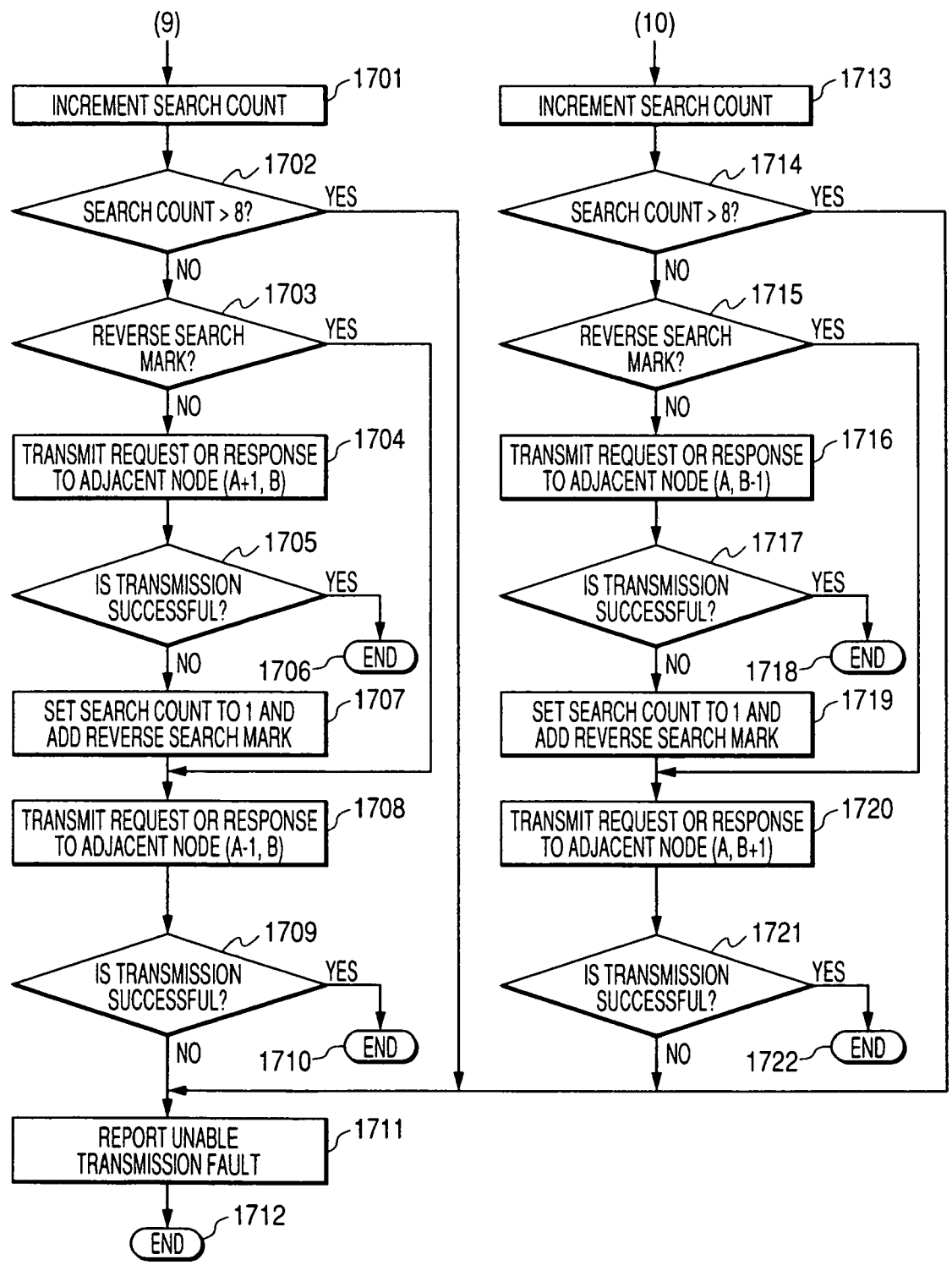
FIG. 17 is a flowchart of a process to be executed when the destination node is in the same row or column as the node, in the routing algorithm according to the first embodiment of the invention which takes faults into consideration.

FIG. 17 is a flowchart of a process to be executed when the destination node 40 (a, b) is in the same row or column as the node 40 (A, B), in the routing algorithm according to the first embodiment of the invention which takes faults into consideration.

In the step 1505 of FIG. 15, if it is judged that the condition B+1=b is satisfied (9), the destination node 40 (a, b) is adjacent to the node 40 (A, B) on the upper side. In this case, in order to search other links 41 to the destination node 40 (a, b), the node 40 (A, B) increments the value of the search count by '1' (1701).

Next, the node 40 (A, B) judges whether or not the value of the search count is larger than 8 (1702).

In the step 1702, if it is judged that the value of the search count is larger than 8, all the transmissions have failed over all links 41 to the destination node 40 (a, b). Then, an unable transmission fault is reported (1711) and the process ends (1712).

On the other hand, in the step 1702, if it is judged that the value of the search count is not larger than 8, some transmittable links 41 to the destination node 40 (a, b) may remain. Then, the node 40 (A, B) judges whether or not the reverse search mark 503 is added to the request or the response (1703).

In the step 1703, if it is judged that the reverse search mark 503 is not added, the counterclockwise search is executed. In this case, the node 40 (A, B) transmits the request or the response to the adjacent node 40 (A+1, B) on the right side (1704). Since the destination node 40 (a, b) is adjacent to the node 40 (A, B) on the upper side, the request or the response is transmitted to go around the destination node 40 (a, b) in the counterclockwise direction.

Next, the node 40 (A, B) judges whether or not the transmission is successful (1705).

In the step 1705, if it is judged that the transmission is successful, the process ends (1706).

On the other hand, in the step 1705, if it is judged that the transmission is not successful, the adjacent node 40 (A+1, B) on the right side or the link 41 to the adjacent node 40 (A+1, B) may have some faults. Therefore, the node 40 (A, B) cannot further perform the counterclockwise search. Then, the node 40 sets the value of the search count to '1', adds the reverse search mark 503 (1707), and transmits the request or the response to the adjacent node 40 (A−1, B) on the left side (1708). Since the destination node 40 (a, b) is adjacent to the node 40 (A, B) on the upper side, the request or the response is transmitted to go around the destination node 40 (a, b) in the clockwise direction. Thus, the clockwise search begins.

The node 40 (A+1, B) and the node 40 (A−1, B) are positioned on the two different second shortest paths from the node 40 (A, B) to the destination node 40 (a, b) respectively.

In the step 1703, if it is judged that the reverse search mark 503 is added, it means that the clockwise search has been executed. Then, the process jumps to the step 1708, without executing the steps from 1704 to 1707, and the node 40 (A, B) transmits the request or the response to the adjacent node (A−1, B) on the left side.

Next, the node 40 (A, B) judges whether or not the transmission is successful (1709).

In the step 1709, if it is judged that the transmission is successful, the process ends (1710).

On the other hand, in the step 1709, if it is judged that the transmission is not successful, both the counterclockwise search and the clockwise search cannot be further performed. Then, the node 40 (A, B) reports an unable transmission fault (1711) and ends the process (1712).

In the step 1605 of FIG. 16, if it is judged that the condition A+1=a is satisfied (10), the destination node 40 (a, b) is adjacent to the node 40 (A, B) on the right side. In this case, in order to search other links 41 to the destination node 40 (a, b), the node 40 (A, B) increments the value of the search count by '1' (1713).

Next, the node 40 (A, B) judges whether or not the value of the search count is larger than 8 (1714).

In the step 1714, if it is judged that the value of the search count is larger than 8, all the transmissions have failed over all links 41 to the destination node 40 (a, b). Then, an unable transmission fault is reported (1711) and the process ends (1712).

On the other hand, in the step 1714, if it is judged that the value of the search count is not larger than 8, some transmittable links 41 to the destination node 40 (a, b) may remain. Then, the node 40 (A, B) judges whether or not the reverse search mark 503 is added to the request or the response (1715).

In the step 1715, if it is judged that the reverse search mark 503 is not added, the counterclockwise search is executed. In this case, the node 40 (A, B) transmits the request or the response to the adjacent node 40 (A, B−1) on the lower side (1716). Since the destination node 40 (a, b) is adjacent to the node 40 (A, B) on the right side, the request or the response is transmitted to go around the destination node 40 (a, b) in the counterclockwise direction.

Next, the node 40 (A, B) judges whether or not the transmission is successful (1717).

In the step 1717, if it is judged that the transmission is successful, the process ends (1718).

On the other hand, in the step 1717, if it is judged that the transmission is not successful, the adjacent node 40 (A, B−1) on the lower side or the link 41 to the adjacent node 40 (A, B−1) may have some faults. Therefore, the node 40 (A, B) cannot further perform the counterclockwise search. Then, the node 40 sets the value of the search count to '1', adds the reverse search mark 503 (1719), and transmits the request or the response to the adjacent node 40 (A, B+1) on the upper side (1720). Since the destination node 40 (a, b) is adjacent to the node 40 (A, B) on the right side, the request or the response is transmitted to go around the destination node 40 (a, b) in the clockwise direction. Thus, the clockwise search begins.

The node 40 (A, B+1) and the node 40 (A, B−1) are positioned on the two different second shortest paths from the node 40 (A, B) to the destination node 40 (a, b) respectively.

In the step 1715, if it is judged that the reverse search mark 503 is added, it means that the clockwise search has been executed. Then, the process jumps to the step 1720, without executing the steps from 1716 to 1719, and the node 40 (A, B) transmits the request or the response to the adjacent node (A, B+1) on the upper side.

Next, the node 40 (A, B) judges whether or not the transmission is successful (1721).

In the step 1721, if it is judged that the transmission is successful, the process ends (1722).

On the other hand, in the step 1721, if it is judged that the transmission is not successful, both the counterclockwise search and the clockwise search cannot be further performed. Then, the node 40 (A, B) reports an unable transmission fault (1711) and ends the process (1712).

Figure 18:
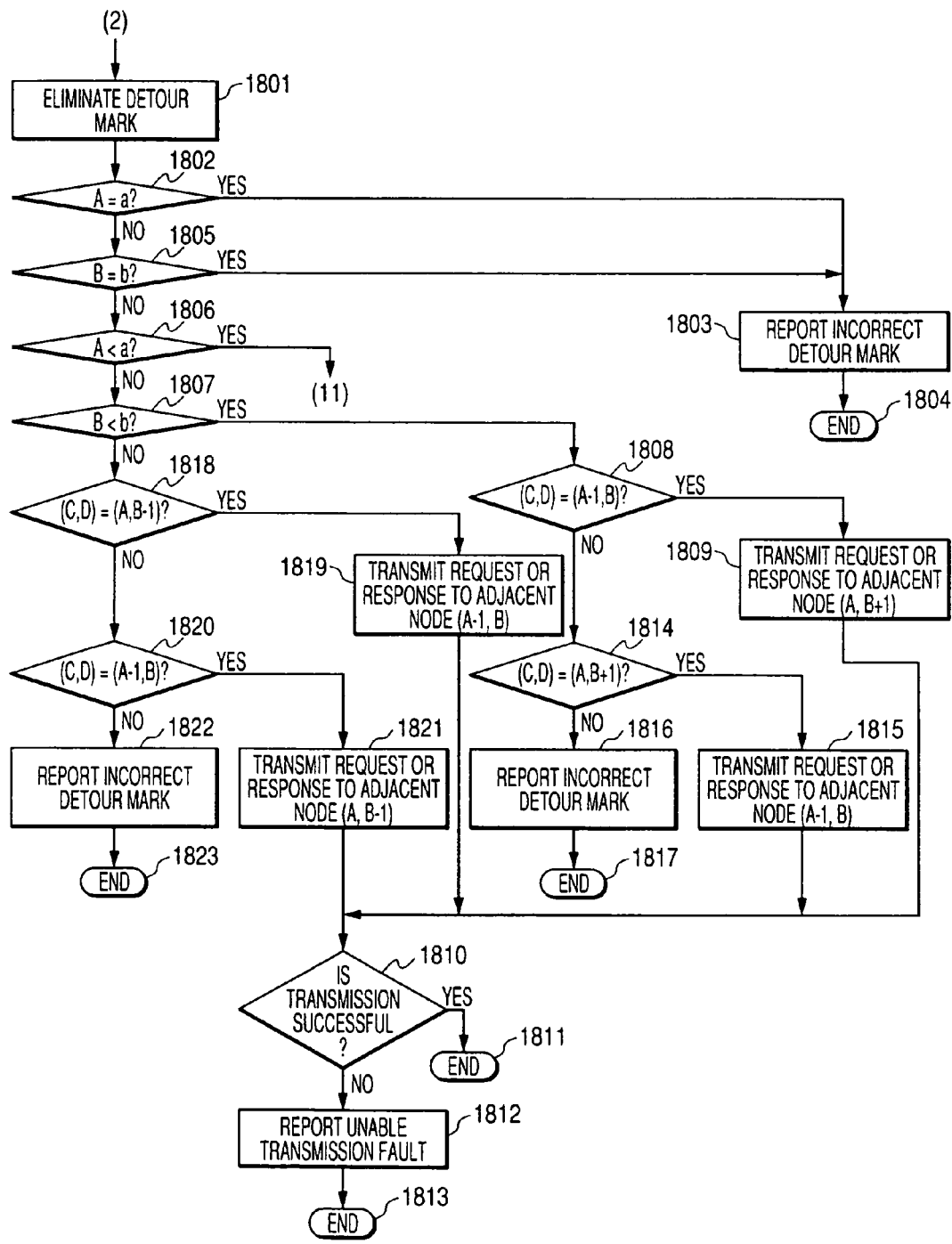
FIG. 18 is a flowchart of a process to be executed when a detour mark is added to a request or response, in the routing algorithm according to the first embodiment of the invention which takes faults into consideration.

FIG. 18 is a flowchart of a process to be executed when the detour mark 502 is added to the request or the response, in the routing algorithm according to the first embodiment of the invention which takes faults into consideration.

The request or the response with the detour mark 502 added thereto is transmitted away from some faults. However, if the node 40 (A, B) receives such a request or response and determines the destination according to the basic process, the request or the response may be returned to the sender node 40 (the node 40 which added the detour mark 502 to the request or the response). Thus, the process of FIG. 18 is executed such that the node 40 (A, B) which receives the request or the response with the detour mark 502 added thereto does not transmit the received request or response to the sender node 40.

In the step 1010 of FIG. 10, if it is judged that the detour mark 502 is added to the received request or the received response, the request or the response is transmitted away from some faults. In this case, the node 40 (A, B) eliminates the added detour mark 502 (1801). Specifically, the node 40 (A, B) sets the value of the detour mark 502 of the packet 50 for the received request or response to 'invalid'.

Next, the node 40 (A, B) judges whether or not the condition A=a is satisfied (1802).

In the step 1802, if it is judged that the condition A=a is satisfied, the destination node 40 (a, b) is in the same column as the node 40 (A, B). However, as shown in the steps 1526, 1529, 1530, and 1533 of FIG. 15, the request or the response with the detour mark 502 added thereto is transmitted to a node 40 in a column different from the destination node 40 (a, b). Therefore, in the step 1802, if it is judged that the condition A=a is satisfied, the added detour mark 502 is incorrect. Then, the node 40 (A, B) reports the incorrect detour mark 502 (1803) and ends the process (1804). In this case, the report destination may be the same as the report destination of the unable transmission fault.

On the other hand, in the step 1802, if it is judged that the condition A=a is not satisfied, the destination node 40 (a, b) is in a column different from the node 40 (A, B). Then, the node 40 judges whether or not the condition B=b is satisfied (1805).

In the step 1805, if it is judged that the condition B=b is satisfied, the destination node 40 is in the same row as the node 40. However, as shown in the steps 1626, 1629, 1630, and 1633 of FIG. 16, the request or the response with the detour mark 502 added thereto is transmitted to a node 40 in a row different from the destination node 40 (a, b). Therefore, in the step 1805, if it is judged that the condition B=b is satisfied, the added detour mark 502 is incorrect. Then, the node 40 (A, B) reports the incorrect detour mark 502 (1803) and ends the process (1804).

On the other hand, in the step 1805, if it is judged that the condition B=b is not satisfied, the destination node 40 (a, b) is in a row different from the node 40 (A, B). Then, the node 40 judges whether or not the condition A<a is satisfied (1806).

In the step 1806, if it is judged that the condition A<a is satisfied, the destination node 40 (a, b) is positioned on the right side of the node 40 (A, B). In this case, the process progresses to a step 1901 of FIG. 19, which is connected to (11) of FIG. 18.

On the other hand, in the step 1806, if it is judged that the condition A<a is not satisfied, the destination node 40 (a, b) is positioned on the left side of the node 40 (A, B). In this case, the node 40 (A, B) judges whether or not the condition B<b is satisfied (1807).

When the condition B<b is satisfied, the destination node 40 (a, b) is positioned on the upper side of the node 40 (A, B). In the step 1807, if it is judged that the condition B<b is satisfied, the destination node 40 (a, b) is positioned on the upper left side of the node 40 (A, B), since, in the step 1806, it is judged that the condition A<a is not satisfied.

In this case, the node 40 (A, B) specifies the sender node 40 (C, D) of the received request or the received response. First, it is judged whether or not the received request or the received response is transmitted from the adjacent node 40 (A−1, B) on the left side of the node 40 (A, B)(1808). Specifically, when the address of the sender node 40 (the node 40 which transmitted the received request or the received response to the node 40 (A, B)) is (C, D), it is judged whether or not the condition (C, D)=(A−1, B) is satisfied.

In the step 1808, if it is judged that the condition (C, D)=(A−1, B) is satisfied, the received request or the received response is transmitted from the adjacent node 40 (A−1, B) on the left side of the node 40 (A, B). In this case, the node 40 (A, B) transmits the request or the response to the adjacent node 40 (A, B+1) on the upper side (1809). As a result, the node 40 (A, B) does not transmit the request or the response to the sender node 40 (A−1, B).

Next, the node 40 (A, B) judges whether or not the transmission is successful (1810).

In the step 1810, if it is judged that the transmission is successful, the process ends (1811).

On the other hand, in the step 1810, if it is judged that the transmission is not successful, the detour cannot be performed. In this case, an unable transmission fault is reported (1812) and the process ends (1813).

In the step 1808, if it is judged that the condition (C, D)=(A−1, B) is not satisfied, then the node 40 (A, B) judges whether or not the received request or the received response is transmitted from the adjacent node 40 (A, B+1) on the upper side of the node 40 (A, B)(1814). Specifically, when the address of the sender node 40 is (C, D), the node 40 (A, B) judges whether or not the condition (C, D)=(A, B+1) is satisfied.

In the step 1814, if it is judged that the condition (C, D)=(A, B+1) is satisfied, the received request or the received response is transmitted from the adjacent node 40 (A, B+1) on the upper side of the node 40 (A, B). In this case, the node 40 (A, B) transmits the request or the response to the adjacent node 40 (A−1, B) on the left side (1815). As a result, the node 40 (A, B) does not transmit the request or the response to the sender node 40 (A, B+1).

Next, the node 40 (A, B) judges whether or not the transmission is successful (1810). The process after the step 1810 is as described above.

In the step 1814, if it is judged that the condition (C, D)=(A, B+1) is not satisfied, the received request or response is not transmitted from the adjacent node 40 (A, B+1) on the upper side of the node 40 (A, B).

The request or the response with the detour mark 502 added thereto is transmitted from a node 40 in the same row or column as the destination node 40 (a, b) to a node 40 in a row or column different from the destination node 40 (a, b) (see FIGS. 15 and 16). Therefore, when the node 40 (A, B) which receives the request or the response with the detour mark 502 added thereto is positioned on the lower right side of the destination node 40 (a, b) (that is, the destination node 40 (a, b) is positioned on the upper left side of the node 40 (A, B)), the node 40 (C, D) which transmits the request or the response must be adjacent to the node 40 (A, B), which receives the request or the response, on the left side or the upper side.

However, in the step 1814, if it is judged that the condition (C, D)=(A, B+1) is not satisfied, the received request or the received response is not transmitted either from the adjacent node 40 (A, B+1) on the upper side of the node 40 (A, B) or the adjacent node 40 (A−1, B) on the left side thereof. Therefore, the node 40 (A, B) reports the incorrect detour mark 502 (1816) and ends the process (1817).

In the step 1807, if it is judged that the condition B<b is not satisfied, the destination node 40 (a, b) is positioned on the lower left side of the node 40 (A, B).

In this case, the node 40 (A, B) specifies the sender node 40 (C, D) of the received request or the received response. First, it is judged whether or not the received request or the received response is transmitted from the adjacent node 40 (A, B−1) on the lower side of the node 40 (A, B) (1818). Specifically, when the address of the sender node 40 is (C, D), it is judged whether or not the condition (C, D)=(A, B−1) is satisfied.

In the step 1818, if it is judged that the condition (C, D)=(A, B−1) is satisfied, the received request or the received response is transmitted from the adjacent node 40 (A, B−1) on the lower side of the node 40 (A, B). In this case, the node 40 (A, B) transmits the request or the response to the adjacent node 40 (A−1, B) on the left side (1819). As a result, the node 40 (A, B) does not transmit the request or the response to the sender node 40 (A, B−1).

Next, the node 40 (A, B) judges whether or not the transmission is successful (1810). The process after the step 1810 is as described above.

In the step 1818, if it is judged that the condition (C, D)=(A, B−1) is not satisfied, then the node 40 (A, B) judges whether or not the received request or the received response is transmitted from the adjacent node 40 (A−1, B) on the left side of the node 40 (A, B) (1820). Specifically, when the address of the sender node 40 is (C, D), the node 40 (A, B) judges whether or not the condition (C, D)=(A−1, B) is satisfied.

In the step 1820, if it is judged that the condition (C, D)=(A−1, B) is satisfied, the received request or the received response is transmitted from the adjacent node 40 (A−1, B) on the left side of the node 40 (A, B). In this case, the node 40 (A, B) transmits the request or the response to the adjacent node 40 (A, B−1) on the lower side (1821). As a result, the node 40 (A, B) does not transmit the request or the response to the sender node 40 (A−1, B).

Next, the node 40 (A, B) judges whether or not the transmission is successful (1810). The process after the step 1810 is as described above.

In the step 1820, if it is judged that the condition (C, D)=(A−1, B) is not satisfied, the received request or the received response is not transmitted from the adjacent node 40 (A−1, B) on the left side of the node 40 (A, B).

When the node 40 (A, B) which receives the request or the response with the detour mark 502 added thereto is positioned on the upper right side of the destination node 40 (a, b) (that is, the destination node 40 (a, b) is positioned on the lower left side of the node 40 (A, B)), the node 40 (C, D) which transmits the request or the response must be adjacent to the node 40 (A, B), which receives the request or the response, on the left side or the lower side.

However, in the step 1820, if it is judged that the condition (C, D)=(A−1, B) is not satisfied, the received request or the received response is not transmitted from the adjacent node 40 (A−1, B) on the left side of the node 40 (A, B) or the adjacent node 40 (A, B−1) on the lower side thereof. Therefore, the node 40 (A, B) reports the incorrect detour mark 502 (1822) and ends the process (1823).

Figure 19:
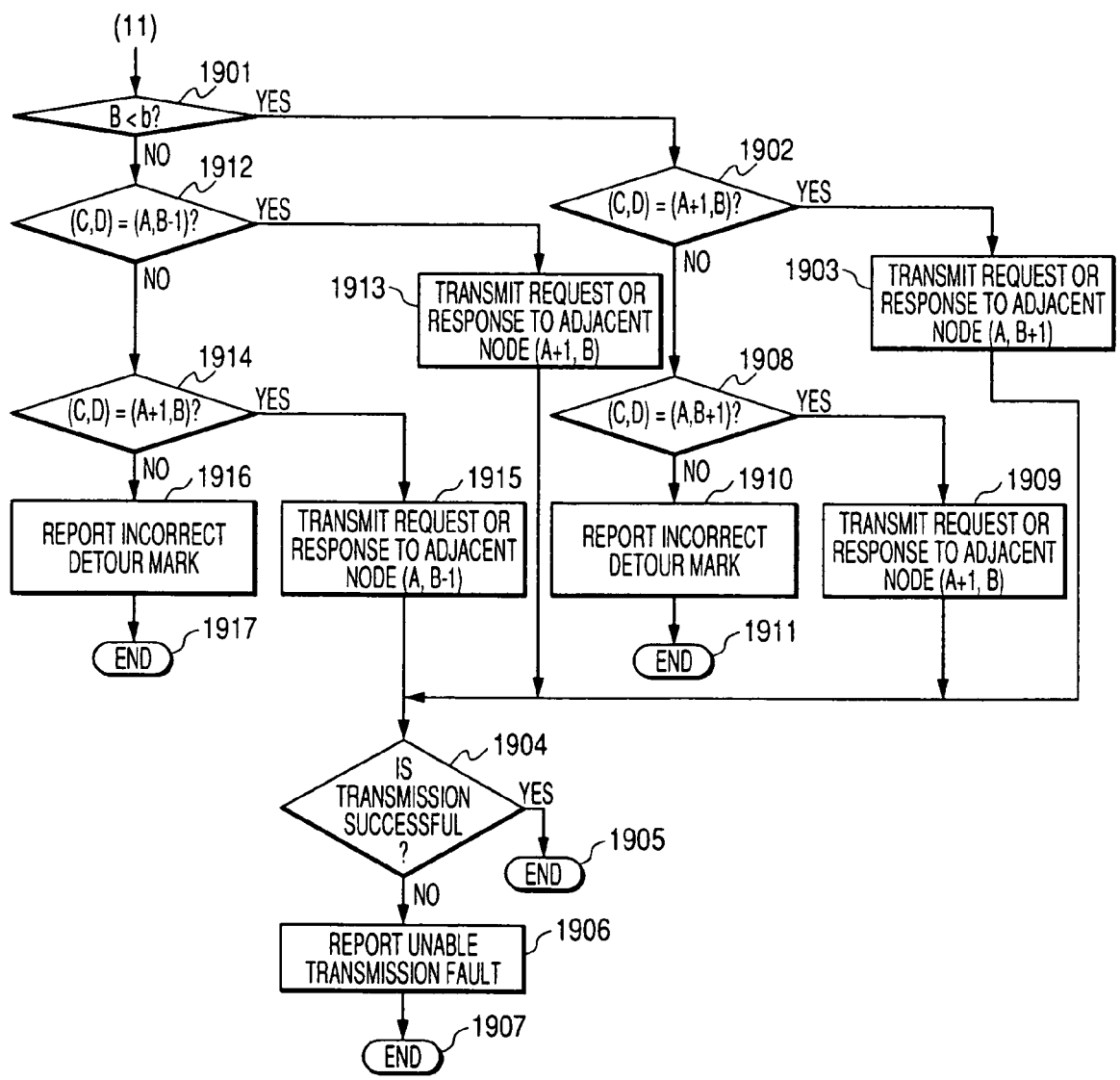
FIG. 19 is a flowchart of a process to be executed when the detour mark is added to the request or the response and the destination node is positioned on a right side of the node, in the routing algorithm according to the first embodiment of the invention which takes faults into consideration.

FIG. 19 is a flowchart of a process to be executed when the detour mark 502 is added to the request or the response and the destination node 40 (a, b) is positioned on the right side of the node 40 (A, B), in the routing algorithm according to the first embodiment of the invention which takes faults into consideration.

In the step 1806 of FIG. 18, if it is judged that the condition A<a is satisfied, the destination node 40 (a, b) is positioned on the right side of the node 40 (A, B). In this case, the node 40 (A, B) judges whether or not the condition B<b is satisfied (1901).

When the condition B<b is satisfied, the destination node 40 (a, b) is positioned on the upper side of the node 40 (A, B). In the step 1901, if it is judged that the condition B<b is satisfied, the destination node 40 (a, b) is positioned on the upper right side of the node 40 (A, B), since, in the step 1806, it is judged that the condition A<a is satisfied.

In this case, the node 40 (A, B) specifies the sender node 40 (C, D) of the received request or the received response. First, it is judged whether or not the received request or the received response is transmitted from the adjacent node 40 (A+1, B) on the right side of the node 40 (A, B) (1902). Specifically, when the address of the sender node 40 is (C, D), it is judged whether or not the condition (C, D)=(A+1, B) is satisfied.

In the step 1902, if it is judged that the condition (C, D)=(A+1, B) is satisfied, the received request or the received response is transmitted from the adjacent node 40 (A+1, B) on the right side of the node 40 (A, B). In this case, the node 40 (A, B) transmits the request or the response to the adjacent node 40 (A, B+1) on the upper side (1903). As a result, the node 40 (A, B) does not transmit the request or the response to the sender node 40 (A+1, B).

Next, the node 40 (A, B) judges whether or not the transmission is successful (1904).

In the step 1904, if it is judged that the transmission is successful, the process ends (1905).

On the other hand, in the step 1904, if it is judged that the transmission is not successful, the detour cannot be performed. In this case, an unable transmission fault is reported (1906) and the process ends (1907).

In the step 1902, if it is judged that the condition (C, D)=(A+1, B) is not satisfied, then the node 40 (A, B) judges whether or not the received request or the received response is transmitted from the adjacent node 40 (A, B+1) on the upper side of the node 40 (A, B) (1908). Specifically, when the address of the sender node 40 is (C, D), the node 40 (A, B) judges whether or not the condition (C, D)=(A, B+1) is satisfied.

In the step 1908, if it is judged that the condition (C, D)=(A, B+1) is satisfied, the received request or the received response is transmitted from the adjacent node 40 (A, B+1) on the upper side of the node 40 (A, B). In this case, the node 40 (A, B) transmits the request or the response to the adjacent node 40 (A+1, B) on the right side (1909). As a result, the node 40 (A, B) does not transmit the request or the response to the sender node 40 (A, B+1).

Next, the node 40 (A, B) judges whether or not the transmission is successful (1904). The process after the step 1904 is as described above.

In the step 1908, if it is judged that the condition (C, D)=(A, B+1) is not satisfied, the received request or response is not transmitted from the adjacent node 40 (A, B+1) on the upper side of the node 40 (A, B).

When the node 40 (A, B) which receives the request or the response with the detour mark 502 added thereto is positioned on the lower left side of the destination node 40 (a, b) (that is, the destination node 40 (a, b) is positioned on the upper right side of the node 40 (A, B)), the node 40 (C, D) which transmits the request or the response must be adjacent to the node 40 (A, B), which receives the request or the response, on the right side or the upper side.

However, in the step 1908, if it is judged that the condition (C, D)=(A, B+1) is not satisfied, the received request or the received response is not transmitted either from the adjacent node 40 (A, B+1) on the upper side of the node 40 (A, B) or the adjacent node 40 (A+1, B) on the right side thereof. Therefore, the node 40 (A, B) reports the incorrect detour mark 502 (1910) and ends the process (1911).

In the step 1901, if it is judged that the condition B <b is not satisfied, the destination node 40 (a, b) is positioned on the lower right side of the node 40 (A, B).

In this case, the node 40 (A, B) specifies the sender node 40 (C, D) of the received request or the received response. First, the node 40 (A, B) judges whether or not the received request or the received response is transmitted from the adjacent node 40 (A, B−1) on the lower side of the node 40 (A, B) (1912). Specifically, when the address of the source node 40 is (C, D), the node 40 (A, B) judges whether or not the condition (C, D)=(A, B−1) is satisfied.

In the step 1912, if it is judged that the condition (C, D)=(A, B−1) is satisfied, the received request or the received response is transmitted from the adjacent node 40 (A, B−1) on the lower side of the node 40 (A, B). In this case, the node 40 (A, B) transmits the request or the response to the adjacent node 40 (A+1, B) on the right side (1913). As a result, the node 40 (A, B) does not transmit the request or the response to the sender node 40 (A, B−1).

Next, the node 40 (A, B) judges whether or not the transmission is successful (1904). The process after the step 1904 is as described above.

In the step 1912, if it is judged that the condition (C, D)=(A, B−1) is not satisfied, then the node 40 (A, B) judges whether or not the received request or the received response is transmitted from the adjacent node 40 (A+1, B) on the right side of the node 40 (A, B) (1914). Specifically, when the address of the sender node 40 is (C, D), the node 40 (A, B) judges whether or not the condition (C, D)=(A+1, B) is satisfied.

In the step 1914, if it is judged that the condition (C, D)=(A+1, B) is satisfied, then the received request or the received response is transmitted from the adjacent node 40 (A+1, B) on the right side of the node 40 (A, B). In this case, the node 40 (A, B) transmits the request or the response to the adjacent node 40 (A, B−1) on the lower side (1915). As a result, the node 40 (A, B) does not transmit the request or the response to the sender node 40 (A+1, B).

Next, the node 40 (A, B) judges whether or not the transmission is successful (1904). The process after the step 1904 is as described above.

In the step 1914, if it is judged that the condition (C, D)=(A+1, B) is not satisfied, the received request or the received response is not transmitted from the adjacent node 40 (A+1, B) on the right side of the node 40.

When the node 40 (A, B) which receives the request or the response with the detour mark 502 added thereto is positioned on the upper left side of the destination node 40 (a, b) (that is, the destination node 40 (a, b) is positioned on the lower right side of the node 40 (A, B)), the node 40 (C, D) which transmits the request or the response must be adjacent to the node 40 (A, B), which receives the request or the response, on the right side or the lower side.

However, in the step 1914, if it is judged that the condition (C, D)=(A+1, B) is not satisfied, the received request or the received response is not transmitted from the adjacent node 40 (A+1, B) on the right side of the node 40 (A, B) or the adjacent node 40 (A, B−1) on the lower side thereof. Therefore, the node 40 (A, B) reports the incorrect detour mark 502 (1916) and ends the process (1917).

Figure 20:
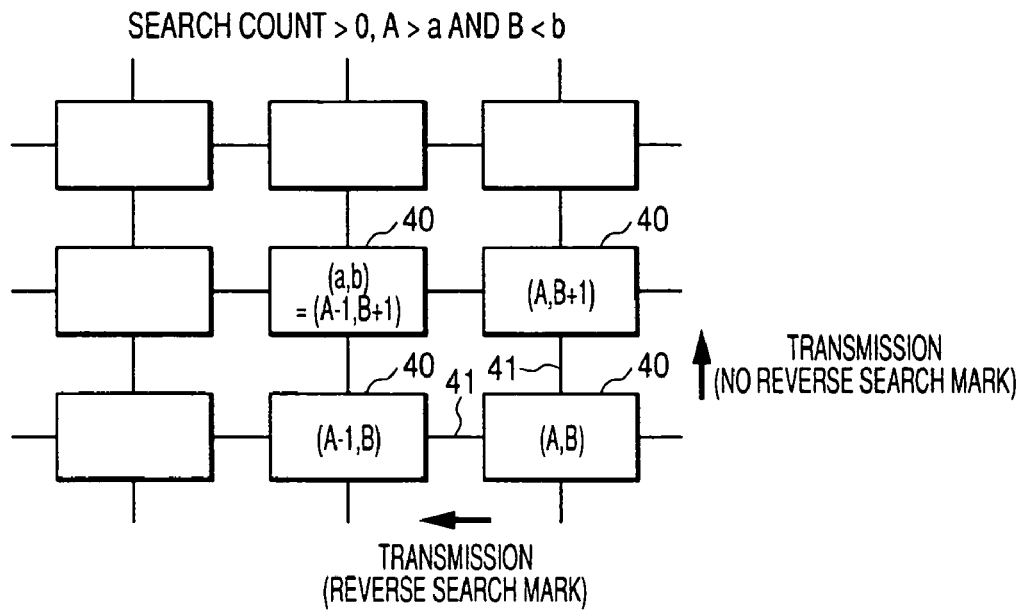
FIG. 20 is an explanatory view of an example of a search to be executed in the first embodiment of the invention.

FIG. 20 is an explanatory view of an example of a search to be executed in the first embodiment of the invention.

FIG. 20 shows the destination of the packet 50, for example, when the value of the search count 504 is larger than 0, the detour mark 502 is not added, and the destination node 40 (a, b) and the node 40 (A, B) are positioned so that the conditions A=a+1 and B=b−1 (a=A−1 and b=B+1) are satisfied. The following description is given with reference to FIGS. 10, 11, and 13.

If the node 40 (A, B) receives the packet 50 from one of the four nodes 40 adjacent to the node 40 (A, B) (1005), the process progresses to the step 1101 of FIG. 11, since the conditions A=a and B=b are not satisfied (1009) and the detour mark 502 is not added (1010).

Since the condition the search count>0 is satisfied (1103), the process progresses to the step 1301 of FIG. 13.

Since the condition A<a is not satisfied (1302) and the condition B<b is satisfied (1303), the process progresses to the step 1304.

When the reverse search mark 503 is not added to the packet 50 (1304), the node 40 (A, B) transmits the packet 50 to the adjacent node 40 (A, B+1) on the upper side (1305).

On the other hand, when the reverse search mark 503 is added to the packet 50 (1304), the node 40 (A, B) transmits the packet 50 to the adjacent node 40 (A−1, B) on the left side (1309).

Further, when the transmission in the step 1305 fails (1306), the node 40 (A, B) adds the reverse search mark 503 to the packet 50 (1308) and transmits the packet 50 to the adjacent node 40 (A−1, B) on the left side (1309).

Figure 21:
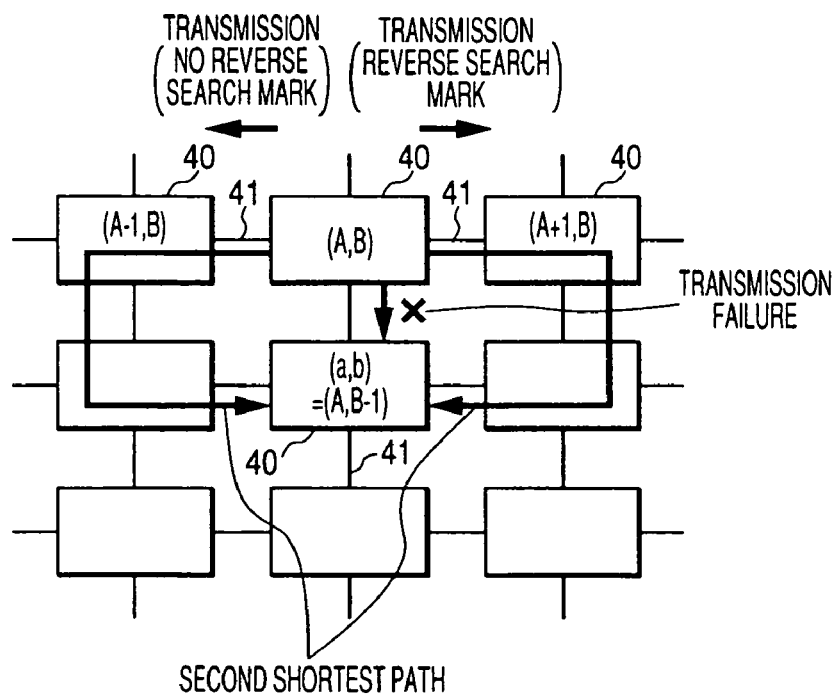
FIG. 21 is an explanatory view of another example of a search to be executed in the first embodiment of the invention.

FIG. 21 is an explanatory view of another example of a search to be executed in the first embodiment of the invention.

FIG. 21 shows the destination of the packet 50, for example, when the value of the search count 504 is larger than 0, the detour mark 502 is not added, and the destination node 40 (a, b) and the node 40 (A, B) are positioned so that the conditions A=a and B=b+1 (b=B−1) are satisfied. In addition, in the example of FIG. 21, the link 41 between the destination node 40 (a, b) and the node 40 (A, B) has some faults. The following description is given with reference to FIGS. 10, 11, and 15.

In FIG. 21, the adjacent node 40 (A−1, B) on the left side of the node 40 (A, B) and the adjacent node 40 (A+1, B) on the right side thereof are positioned on the two different second shortest paths from the node 40 (A, B) to the destination node 40 (a, b) respectively.

If the node 40 (A, B) receives the packet 50 from one of the four nodes 40 adjacent to the node (A, B) and begins the process of FIG. 10 (1005), the process progresses to the step 1101 of FIG. 11, since the conditions A=a and B=b are not satisfied (1009) and the detour mark 502 is not added (1010).

Since the condition A=a is satisfied (1101), the process progresses to the step 1501 of FIG. 15.

Since the condition B<b is not satisfied (1501), the node 40 (A, B) transmits the packet 50 to the adjacent node 40 (A, B−1) on the lower side (1506).

If the transmission in the step 1506 is successful, the process ends (1507 and 1508). In the example of FIG. 21, however, since the link 41 has some faults, the transmission from the node (A, B) to the destination node (a, b) fails.

Since the condition B−1=b is satisfied (1509), the value of the search count 504 is incremented by '1' (1510).

When the value of the search count 504 is larger than 8 (1511), an unable transmission fault is reported (1520) and the process ends (1521), since all the transmission have failed over all links 41 to the destination node 40 (a, b).

When the value of the search count 504 is equal to or less than 8 (1511) and the reverse search mark 503 is not added (1512), the node 40 (A, B) transmits the packet 50 to the adjacent node 40 (A−1, B) on the left side (1513).

On the other hand, when the reverse search mark 503 is added (1512), the node 40 (A, B) transmits the packet 50 to the adjacent node 40 (A+1, B) on the right side (1517).

When the transmission in the step 1513 fails (1514), the node 40 (A, B) adds the reverse search mark 503 to the packet 50 (1516) and transmits the packet 50 to the adjacent node 40 (A+1, B) on the right side.

Figure 22:
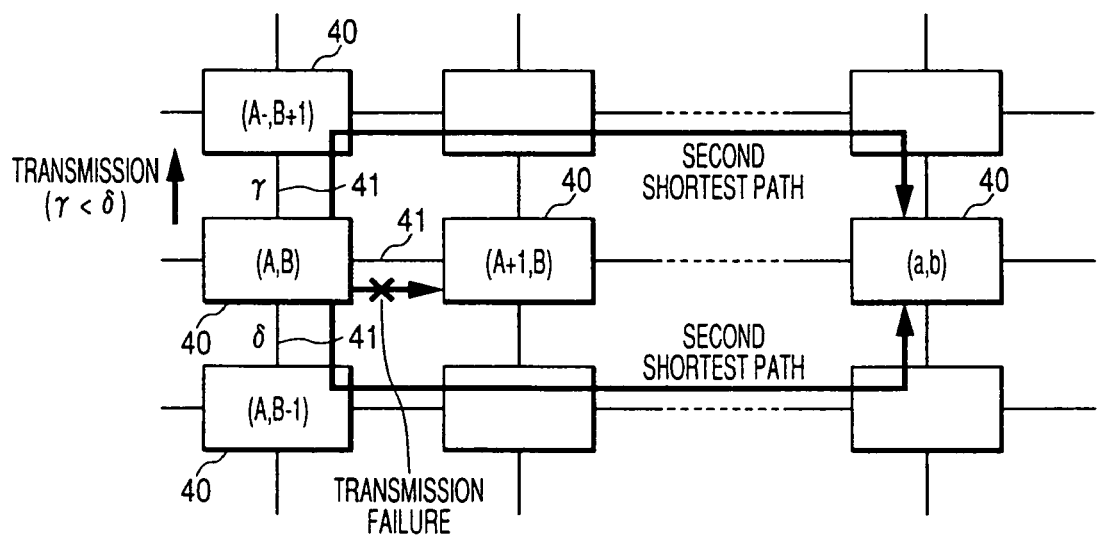
FIG. 22 is an explanatory view of a process in which the node adds the detour mark to a packet, in the first embodiment of the invention.

FIG. 22 is an explanatory view of the process in which the node 40 (A, B) adds the detour mark 502 to the packet 50, in the first embodiment of the invention.

FIG. 22 shows an example in which the destination node 40 (a, b) is in the same row as the node 40 (A, B) and is not adjacent thereto (that is, the conditions B=b and A<a are satisfied and the condition A+1=a is not satisfied). Further, the link 41 between the node 40 (A, B) and the adjacent node 40 (A+1, B) on the right side thereof has some faults. In addition, the traffic amount γ between the node 40 (A, B) and the node 40 (A, B+1) is smaller than the traffic amount δ between the node 40 (A, B) and the node 40 (A, B−1). The following description is given with reference to FIGS. 10, 11, and 16.

In FIG. 22, the adjacent node 40 (A, B+1) on the upper side of the node 40 (A, B) and the adjacent node 40 (A, B−1) on the lower side thereof are positioned on the two different second shortest paths from the node 40 (A, B) to the destination node 40 (a, b) respectively.

If the process of FIG. 10 begins, the process progresses to the step 1101 of FIG. 11, since the conditions A=a and B=b are not satisfied (1009) and the detour mark 502 is not added (1010).

Since the condition A=a is not satisfied, but the condition B=b is satisfied, the process progresses to the step 1601 of FIG. 16.

Since the condition A<a is satisfied, the node 40 (A, B) transmits the packet 50 to the adjacent node 40 (A+1, B) on the right side (1602).

If the transmission in the step 1602 is successful, the process ends (1603 and 1604). In the example of FIG. 22, however, since the link 41 has some fault, the transmission fails.

Since the condition A+1=a is not satisfied (1605), the node 40 (A, B) adds the detour mark 502 to the packet 50 (1622).

Since the traffic amount γ is smaller than the traffic amount δ (1625), the node 40 (A, B) transmits the packet 50 to the adjacent node 40 (A, B+1) on the upper side (1626). In the example of FIG. 22, the transmission in the step 1626 is successful (1627) and the process ends (1628).

Figure 23:
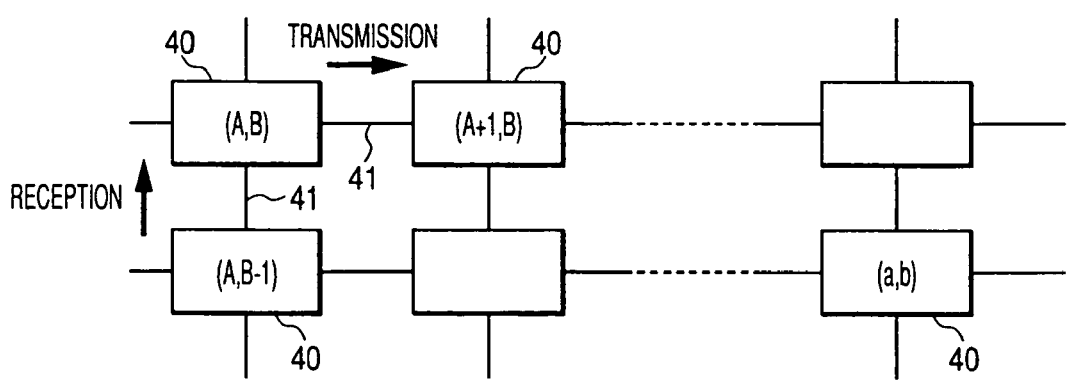
FIG. 23 is an explanatory view of a process to be executed by the node, which receives the packet with the detour mark added thereto, in the first embodiment of the invention.

FIG. 23 is an explanatory view of the process to be executed by the node 40, which receives the packet 50 with the detour mark 502 added thereto, in the first embodiment of the invention.

FIG. 23 shows an example of the process to be executed by the node 40 (A, B) which receives the packet 50 transmitted in the example of FIG. 22. The node 40 (A, B) of FIG. 23 corresponds to the node 40 (A, B+1) of FIG. 22. The following description is given with reference to FIGS. 10, 18, and 19.

If the node 40 (A, B) receives the packet 50 from the adjacent node 40 (A, B−1) on the lower side and begins the process of FIG. 10 (1005), the process progresses to the step 1801 of FIG. 18, since the conditions A=a and B=b are not satisfied (1009) and the detour mark 502 is added (1010).

The node 40 (A, B) eliminates the detour mark 502 which is added to the packet 50 (1801).

Since the condition A=a is not satisfied (1802), the condition B=b is not satisfied (1805), and the condition A<a is satisfied (1806), the process progresses to the step 1901 of FIG. 19.

Since the condition B<b is not satisfied (1901), the packet 50 have been transmitted from the adjacent node 40 (A, B−1) on the lower side of the node 40 (A, B) (1912). Then, the node 40 (A, B) transmits the packet 50 to the adjacent node 40 (A+1, B) on the right side, not to the sender node 40 (A, B−1) (1913).

In accordance with the first embodiment of the invention, the nodes 40 to which the host computers or the disk drives 104 or the both are connected are further connected to one another in the two-dimensional lattice shape by the links 41. With this, an arbitrary scale storage system can be constructed by connecting the arbitrary number of nodes 40 to one another.

Figure 24:
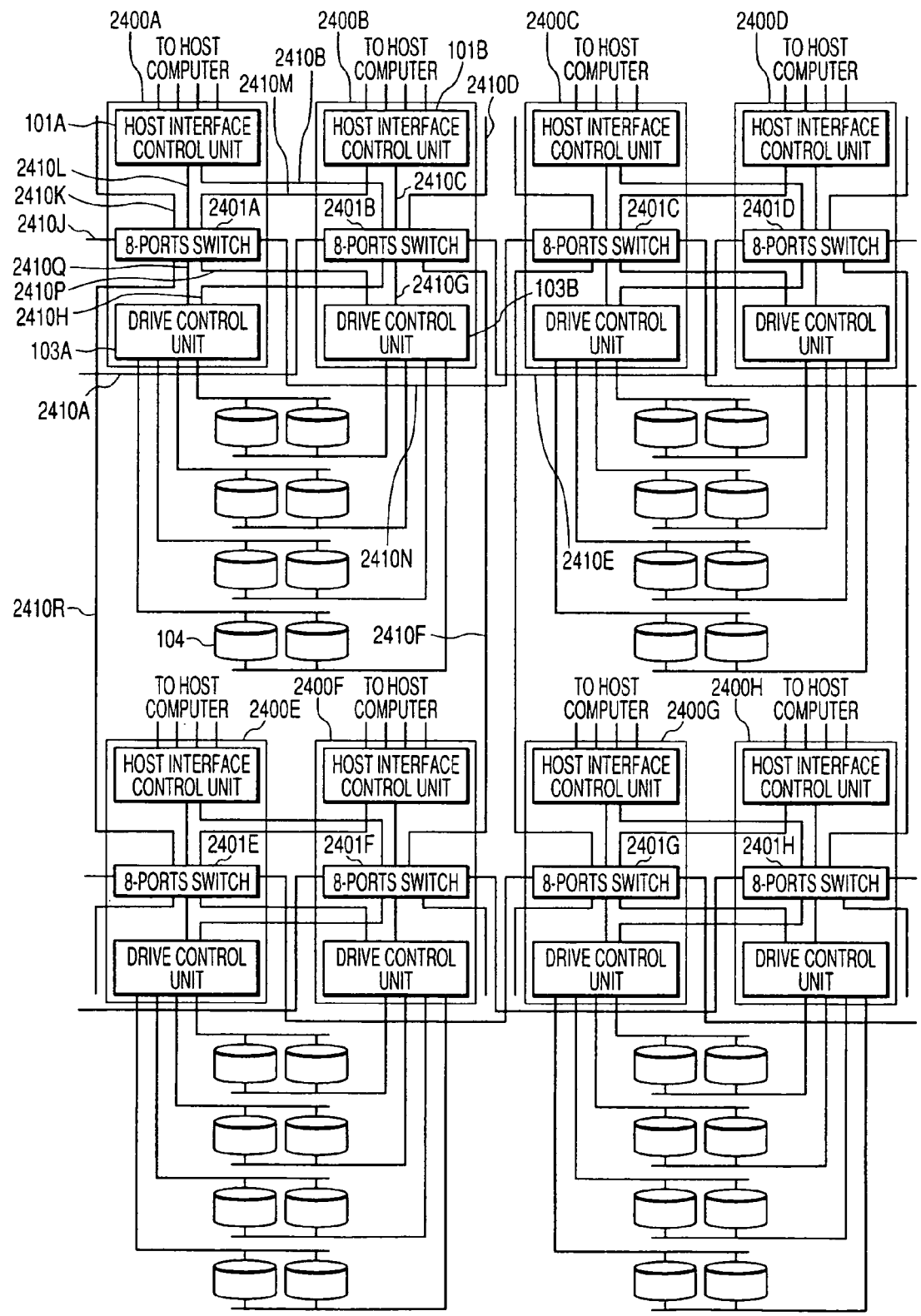
FIG. 24 is a block diagram showing a configuration of a storage system according to the second embodiment of the invention.

FIG. 24 is a block diagram showing a configuration of a storage system according to the second embodiment of the invention.

The storage system of the present embodiment has a plurality of storage control units 2400 and a plurality of disk drives 104.

The storage control unit 2400 is the same as the storage control unit 10 of the first embodiment of the invention (see FIG. 1), except that it has an 8-ports switch 2401, instead of the 6-ports switch 102. Then, in the present embodiment, the descriptions of the same portions as those of the first embodiment of the invention will be omitted.

In FIG. 24, 8 storage control units 2400A to 2400H are shown, but the storage system of the present embodiment can have the arbitrary number of storage control units 2400.

The storage control unit 2400 has a host interface control unit 101, an 8-ports switch 2401, and a drive control unit 103.

The 8-ports switch 2401 is connected to the host interface control unit 101 in the same storage control unit 2400, the drive control unit 103 in the same storage control unit 2400, the host interface control unit 101 in the adjacent storage control unit 2400, the drive control unit 103 in the adjacent storage control unit 2400, and the 8-ports switches 2401 in other storage control units 2400 and serves as a switch for switching the connections among them. The 8-ports switch 2401 has 8 ports (not shown), each port being connected to one host interface control unit 101, one drive control unit 103, or another 8-ports switch 2401.

For example, connection lines 2410A to 2410H are connected to the ports of the 8-ports switch 2401B in the storage control unit 2400B, respectively.

The connection line 2410A is connected to the 8-ports switch 2401 in another storage control unit 2400 which is not shown in FIG. 24.

The connection line 2410B is connected to the host interface control unit 101A in the storage control unit 2400A.

The connection line 2410C is connected to the host interface control unit 101B in the storage control unit 2400B.

The connection line 2410D is connected to the 8-ports switch 2401 in another storage control unit 2400 which is not shown in FIG. 24.

The connection line 2410E is connected to the 8-ports switch 2401D in the storage control unit 2400D.

The connection line 2410F is connected to the 8-ports switch 2401F in the storage control unit 2400F.

The connection line 2410G is connected to the drive control unit 103B in the storage control unit 2400B.

The connection line 2410H is connected to the drive control unit 103A in the storage control unit 2400A.

Similarly, connection lines 2410J to 2410N and 2410P to 2410R are connected to the ports of the 8-ports switch 2401A in the storage control unit 2400A, respectively.

The connection line 2410J is connected to the 8-ports switch 2401 in another storage control unit 2400 which is not shown in FIG. 24.

The connection line 2410K is connected to the 8-ports switch 2401 in another storage control unit 2400 which is not shown in FIG. 24.

The connection line 2410L is connected to the host interface control unit 101A in the storage control unit 2400A.

The connection line 2410M is connected to the host interface control unit 101B in the storage control unit 2400B.

The connection line 2410N is connected to the 8-ports switch 2401C in the storage control unit 2400C.

The connection line 2410P is connected to the drive control unit 103B in the storage control unit 2400B.

The connection line 2410Q is connected to the drive control unit 103A in the storage control unit 2400A.

The connection line 2410R is connected to the 8-ports switch 2401E in the storage control unit 2400E.

In the present embodiment, one node 40 (see FIG. 4) corresponds to two storage control units 2400 adjacent to each other. Further, one link 41 corresponds to two connection lines 2410.

For example, when the node 40 (1, 1) of FIG. 4 corresponds to the storage control units 2400A and 2400B, the link 41A corresponds to the connection lines 2410A and 2410J. The link 41B corresponds to the connection lines 2410D and 2410K. The link 41C corresponds to the connection lines 2410.E and 2410N. The link 41D corresponds to the connection lines 2410F and 2410R.

In this case, the node 40 (2, 1) of FIG. 4 corresponds to the storage control units 2400C and 2400D. The 8-ports switch 2401A of the node 40 (1, 1) is connected to the 8-ports switch 2401C of the node 40 (2, 1) via the connection line 2410N. On the other hand, the 8-ports switch 2401B of the node 40 (1, 1) is connected to the 8-ports switch 2401D of the node 40 (2, 1) via the connection line 2410E.

The node 40 of the present embodiment transmits and receives the packet 50 (see FIG. 5), like the first embodiment of the invention. The same routing algorithm as that of the first embodiment of the invention is applied to the present embodiment (see FIGS. 6 to 23).

In accordance with the present embodiment, since each node 40 and each link 41 is duplexed, fault tolerance can be enhanced, as compared to the first embodiment of the invention.

Figure 25:
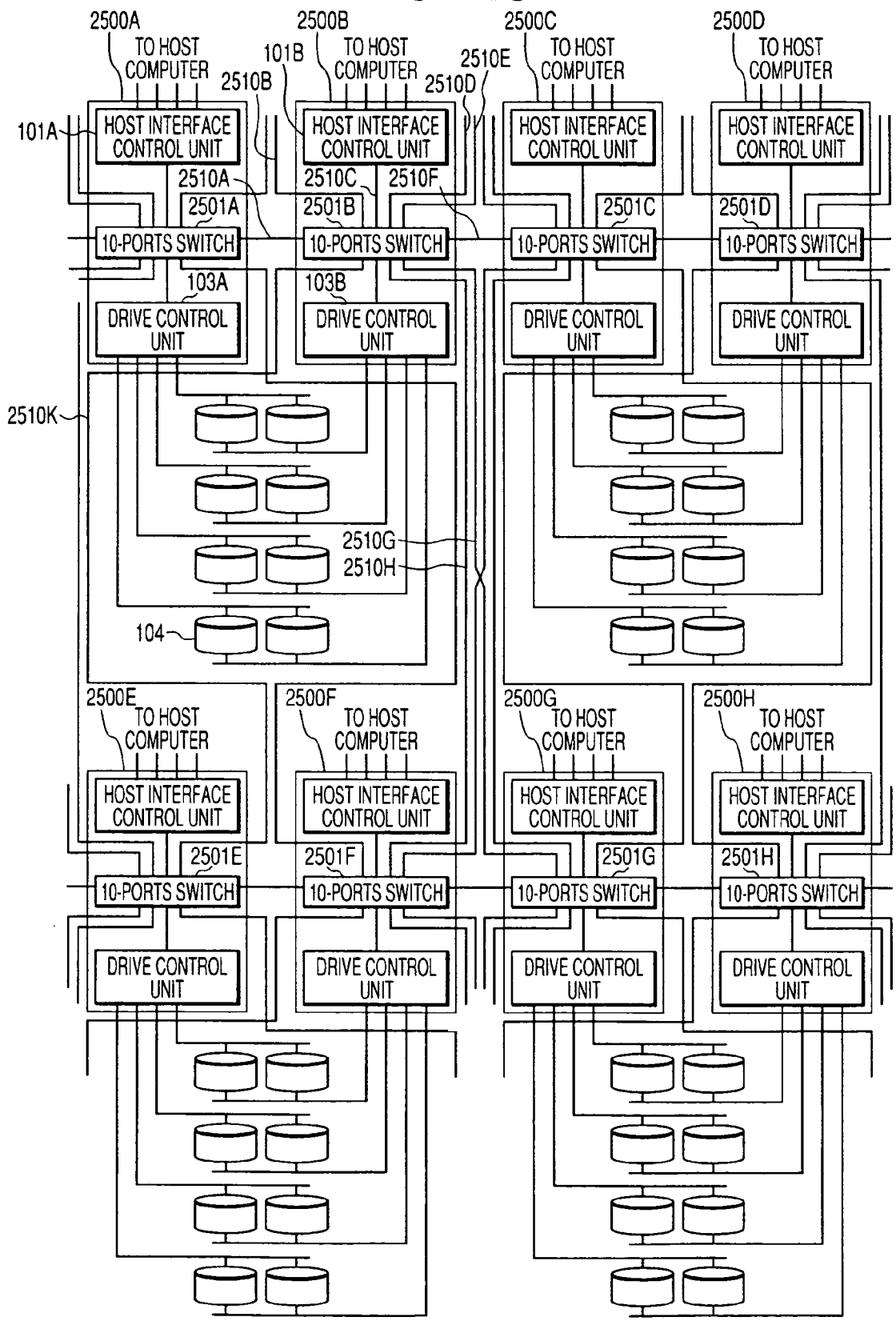
FIG. 25 is a block diagram showing a configuration of a storage system according to the third embodiment of the invention.

FIG. 25 is a block diagram showing a configuration of a storage system according to the third embodiment of the invention.

The storage system of the present embodiment has a plurality of storage control units 2500 and a plurality of disk drives 104.

The storage control unit 2500 is the same as the storage control unit 10 of the first embodiment of the invention (see FIG. 1), except that it has a 10-ports switch 2501, instead of the 6-ports switch 102. Then, in the present embodiment, the descriptions of the same portions as those of the first embodiment of the invention will be omitted.

In FIG. 25, 8 storage control units 2500A to 2500H are shown, but the storage system of the present embodiment can have the arbitrary number of storage control units 2500.

The storage control unit 2500 has a host interface control unit 101, a 10-ports switch 2501, and a drive control unit 103.

The 10-ports switch 2501 is connected to the host interface control unit 101 in the same storage control unit 2500, the drive control unit 103 in the same storage control unit 2500, and the 10-ports switches 2501 in other storage control units 2500 and serves as a switch for switching the connections among them. The 10-ports switch 2501 has 10 ports (not shown), each port being connected to one host interface control unit 101, one drive control unit 103, or another 10-ports switch 2501.

For example, connection lines 2510A to 2510H and connection lines 2510J and 2510K are connected to the ports of the 10-ports switch 2501B in the storage control unit 2500B, respectively.

The connection line 2510A is connected to the 10-ports switch 2501A in the storage control unit 2500A.

The connection line 2510B is connected to the 10-ports switch 2501 in another storage control unit 2500 which is not shown in FIG. 25.

The connection line 2510C is connected to the host interface control unit 101B in the storage control unit 2500B.

The connection line 2510D is connected to the 10-ports switch 2501 in another storage control unit 2500 which is not shown in FIG. 25.

The connection line 2510E is connected to the 10-ports switch 2501 in another storage control unit 2500 which is not shown in FIG. 25.

The connection line 2510F is connected to the 10-ports switch 2501C in the storage control unit 2500C.

The connection line 2510G is connected to the 10-ports switch 2501G in the storage control unit 2500G.

The connection line 2510H is connected to the 10-ports switch 2501F in the storage control unit 2500F.

The connection line 2510J is connected to the drive control unit 103B in the storage control unit 2500B.

The connection line 2510K is connected to the 10-ports switch 2501E in the storage control unit 2500E.

In the present embodiment, one node 40 (see FIG. 4) corresponds to one storage control unit 2500. Further, one link 41 corresponds to one connection line 2510.

For example, when the node 40 (1, 1) of FIG. 4 corresponds to the storage control unit 2500B, the links 41A, 41B, 41C, and 41D correspond to the connection lines 2510A, 2510D, 2510F, and 2510H, respectively.

In addition, though not shown in FIG. 4, the connection line 2510B is an oblique link which connects the node 40 (1, 1) to the node 40 (0, 2). Similarly, the connection line 2510E is an oblique link which connects the node 40 (1, 1) to the node 40 (2, 2), the connection line 2510G is an oblique link which connects the node 40 (1, 1) to the node 40 (2, 0), and the connection line 2510K is an oblique line which connects the node 40 (1, 1) to the node 40 (0, 0).

The node 40 of the present embodiment transmits and receives the packet 50 (see FIG. 5), like the first embodiment of the invention.

The same routing algorithm as that of the first embodiment of the invention may be applied to the present embodiment (see FIGS. 6 to 23). Alternatively, another algorithm using the oblique links may be applied to the present embodiment.

In accordance with the present embodiment, since the oblique links are used, the fault tolerance can be enhanced, as compared to the first embodiment of the invention. In addition, since the nodes 40 in an oblique direction are directly connected to one another, the data transmission capability between these nodes 40 can be enhanced.

Figure 26:
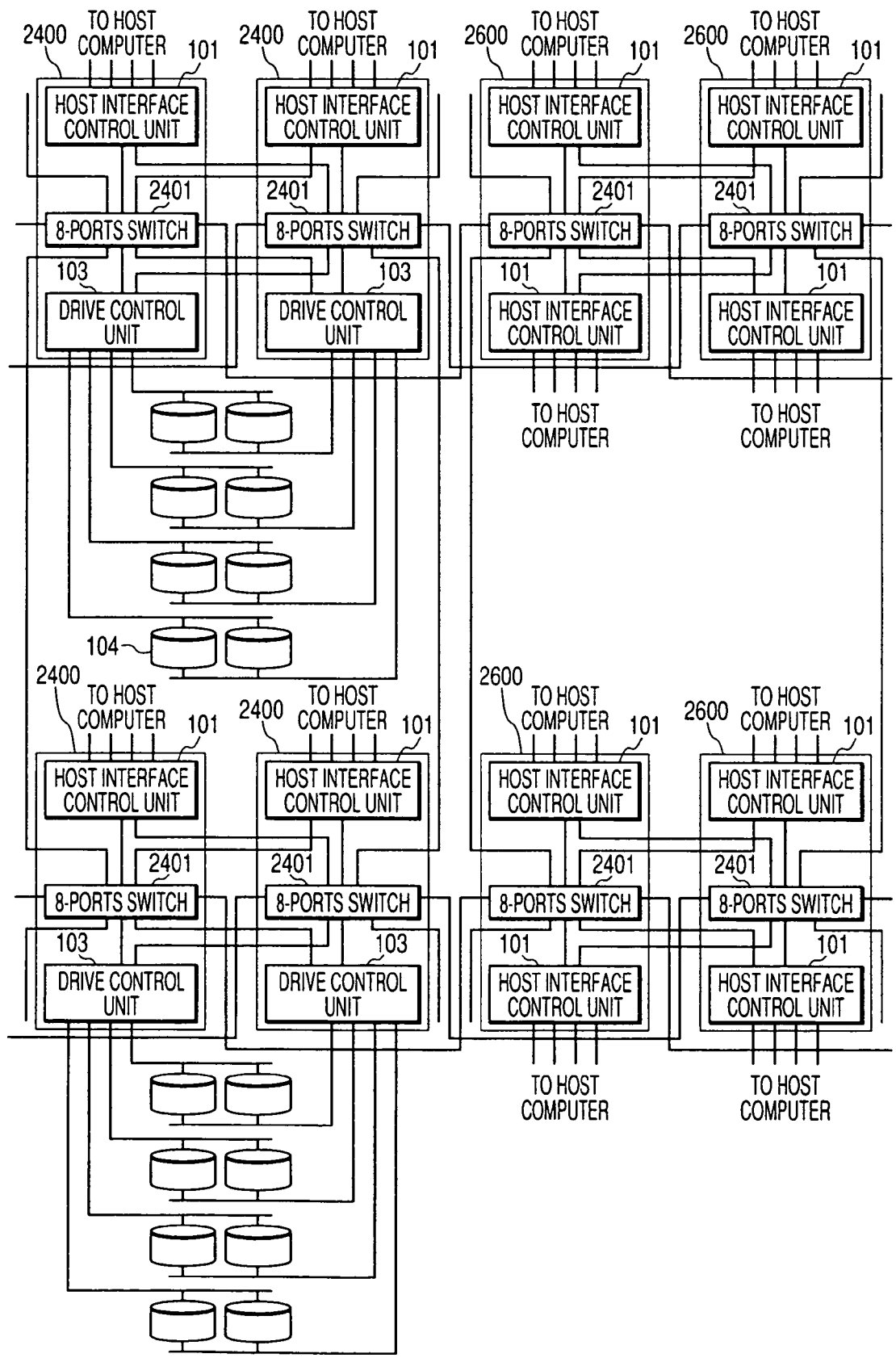
FIG. 26 is a block diagram showing a configuration of a storage system according to the fourth embodiment of the invention.

FIG. 26 is a block diagram showing a configuration of a storage system according to the fourth embodiment of the invention.

In the configuration of FIG. 26, some of the storage control units 2400 of the second embodiment of the invention are substituted with front-end control units 2600.

The front-end control unit 2600 substitutes the drive control unit 103 in the storage control unit 2400 with the host interface control unit 101. That is, only the host computers are connected to the front-end control unit 2600, while no disk drives 104 are connected to the front-end control unit 2600.

In the present embodiment, the storage control unit 2400 or the front-end control unit 2600 has the 8-ports switch 2401. Then, like the second embodiment of the invention (see FIG. 24), two storage control units 2400 constitute one node 40 (storage node). Similarly, two front-end control units 2600 constitute one node 40 (front-end node). The shape of the connection between the nodes 40 is as shown in FIG. 4.

The node 40 of the present embodiment transmits and receives the packet 50 (see FIG. 5), similarly to the first embodiment of the invention. The same routing algorithm as that of the first embodiment of the invention (see FIGS. 6 to 23) is applied to the present embodiment.

The storage system of the present embodiment can be connected to more host computers, as compared to the first embodiment of the invention. Typically, since many host computers are connected to the large scale storage system, the number of required host I/F units 201 is much larger than the number of required drive I/F units. In accordance with the present embodiment, since the storage system has the front-end control units as its storage nodes, it can be easily connected to a number of host computers.

Figure 27:
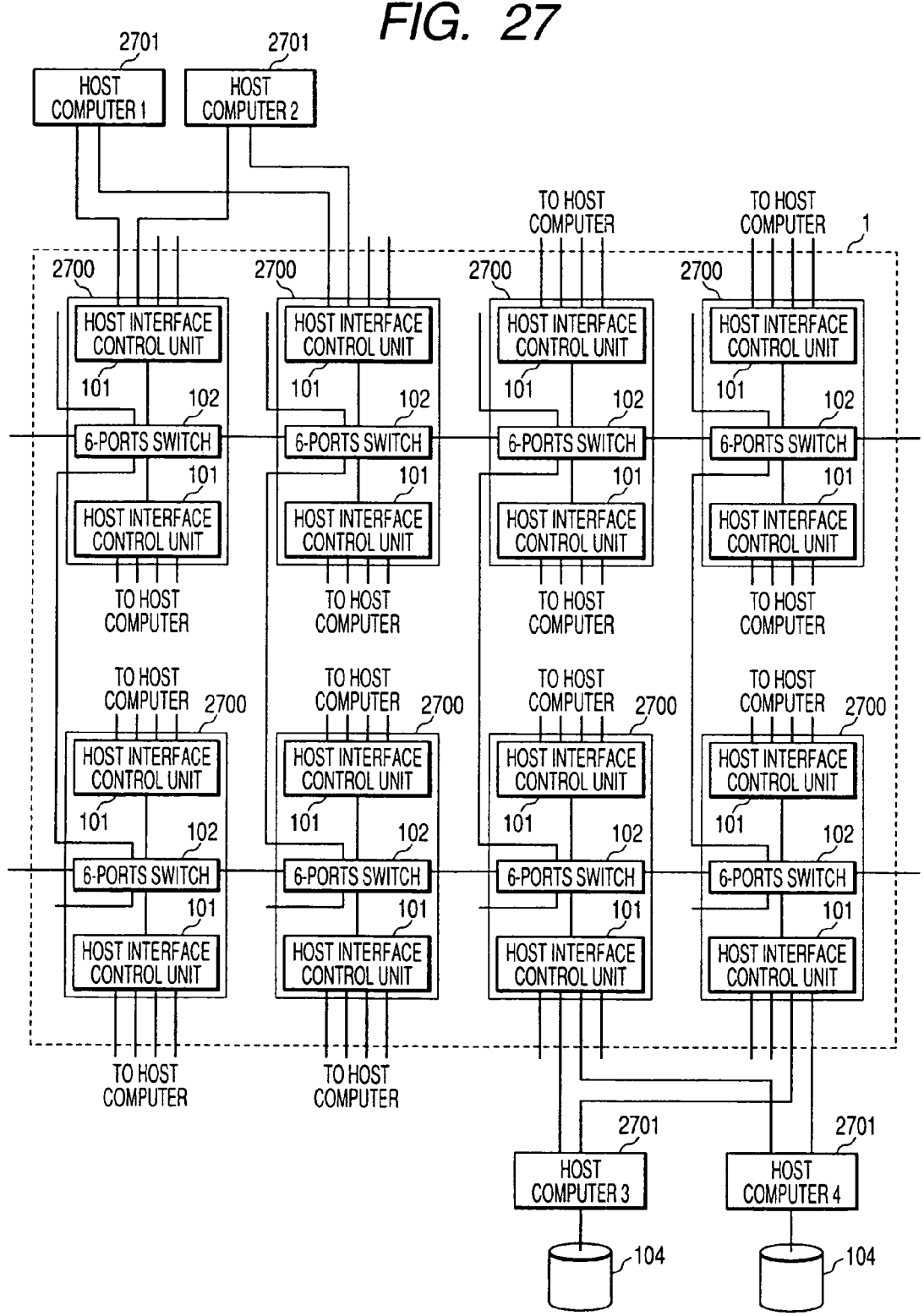
FIG. 27 is a block diagram showing a configuration of a storage system according to the fifth embodiment of the invention.

FIG. 27 is a block diagram showing a configuration of a storage system according to the fifth embodiment of the invention.

In the configuration of FIG. 27, all the storage control units 10 of the first embodiment of the invention are substituted with front-end control units 2700.

The front-end control unit 2700 substitutes the drive control unit 103 in the storage control unit 10 with the host interface control unit 101. That is, only the host computers are connected to the front-end control unit 2700, while no disk drives 104 are connected to the front-end control unit 2700.

Therefore, the storage system 1 of the present embodiment does not have the disk drives 104. The disk drives 104 are connected to the host computer 2701 which is connected to the front-end control unit 2700. Further, other storage systems 1 may be connected to the storage system 1 of the present embodiment.

In the present embodiment, each front-end control unit 2700 has a 6-ports switch 102. Then, two front-end control units 2700 constitute one node 40 (front-end node). The structure of the connection between the nodes 40 is as shown in FIG. 4.

The node 40 of the present embodiment transmits and receives the packet 50 (see FIG. 5), similarly to the first embodiment of the invention. The same routing algorithm as that of the first embodiment of the invention (see FIGS. 6 to 23) is applied to the present embodiment.

The storage system 1 of the present embodiment can be used, for example, as a SAN (storage area network) switch.

In accordance with the storage system 1 of the present embodiment, the disk drives may be freely connected to many host computers. When providing the respective host computers with disk drives of other host computers or other storage systems 1, the storage system 1 of the present embodiment converts the disk drives into logical volumes of the respective host computers. Then, the respective host computers can operate the respective logical volumes freely and independently, regardless of the locations or configurations of the physical disk drives.

In accordance with the embodiments of the invention, a relatively small scale node is constituted, in which the host interface control unit is connected to the drive control unit via the switch. Thus, by connecting an arbitrary number of such nodes together, an arbitrary scale storage system is constituted. For this reason, the scale of the storage system to be constituted has no limit. Further, in the small scale configuration, it is unnecessary to have a large scale switch, and thus the cost of the small scale configuration is not large. In addition, even in the large scale configuration, the large scale switch is not required, and thus wirings are relatively simplified. Therefore, the increase in wiring cost of the large scale configuration is suppressed. As a result, the cost per storage capacity is kept almost uniformly, regardless of the scale of the storage system.

In addition, since a plurality of nodes are connected in the two-dimensional lattice shape, data transmission is dispersed into multiple data transmissions between the plurality of nodes. Then, when data is transmitted between the nodes, the degradation in performance is suppressed. Further, when the node to which the host computer is connected is distant from the node to which the disk drives to be accessed are connected, the more distant (the number of other nodes relaying between the two nodes) is, the more the time for data transmission is required. However, the transmission time is determined according to the number of nodes relaying data transmission between the two nodes, but it is not abruptly increased. Therefore, uniformity in the transmission time is kept so that the storage system of the invention is easy to use.

In addition, since the respective nodes are connected to one another in the two-dimensional lattice shape, the data transmission paths have high redundancy. That is, even when a transmission path has some faults, there are plural alternative paths, and thus strong fault tolerance can be obtained.

What is claimed is:

1. A storage system which is connected to a host computer, the storage system comprising:
    a plurality of nodes; and
    a plurality of disk drives connected to the nodes,
    each node having:
        a host interface unit which is connected to the host computer to communicate with the host computer,
        a drive interface unit which is connected to the disk drives to access to the disk drives, and
        a switch which communicates with the host interface unit and the drive interface unit,
    wherein the switch is connected to the switches in the other nodes, such that the nodes are connected to one another in a two-dimensional lattice shape,
    wherein the respective disk drives are connected to two drive interface units provided in different nodes,
    wherein the node has a two-dimensional address which is indicative of a position of the node in the two-dimensional lattice shape in which the nodes are connected to one another,
    wherein each node:
    transmits and receives a packet, which includes at least an address of a destination node, a detour mark, a reverse search mark, and a search count, with other nodes,
    when receiving the packet, compares the address of its own to the address of the destination node included in the received packet,
    when the address of the node does not match with the address of the destination node, determines an adjacent node which is positioned on a shortest path from the node to the destination node,
    when two adjacent nodes which are positioned on two different shortest paths respectively are determined, compares traffic amounts of the two determined adjacent nodes to each other,
    transmits the packet to one adjacent node having a smaller traffic amount of the two determined adjacent nodes,
    when the transmission fails, transmits the packet to the other adjacent node of the two determined adjacent nodes,
    when only one adjacent node which is positioned on the shortest path is determined, transmits the packet to the determined adjacent node,
    when the transmission fails, judges whether or not the destination node is adjacent to the node,
    if it is judged that the destination node is not adjacent to the node, sets the detour mark to valid and determines two adjacent nodes which are positioned on two different second shortest paths from the node to the destination node respectively,
    compares the traffic amounts of the determined adjacent nodes which are positioned on the second shortest paths one another,
    transmits the packet to the one adjacent node having the smaller traffic amount which is positioned on the one second shortest path,
    when the transmission fails, transmits the packet to the other adjacent node which is positioned on the other second shortest path,
    the adjacent node which receives the packet having a valid detour mark does not transmit the packet to the node which transmits the packet,
    if it is judged that the destination node is adjacent to the node, when the reverse search mark is invalid, increments the search count by 1 and transmits the packet to the node in a predetermined first direction,
    when the transmission fails, sets the reverse search mark to valid, sets the search count to 1, and transmits the packet to the node in a predetermined second direction,
    if it is judged that the destination node is adjacent to the node, when the reverse search mark is valid, increments the search count by 1 and transmits the packet to the node in the predetermined second direction, and
    when the reverse search mark is valid and the transmission fails, or when the search count exceeds 8, reports a fault.

2. A method in which, in a storage system which has four or more nodes, at least one of which is connected either to a host computer or to disk drives, or to both, each node being connected to the other four or less nodes adjacent thereto, such that the nodes are connected to each other in a two-dimensional lattice shape, and having a two-dimensional address which is indicative of a position of the node in the two-dimensional lattice shape in which the nodes are connected to each other, the respective nodes transmit a packet for an access request or response, the method comprising:

- a step in which a first node of the four or more nodes receives the packet for an access request or a response;
- a step of acquiring the address of the first node;
- a step of comparing the acquired address to the address of a second node which is a destination of the received access request or the received response:
- a step of, when the address of the first node and the address of the second node do not equal to each other, determining a third node which is positioned on a shortest path from the first node to the second node and which is adjacent to the first node; and
- a step of transmitting the packet to the third node,
- wherein the method, in a case in which there are two different shortest paths to the second node, further comprisinq:
- a step of determining third and fourth nodes which are positioned on the two different shortest paths respectively and which are adjacent to the first node,
- a step of comparing the traffic amount from the first node to the third node with the one from the first node to the fourth node; and
- a step of, based on the comparison result, transmitting the packet to the third node or to the fourth node having a smaller traffic amount.

3. The method according to claim 2, further comprising:
in the step of transmitting the packet to the third or fourth adjacent node on one of the two shortest paths having the smaller traffic amount, when the transmission fails, a step of transmitting the packet to the third or fourth adjacent node on the other of the two shortest paths.

4. A method in which, in a storage system which has four or more nodes, at least one of which is connected either to a host computer or to disk drives, or to both, each node being connected to the other four or less nodes adjacent thereto, such that the nodes are connected to each other in a two-dimensional lattice shape, and having a two-dimensional address which is indicative of a position of the node in the two-dimensional lattice shape in which the nodes are connected to each other, the respective nodes transmit a packet for an access request or response, the method comprising:

- a step in which a first node of the four or more nodes receives the packet for an access request or a response;
- a step of acquiring the address of the first node;
- a step of comparing the acquired address to the address of a second node which is a destination of the received access request or the received response;
- a step of, when the address of the first node and the address of the second node do not equal to each other, determining a third node which is positioned on a shortest path from the first node to the second node and which is adjacent to the first node; and
- a step of transmitting the packet to the third node,
- wherein the method, in a case in which there is only one shortest path to the second node, in the step of transmitting the packet to the third node which is positioned on the shortest path and which is adjacent to the first node, when the transmission fails, further comprising:
- a step of judging whether or not the second node is adjacent to the first node;
- a step of, when it is judged that the second node is not adjacent to the first node, determining the fourth and the fifth nodes which are positioned on two different second shortest paths respectively and which are adjacent to the first node;
- a step of comparing the traffic amount from the first node to the fourth node with the one from the first node to the fifth node;
- a step of, based on the comparison result, transmitting the packet to the fourth node or to the fifth node having a smaller traffic amount; and
- a step of, when the transmission fails, transmitting the packet to the other node of the fourth and fifth nodes.

5. The method according to claim 4, further comprising:
- a step of, when it is judged that the second node is not adjacent to the first node, setting first information included in the packet to be valid; and
- a step of, when the first information of the packet from the first node are received by the fourth or the fifth node adjacent to the first node is valid, transmitting the packet through a path other than the path having the first node which transmitted the packet.

6. The method in which, in a storage system which has four or more nodes, at least one of which is connected either to a host computer or to disk drives, or to both, each node being connected to the other four or less nodes adjacent thereto, such that the nodes are connected to each other in a two-dimensional lattice shape, and having a two-dimensional address which is indicative of a position of the node in the two-dimensional lattice shape in which the nodes are connected to each other, the respective nodes transmit a packet for an access request or response, the method comprising:

- a step in which a first node of the four or more nodes receives the packet for an access request or a response;
- a step of acquiring the address of the first node;
- a step of comparing the acquired address to the address of a second node which is a destination of the received access request or the received response;
- a step of, when the address of the first node and the address of the second node do not equal to each other, determining a third node which is positioned on a shortest path from the first node to the second node and which is adiacent to the first node; and
- a step of transmitting the packet to the third node,
- wherein the method, in a case in which there is only one shortest path to the second node, in the step of transmitting the packet to the third node, when the transmission fails, further comprising:
- a step of judging whether or not the second node is adjacent to the first node;
- a step of, when it is judged that the second node is adjacent to the first node and when second information included in the packet is invalid, searching a transmission path of the packet in a predetermined first direction and transmitting the packet to the searched path;
- a step of, when the search fails, setting the second information to be valid; and
- a step of, when it is judged that the second node is adjacent to the first node and when the second information is valid, searching the transmission path of the packet in a direction different from the first direction and transmitting the packet to the searched path.

* * * * *